(12) United States Patent
Kobuchi et al.

(10) Patent No.: US 8,252,475 B2
(45) Date of Patent: *Aug. 28, 2012

(54) SEPARATOR COMPRISING A METAL SHEET AND A RESIN

(75) Inventors: Yasushi Kobuchi, Yamatokooriyama (JP); Ikuzo Usami, Kanagawa (JP)

(73) Assignee: Nitta Corporation, Osaka (JP)

( * ) Notice: Subject to any disclaimer, the term of this patent is extended or adjusted under 35 U.S.C. 154(b) by 1119 days.

This patent is subject to a terminal disclaimer.

(21) Appl. No.: 10/582,269

(22) PCT Filed: Dec. 6, 2004

(86) PCT No.: PCT/JP2004/018143
§ 371 (c)(1),
(2), (4) Date: Apr. 18, 2007

(87) PCT Pub. No.: WO2005/057699
PCT Pub. Date: Jun. 23, 2005

(65) Prior Publication Data
US 2007/0212589 A1    Sep. 13, 2007

(30) Foreign Application Priority Data

Dec. 9, 2003 (JP) ............... P2003-410392
Mar. 8, 2004 (JP) ............... P2004-064009
Apr. 28, 2004 (JP) ............... P2004-134594
Jun. 29, 2004 (JP) ............... P2004-191186

(51) Int. Cl.
*H01M 8/24* (2006.01)
*H01M 2/14* (2006.01)
*H01M 2/18* (2006.01)
*H01M 8/04* (2006.01)

(52) U.S. Cl. ............ 429/457; 429/508; 429/514
(58) Field of Classification Search ......... 429/456–457, 429/460, 482, 492, 510, 512, 514, 518, 508; 156/221; 264/259; 427/115; 428/214
See application file for complete search history.

(56) References Cited

U.S. PATENT DOCUMENTS 6,040,076 A * 3/2000 Reeder ................... 429/460
6,291,094 B1   9/2001 Yoshimura et al.
6,383,678 B1 * 5/2002 Kaneko et al. ........... 429/510

(Continued)

FOREIGN PATENT DOCUMENTS

JP           63-28251         2/1988

(Continued)

OTHER PUBLICATIONS

Machine Translation and Abstract in English of JP 2001-093539.*

(Continued)

*Primary Examiner* — Barbara Gilliam
*Assistant Examiner* — Claire L Roe
(74) *Attorney, Agent, or Firm* — Harness, Dickey & Pierce, P.L.C.

(57) ABSTRACT

Moreover, as a case of not using the press work, in a separator of a polymer electrolyte fuel cell described in a Japanese Unexamined Patent Publication JP-A 2001-76748, a gas channel is formed by printing an electrically conductive material onto an electrically conductive base material. To be specific, as the electrically conductive base material is used a molded plate formed of carbon powder and a thermosetting resin as main components, and as the electrically conductive material is used carbon paste containing carbon powder as a main component.

11 Claims, 25 Drawing Sheets

U.S. PATENT DOCUMENTS

| | | |
|---|---|---|
| 6,761,990 B1 | 7/2004 | Yoshitake et al. |
| 2001/0033957 A1 | 10/2001 | Nakata et al. |
| 2003/0096151 A1* | 5/2003 | Blunk et al. .................... 429/34 |
| 2004/0197467 A1 | 10/2004 | Nakata et al. |

FOREIGN PATENT DOCUMENTS

| | | |
|---|---|---|
| JP | 63-289770 | 11/1988 |
| JP | 2-168563 | 6/1990 |
| JP | 8-180883 | 7/1996 |
| JP | 2000-138067 | 5/2000 |
| JP | 2000-243408 | 9/2000 |
| JP | 2001-76748 | 3/2001 |
| JP | 2001093539 A * | 4/2001 |
| JP | 2001-122677 | 5/2001 |
| JP | 2001-126744 | 5/2001 |
| JP | 2001-307747 | 11/2001 |
| JP | 2001-351642 | 12/2001 |
| JP | 2001-357859 | 12/2001 |
| JP | 2003-151572 | 5/2003 |
| JP | 2003-217611 | 7/2003 |
| JP | 2003-253127 | 9/2003 |
| JP | 2003-297383 | 10/2003 |
| WO | 00/44059 | 7/2000 |

OTHER PUBLICATIONS

International Search Report (PCT/ISA/210).
International Preliminary Exam Report (PCT/IPEA/409).

* cited by examiner

SEPARATOR COMPRISING A METAL SHEET AND A RESIN

TECHNICAL FIELD

The present invention generally relates to a separator, such as one provided in a stack-type polymer electrolyte fuel cell for example.

BACKGROUND ART

Conventionally, there have been widely recognized needs for efficient use of limited energy resources and energy saving for prevention of global warming. Today, energy demand is met by thermal power generation in such a manner that thermal energy is converted into electric power energy.

However, coal and oil required for the thermal power generation are resources of which reserves are finite, so that new energy resources are now necessary to replace the coal and oil with. Given this factor, attentions have been drawn to a fuel cell which chemically generates power with use of hydrogen for fuel.

The fuel cell has two electrodes and an electrolyte disposed between the electrodes. In the anode, supplied hydrogen is ionized to be a hydrogen ion which travels in the electrolyte toward a cathode. In the cathodes, supplied oxygen and the hydrogen ion which has traveled in the electrolyte, are reacted with each other to generate water. As electrons generated in accompaniment with the ionization of hydrogen are moved from the anode to the cathode through wiring, whereby an electric current flows to generate electricity.

The fuel cells are classified into four types mainly depending upon differences in the electrolyte. These four types are a Solid Oxide Fuel Cell (SOFC) which uses an ion-conductive ceramics for the electrolyte; a Polymer Electrolyte Fuel Cell (PEFC) which uses a hydrogen ion-conductive polymer membrane for the electrolyte; a Phosphoric Acid Fuel Cell (PAFC) which uses a highly concentrated phosphoric acid for the electrolyte; and a Molten Carbonate Fuel Cell (MCFC) which uses an alkali metal carbonate for the electrolyte. Of these, the Polymer Electrolyte Fuel Cell (PEFC) having a low operating temperature of 80° C. has been particularly in progress of development.

The polymer electrolyte fuel cell has a structure composed of an electrolyte layer having on a surface thereof a catalyst electrode; a separator which nips the electrolyte layer from both sides thereof and is grooved for supplying hydrogen and oxygen; and a power collector plate for collecting electricity generated on the electrode. Improvement has been made in the separator as well as the electrolyte layer.

The requirements to be fulfilled by the separator include: high electrical conductivity; high hermeticity against fuel gas and oxidizer gas; and high resistance to corrosion at the time of oxidation-reduction reaction of hydrogen as well as oxygen.

In order to meet these requirements, the following separator materials have been used.

One of the most frequently used materials is fine-grained carbon which is excellent in electrical conductivity, corrosion resistance, and mechanical strength, and is also higher in workability and lighter in weight. However, the fine-grained carbon is susceptible to oscillation and shock, and needs to be subjected to cutting process which leads to an undesirable increase in the processing cost. It is also necessary to perform additional treatment thereon to attain impermeability to gaseous substances.

Moreover, synthetic resin is also used, including thermosetting resin such as phenol resin and epoxy resin. The synthetic resin, although it is advantageous in terms of cost reduction, offers poor dimensional stability and low electrical conductivity.

From viewpoints of electrical conductivity, workability, hermeticity, and the like, metal has been more frequently used. The metal used mainly includes titanium and stainless-steel. However, the metal is susceptible to corrosion, and metal ion tends to be taken into the electrolyte membrane, which results in deterioration in ion conductivity. Accordingly, a separator surface needs to be plated with gold.

Further, rubber is used, including ethylene-propylene-diene rubber and the like. The rubber has low gas permeability and high sealability.

In a Japanese Unexamined Patent Publication JP-A 8-180883 (1996), a polymer electrolyte fuel cell is disclosed. In this polymer electrolyte fuel cell, as a separator is used a sheet metal including stainless-steel, titanium alloy and the like on which a passivation film is easily formed by air, and a press work is given to form a predetermined shape Further, in a Japanese Unexamined Patent Publication JP-A 2003-297383, a separator for fuel cell is disclosed. This fuel cell separator is constituted by a metal base sheet which has, on at least one surface thereof, a first resin layer and a second resin layer formed of an admixture of resin and an electrically conductive filler. The first resin layer exhibits a volume resistivity of 1.0 Ω·cm or below. The second resin layer is smaller in volume resistivity than the first resin layer. In this way, the separator succeeds in providing enhanced power collecting capability, moldability, strength, and corrosion resistance.

Thus, also in the separator for fuel cell described in JP-A 2003-297383, a gas channel is formed by press work as in the case of the separator in the polymer electrolyte fuel cell described in JP-A 8-180883 (1996).

Moreover, as a case of not using the press work, in a separator of a polymer electrolyte fuel cell described in a Japanese Unexamined Patent Publication JP-A 2001-76748, a gas channel is formed by printing an electrically conductive material onto an electrically conductive base material. To be specific, as the electrically conductive base material is used a molded plate formed of carbon powder and a thermosetting resin as main components, and as the electrically conductive material is used carbon paste containing carbon powder as a main component.

A separator formed of rubber has low gas permeability, but low stiffness, and thus deteriorates under a high heat environment, so that warp and deformation volume are large. There arises a problem that the separator is not durable for a long-term use.

Furthermore, a future separator is demanded for reduction in thickness and weight thereof, and in order to realize such demands, it is necessary to reduce thickness and weight of a metal base and to miniaturize the gas channel. However, if the gas channel is attempted to be formed by the press work as the separators described in JP-A 8-180883 (1996) and JP-A 2003-297383, the warp and deformation are larger so that dimensional accuracy becomes poor. This deterioration of the dimensional accuracy causes decrease in yield.

The separator described in JP-A 2001-76748 can respond to the demand of miniaturization of the gas channel by printing carbon paste, but the base material is the thermosetting resin and therefore, there remains a problem that the base material itself is poor in the dimensional stability.

Furthermore, conventional separators including the above separators described in the publications need to be provided with a gasket between the electrolyte layers in order to prevent fluid from leaking.

SUMMARY

An object of at least one embodiment of the invention is to provide a separator which is excellent in reliability and corrosion resistance, and to provide a method for manufacturing the separator which enhances productivity and realizes a high yield.

At least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator comprising:

a separating section for achieving separation between a fuel gas channel and an oxidizer gas channel; and a sealing section disposed along an outer periphery of the separator, for preventing leakage of fuel gas and oxidizer gas, wherein the separating section is composed of a flat metal sheet serving as a core member, and a resin layer formed on a surface of the flat metal sheet, the resin layer is provided with the channel, the sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force, and the sealing projection has a circular arc-shaped sectional profile when viewed in a direction perpendicular to a direction in which the fuel gas and the oxidizer gas flow.

According to at least one embodiment of the invention, at least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator having a separating section for achieving separation between a fuel gas channel and an oxidizer gas channel.

In the separating section, on a surface of the flat metal sheet serving as a core member is formed a resin layer that is, for example, a rubber layer in which a channel is provided.

Further, the separator has a sealing section disposed along an outer periphery of the separator, for preventing leakage of fuel gas and oxidizer gas. The sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force. The sealing projection has a circular arc-shaped sectional profile when viewed in a direction perpendicular to a direction in which the fuel gas and the oxidizer gas flow.

Accordingly, by providing the flat metal sheet for a core member, it is possible to provide a separator which has less warp and deformation volume and is excellent in reliability, compared to a separator consisting solely of rubber. Since the metal sheet serving as a core member is covered with the resin layer, it is possible to prevent surface changes such as corrosion caused by hydrogen gas and oxygen gas, and coolant.

Further, it is possible to eliminate the need to prepare a sealing member such as an O-ring or a gasket that has conventionally been required to effect sealing, and thereby reduce the number of constituent components of a fuel cell.

Further, at least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator comprising:

a separating section for achieving separation between a fuel gas channel and an oxidizer gas channel; and a sealing section disposed along an outer periphery of the separator, for preventing leakage of fuel gas and oxidizer gas, wherein the separating section is composed of a flat metal sheet serving as a core member, and a resin layer formed on a surface of the flat metal sheet, the resin layer is provided with the channel, the sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force, and the sealing projection has a U-shaped or V-shaped sectional profile when viewed in a direction perpendicular to a direction in which the fuel gas and the oxidizer gas flow.

According to at least one embodiment of the invention, at least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator having a separating section for achieving separation between a fuel gas channel and an oxidizer gas channel.

In the separating section, on a surface of the flat metal sheet serving as a core member is formed a resin layer that is, for example, a rubber layer in which a channel is provided.

Further, the separator has a sealing section disposed along an outer periphery of the separator, for preventing leakage of fuel gas and oxidizer gas. The sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force. The sealing projection has a U-shaped or V-shaped sectional profile when viewed in a direction perpendicular to a direction in which the fuel gas and the oxidizer gas flow.

Accordingly, by providing the flat metal sheet for a core member, it is possible to provide a separator which has less warp and deformation volume and is excellent in reliability, compared to a separator consisting solely of rubber. Since the metal sheet serving as a core member is covered with the resin layer, it is possible to prevent surface changes such as corrosion caused by hydrogen gas and oxygen gas, and coolant.

Further, it is possible to eliminate the need to prepare a sealing member such as an O-ring or a gasket that has conventionally been required to effect sealing, and thereby reduce the number of constituent components of a fuel cell.

Further, at least one embodiment of the invention is characterized in that on a surface of the resin layer is formed a high conductive layer having higher electrical conductivity than electrical conductivity of the resin layer.

According to at least one embodiment of the invention, it is possible to decrease a contact resistance between the separator and the electrolyte assembly.

Further, at least one embodiment of the invention is characterized in that the high conductive layer is formed at least in a region of the resin layer which is in contact with the electrolyte assembly.

According to at least one embodiment of the invention, the high conductive layer is formed at least in a region of the resin layer which is in contact with the electrolyte assembly, so that a contact resistance between the separator and the electrolyte assembly can be decreased more effectively.

Further, at least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator comprising:

a separating section for achieving separation between a fuel gas channel and an oxidizer gas channel; and a sealing section disposed along an outer periphery of the separator, for preventing leakage of fuel gas and oxidizer gas, wherein the separating section is composed of a flat metal sheet serving as a core member, and a resin layer and a high conductive layer having higher conductivity than conductivity of the resin layer, which are formed on a surface of the flat metal sheet, the high conductive layer is provided with the channel, the sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force, and the sealing projection has a circular arc-shaped sectional profile when viewed in a direction perpendicular to a direction in which the fuel gas and the oxidizer gas flow.

According to at least one embodiment of the invention, at least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator having a separating section for achieving separation between a fuel gas channel and an oxidizer gas channel.

In the separating section, on a surface of the flat metal sheet serving as a core member are formed a resin layer and a high conductive layer having higher conductivity than conductivity of the resin layer. The high conductive layer is provided with the channel.

Further, the separator has a sealing section disposed along an outer periphery of the separator, for preventing leakage of fuel gas and oxidizer gas. The sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force. The sealing projection has a circular arc-shaped sectional profile when viewed in a direction perpendicular to a direction in which the fuel gas and the oxidizer gas flow.

Accordingly, by providing the flat metal sheet for a core member, it is possible to provide a separator which has less warp and deformation volume and is excellent in reliability, compared to a separator consisting solely of rubber or thermosetting polymer. Since the metal sheet serving as a core member is covered with the resin layer or the thermosetting polymer layer, it is possible to prevent surface changes such as corrosion caused by hydrogen gas and oxygen gas, and coolant. Furthermore, it is possible to decrease a contact resistance between the separator and the electrolyte assembly and moreover, largely decrease a resistance of entire current passages, so that a rate of power collection can be enhanced.

Further, it is possible to eliminate the need to prepare a sealing member such as an O-ring or a gasket that has conventionally been required to effect sealing, and thereby reduce the number of constituent components of a fuel cell.

Further, at least one embodiment of the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator comprising:

a separating section for achieving separation between a fuel gas channel and an oxidizer gas channel; and a sealing section disposed along an outer periphery of the separator, for preventing leakage of fuel gas and oxidizer gas, wherein the separating section is composed of a flat metal sheet serving as a core member, and a resin layer and a high conductive layer having higher conductivity than conductivity of the resin layer, which are formed on a surface of the flat metal sheet, the high conductive layer is provided with the channel, the sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force, and the sealing projection has a U-shaped or V-shaped sectional profile when viewed in a direction perpendicular to a direction in which the fuel gas and the oxidizer gas flow.

According to at least one embodiment, the invention provides a separator which is interposed between a plurality of electrolyte assemblies each constructed of an electrolyte layer containing an electrolyte medium and a catalytic electrode disposed on a surface in a thickness-wise direction of the electrolyte layer, the separator having a separating section for achieving separation between a fuel gas channel and an oxidizer gas channel.

In the separating section, on a surface of the flat metal sheet serving as a core member are formed a resin layer and a high conductive layer having higher conductivity than conductivity of the resin layer. The high conductive layer is provided with the channel.

Further, the separator has a sealing section disposed along an outer periphery of the separator, for preventing leakage of fuel gas and oxidizer gas. The sealing section is composed of a metal sheet and a rubber layer formed on a surface of the metal sheet, and provided with a sealing projection extending in parallel with a surface of the electrolyte assembly on which a catalytic electrode is formed, the sealing section having a vertex which is constituted so as to be brought into pressure-contact with the electrolyte assembly under a resilient force. The sealing projection has a U-shaped or V-shaped sectional profile when viewed in a direction perpendicular to a direction in which the fuel gas and the oxidizer gas flow.

Accordingly, by providing the flat metal sheet for a core member, it is possible to provide a separator which has less warp and deformation volume and is excellent in reliability, compared to a separator consisting solely of rubber or thermosetting polymer. Since the metal sheet serving as a core member is covered with the resin layer or the thermosetting polymer layer, it is possible to prevent surface changes such as corrosion caused by hydrogen gas and oxygen gas, and coolant. Furthermore, it is possible to decrease a contact resistance between the separator and the electrolyte assembly and moreover, largely decrease a resistance of entire current passages, so that a rate of power collection can be enhanced.

Further, it is possible to eliminate the need to prepare a sealing member such as an O-ring or a gasket that has conventionally been required to effect sealing, and thereby reduce the number of constituent components of a fuel cell.

Further, at least one embodiment of the invention is characterized in that the high conductive layer is a thin film formed of carbon, the high conductive layer being formed through spraying of a dispersion of carbon particles.

According to at least one embodiment of the invention, the dispersion of carbon particles is sprayed to form a thin film formed of carbon. This makes it possible to form the high conductive layer in a very simple process.

Further, at least one embodiment of the invention is characterized in that the metal sheet is covered with a covering layer.

Further, at least one embodiment of the invention is characterized in that, the covering layer is formed on the metal sheet surface via an adhesive layer.

Further, at least one embodiment of the invention is characterized in that the adhesive layer is formed of triazinethiol or polyaniline diffused on the metal sheet surface.

According to at least one embodiment of the invention, the covering layer is formed on the metal sheet surface via the adhesive layer. In more detail, a diffusion layer which will serve as the adhesive layer is formed on the metal sheet surface through application of a coating of an electrically conductive coupling agent typified by a triazinethiol-base compound, as well as a coating of doped electrically conductive polymer typified by a polyaniline-base compound. The triazinethiol- or polyaniline-base compound diffused over the metal surface exhibits electrical conductivity, thus ensuring electrical conductivity with respect to the resin layer so as to take out a generated DC power as a DC current.

Further, at least one embodiment of the invention is characterized in that the covering layer is formed of rubber or synthetic resin having electrical conductivity, and wherein the electrically conductive ink contains:
a vehicle composed of thermosetting monomer or thermosetting oligomer for forming the rubber or synthetic resin; and
an electrically conductive filler composed of a metal compound or carbon-base material.

According to at least one embodiment of the invention, by covering the surface of the metal sheet with the rubber and synthetic resin having electrical conductivity, it is possible to prevent the surface changes and moreover, to ensure the electrical conductivity between the metal sheet and the resin layer. Further, the resin layer can be realized by carrying out the printing by use of the electrical conductive ink containing the vehicle composed of thermosetting monomer or thermosetting oligomer for forming the rubber or synthetic resin, and the electrically conductive filler composed of a metal compound or carbon-base material.

BRIEF DESCRIPTION OF DRAWINGS

Objects, features, and advantages of embodiments of the invention will be more explicit from the following detailed description of example embodiments taken with reference to the drawings wherein.

DETAILED DESCRIPTION OF THE EXAMPLE EMBODIMENTS

Figure 1:
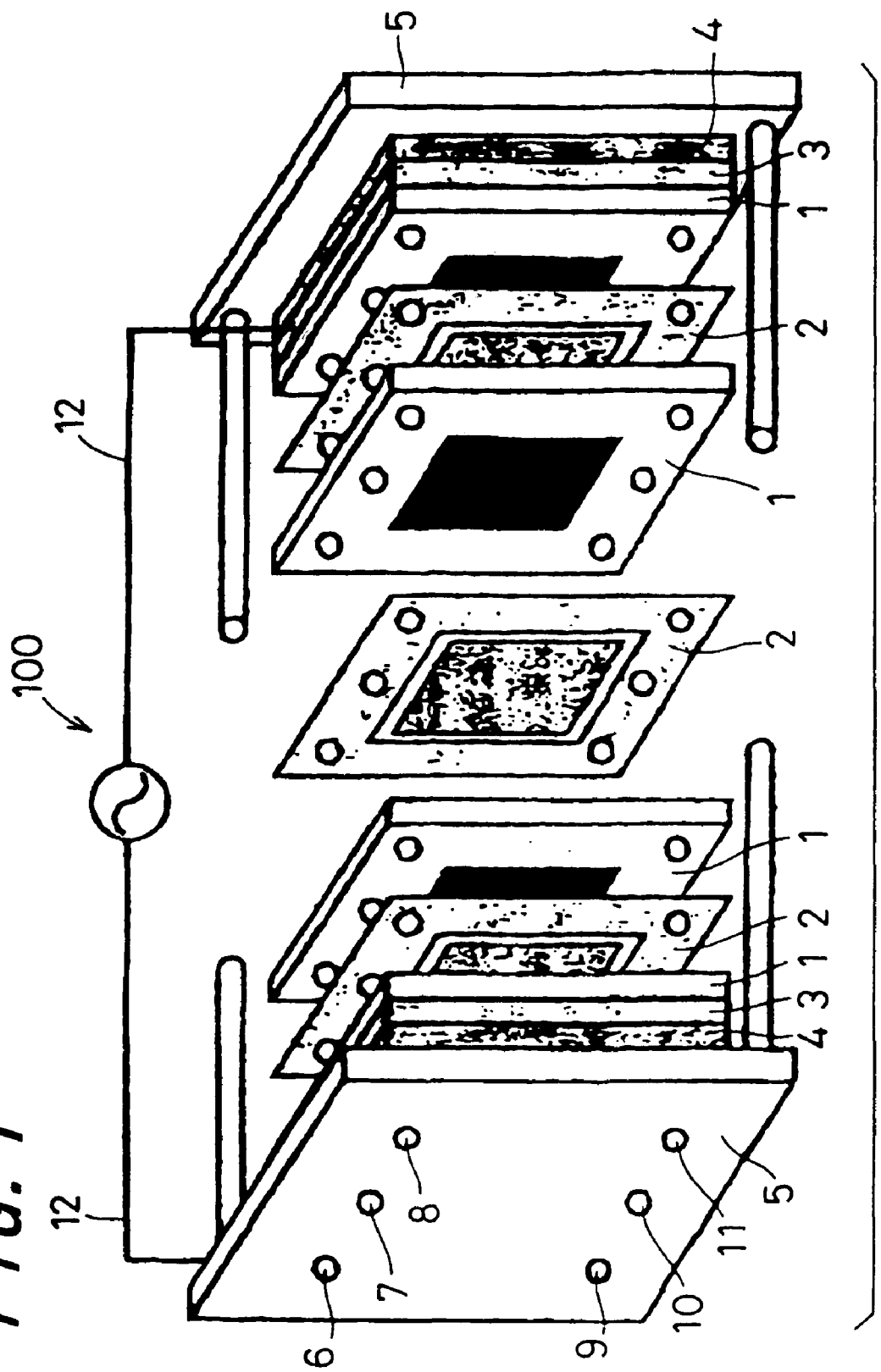
FIG. 1 is an exploded perspective view schematically showing a polymer electrolyte fuel cell (PEFC for short) 100.

FIG. 1 is an exploded perspective view schematically showing a polymer electrolyte fuel cell (PEFC for short) 100. The PEFC 100 is composed of: a separator 1; a fuel cell 2; a power collector plate 3; an insulating sheet 4; an end flange 5; and an electrode wiring 12. The PEFC 100 is constructed such that a plurality of the fuel cells 2 are connected in series with one another to form a so-called stack cell structure capable of providing high-voltage and high-output characteristics. In order to constitute the stack cell structure, the separator is interposed between the adjacent fuel cells 2 to effect the supply of hydrogen and oxygen to each of the fuel cells 2, as well as to collect generated electricity. Accordingly, as shown in FIG. 1, the fuel cells 2 and the separators 1 are arranged in an alternating manner. In the stack cell structure, the separator 1 is arranged as an outermost layer. Outside the separator 1 is arranged the power collector plate 3 to which the electrode wiring 12 is connected. The electricity collected in each of the separators 1 is accumulated in the power collector plate 3, thereby achieving electric power production. The insulating sheet 4 is interposed between the power collector plate 3 and the end flange 5 to prevent electric current from leaking from the power collector plate 3 to the end flange 5. The end flange 5 serves as a casing for keeping a plurality of the fuel cells 2 in a stack cell state.

In the end flange 5 are formed a hydrogen gas inlet 6, a coolant inlet 7, an oxygen gas inlet 8, a hydrogen gas outlet 9, a coolant outlet 10, and an oxygen gas outlet 11. A gaseous substance as well as a water fluid supplied through the inlet flows over a forward path penetrating in the direction in which the fuel cells 2 are stacked on top of one another so as to reach the outermost separator 1, then turns back to flow over a backward path, and is eventually discharged from the outlet.

The forward and backward paths are formed in a branched state in each of the separators 1. A fluid flowing over the forward path is allowed to flow into the backward path through channels formed in the separator 1 in parallel with the direction of the surface of the fuel cell 2. Hydrogen gas as well as oxygen gas is consumed in the fuel cell 2, wherefore unreacted gas is discharged through the backward path. The discharged unreacted gas is collected so that it can be supplied through the inlet once again. In the vicinity of the oxygen gas channel, oxygen and hydrogen react with each other to generate water. Therefore, discharged oxygen gas contains water. The discharged oxygen gas cannot be re-supplied without removing the water contained therein.

Hydrogen gas and oxygen gas, namely fuel gas and oxidizer gas, do not necessarily have to be gas consisting solely of hydrogen and gas consisting solely of oxygen, respectively. That is, the gas for use may contain a gaseous substance other than hydrogen and oxygen so long as the channel is free from quality degradation or degeneration through contact with the gas. For example, nitrogenous air can be used as oxygen gas. Moreover, the source of hydrogen is not limited to hydrogen gas, but may be of another gaseous substance such as methane gas, ethylene gas, and natural gas. The use of ethanol or the like substance is also possible.

Figure 2:
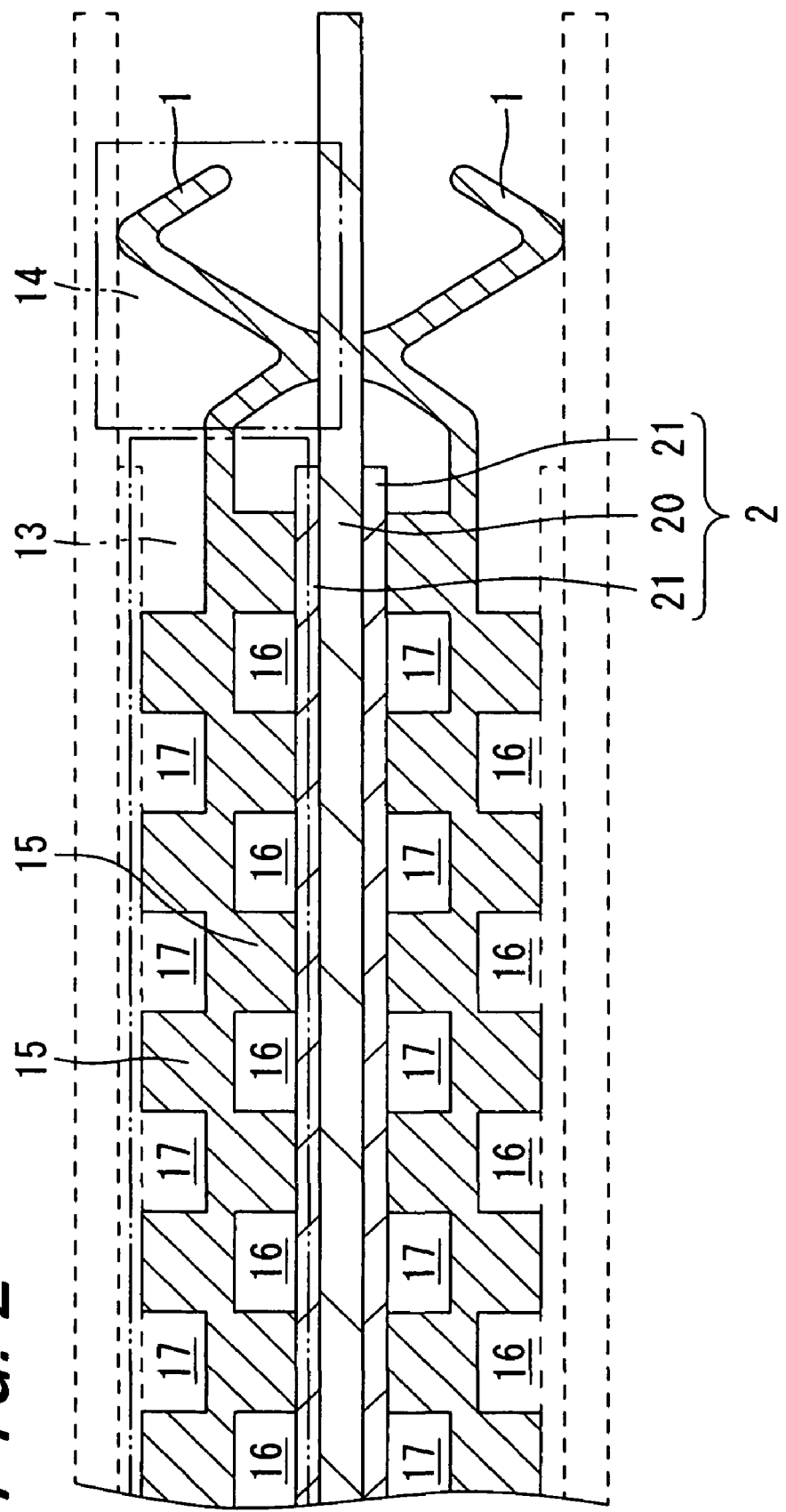
FIG. 2 is a horizontal sectional view of a unit cell 101 including a separator 1.

FIG. 2 is a horizontal sectional view of a unit cell 101 including the separator 1. The unit cell 101 is composed of a single fuel cell 2 with two pieces of the separators 1 arranged on both sides. The unit cell 101 refers to a minimum unit of a cell capable of generating electricity through the supply of hydrogen and oxygen.

The fuel cell 2, namely an electrolyte assembly is composed of a polymer membrane 20 acting as an electrolyte medium and a catalytic electrode 21 formed on the surface of the polymer membrane 20 in its thickness-wise direction. The fuel cell 2 is also referred to as an MEA (Membrane Electrode Assembly).

The polymer membrane 20 is formed as a proton-conducting electrolyte membrane through which hydrogen ion (proton) is allowed to pass. Frequently used is a perfluoro sulfonic acid resin membrane (for example, Nafion (tradename) manufactured by Du pont Co., Ltd.).

The catalytic electrode 21 is stacked on the thickness-wise surface of the polymer membrane 20 as a carbon layer containing catalytic metal such as platinum and ruthenium. When the catalytic electrode 21 is supplied with hydrogen gas and oxygen gas, an electrochemical reaction takes place at the interface between the catalytic electrode 21 and the polymer membrane 20, thus generating DC power.

The polymer membrane 20 is approximately 0.1 mm in thickness. The catalytic electrode 21 has, depending upon the kind of catalytic metal contained therein, a thickness of several μm.

The separator 1 is composed of a separating section 13 for achieving separation between a hydrogen gas channel and an oxygen gas channel, and a sealing section 14 disposed along an outer periphery, for preventing leakage of hydrogen gas and oxygen gas. In the present embodiment, the catalytic electrode 21 is not so formed as to cover the entire surface of the polymer membrane 20, but is formed in a manner such that the polymer membrane 20 is partly exposed at the outer periphery in a range of from 1 to 20 mm, desirably 5 to 10 mm in width. In the separator 1, the separating section 13 is formed in the region positioned face to face with the catalytic electrode 21, whereas the sealing section 14 is formed in the region positioned face to face the exposed part of the polymer membrane 20.

The separating section 13 has on both sides in a thickness-wise direction thereof, a plurality of parallelly arranged channel grooves positioned in parallel with the surface on which the catalytic electrode 21 is formed. The channel groove has a concavely curved sectional profile when viewed in a direction perpendicular to the direction in which a gaseous substance flows. Spaces located at a predetermined interval, surrounded by a partition block 15 and the catalytic electrode 21 constitute a hydrogen gas channel 16 and an oxygen gas channel 17. The partition block 15 partitions off the hydrogen gas channel 16 and the oxygen gas channel 17 so as to avoid mixing of hydrogen gas and oxygen gas, and makes contact with the catalytic electrode 21 to take out the DC power generated at the interface between the polymer membrane 20 and the catalytic electrode 21 as a DC current. The taken-out DC current is then collected by the power collector plate 3 through another partition block 15 or the like.

The adjacent channel grooves are formed in a manner such that their open faces are oriented in the same direction. In conformity therewith, the hydrogen gas channel 16 is provided on one face while the oxygen gas channel 17 is provided on the other face. That is, the arrangement of gas channels are so adjusted that any catalytic electrode 21 portion makes contact only with one and the same gaseous substance. Moreover, as shown in FIG. 2, the two separators 1 for constituting a single unit cell 101 are so arranged that the openings of the channel grooves of one separator 1 confront their corresponding openings of the channel grooves of the other separator 1, with the fuel cell 2 lying therebetween. That is, the two separators 1 are disposed in surface-symmetrical relation to each other with respect to the center of the fuel cell 2. However, such a surface-symmetrical relation does not hold true for the arrangement of the gas channels. They are so arranged that given two channel grooves placed on the opposite sides of the fuel cell 2 deal with different gaseous substances. For example, as shown in FIG. 2, of the two gas channels placed on the opposite sides of the fuel cell 2, one acts as the hydrogen gas channel 16 and the other acts as the oxygen gas channel 17.

Thus arranged, the separators 1 with the gas channels allow electric power production.

The substances to be supplied to the channel constituted by the channel groove and the catalytic electrode 21 are not limited to hydrogen gas and oxygen gas, but may be of another substance such as coolant. In the case of using coolant, it is preferable to pass the coolant through both of the channel grooves placed on the opposite sides of the fuel cell 2.

As a core member of the separator 1, a flat-shaped metal thin sheet is used. For example, thin sheets of metals such as iron, aluminum, and titanium, particularly stainless (e.g. SUS 304 etc.)-steel sheets, SPCC (cold rolled steel sheet for general purposes), and anticorrosive steel sheets are preferable. Among stainless-steel sheets, a surface-treated stainless-steel sheet can be used. Applicable are, for example, a stainless-steel sheet of which surface is treated with acid cleaning or electrolyte etching; a stainless-steel sheet containing an electrically conductive inclusion; a stainless-steel sheet having a BA film formed thereon; and a stainless-steel sheet having an electrically conductive compound coated by means of an ion plating process.

The sealing section 14 is provided with a sealing projection extending in parallel with the surface on which the catalytic electrode 21 is formed. The sealing projection has a U-shaped or V-shaped sectional profile when viewed in a direction perpendicular to the direction in which a gaseous substance flows. By providing a metal thin sheet for the core member of the separator 1, a vertex 18 of the sealing projection is brought into pressure-contact with the exposed part of the polymer membrane 20 under a resilient force. At the position of pressure-contact therebetween, sealing is effected to prevent leakage of hydrogen gas and oxygen gas. Moreover, by imparting a U-shaped or V-shaped configuration to the sealing projection, it is possible to reduce the area of contact between the vertex 18 and the polymer membrane, and thereby achieve a high-pressure sealing effect as achieved in the case of using an O-ring.

Figure 3A:
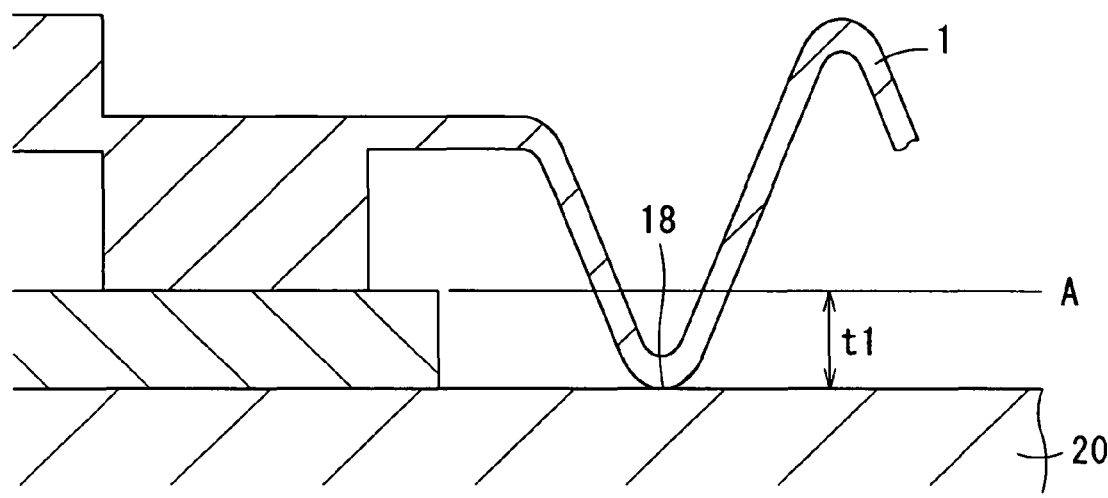
FIG. 3 is a view of assistance in explaining a shape of a sealing section 14 designed for generating a resilient force.
Figure 3B:
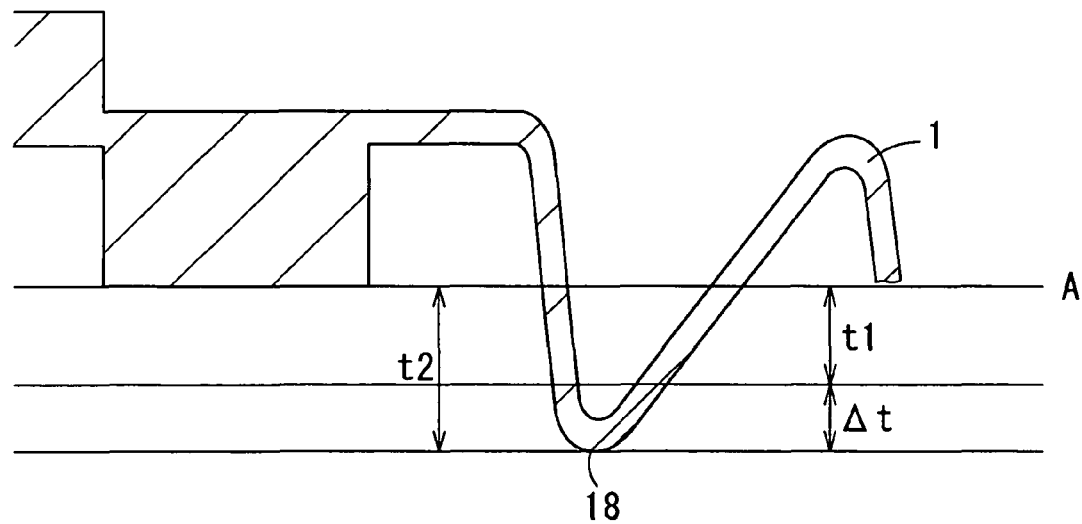

In order to bring the vertex 18 of the sealing projection into pressure-contact with the polymer membrane 20 successfully under a resilient force, the sealing section 14 is previously formed in a manner such that, when the separator 1 is kept out of contact with the polymer membrane 20, namely when the PEFC 1 is in its yet-to-be assembled condition, the vertex 18 of the sealing projection extends beyond the position of contact with the polymer membrane 20 in contrast to the case where the PEFC 1 is in its assembled condition. More specifically, as shown in FIG. 3A, when the PEFC 1 is in its assembled condition, the vertex 18 of the sealing projection assumes a position such that, with respect to a virtual surface A of contact with the catalytic electrode 21, the distance between the vertex 18 and the surface of contact with the catalytic electrode 21 is defined by t1, which is equivalent to the thickness of the catalytic electrode 21. Accordingly, as shown in FIG. 3B, when the PEFC 1 is in its yet-to-be assembled condition, the vertex 18 of the sealing projection assumes a position such that the distance between the vertex 18 and the surface of contact with the catalytic electrode 21 is defined by t2, which is larger than the value t1. Since the junction between the separating section 13 and the sealing projection acts as a spring, it follows that the pressure force under which the vertex 18 is brought into contact with the polymer membrane in accompaniment with the assembly process is dependent upon a resilient force exerted by the spring and the area of contact. In accordance with Hooke's law, the resilient force is obtained by multiplying a spring constant (elastic constant) by the amount of displacement. In the separator 1, the spring constant is determined according to the material of the separator 1 and the shape of the sealing section 14, and the amount of displacement is given by: $\Delta t = t2 - t1$. Therefore, by making changes to the value t2 at the time of process, with the spring constant determined in consideration of the predetermined separator's material and sealing section's shape, it is possible to adjust the sealing pressure with ease. It is needless to say that changes may be made in the separator's material as well as in the sealing section's shape for the purpose of attaining an optimal sealing pressure.

As described previously, the two separators 1 having sandwiched therebetween the fuel cell 2 are disposed in surface-symmetrical relation to each other. Correspondingly, the pressure-contact positions of the vertices 18 of the sealing projection are disposed in surface-symmetrical relation to each other with respect to the center of the fuel cell 2. By arranging the pressure-contact positions of the vertices 18 face to face with each other, it is possible to improve the sealability.

Figure 4:
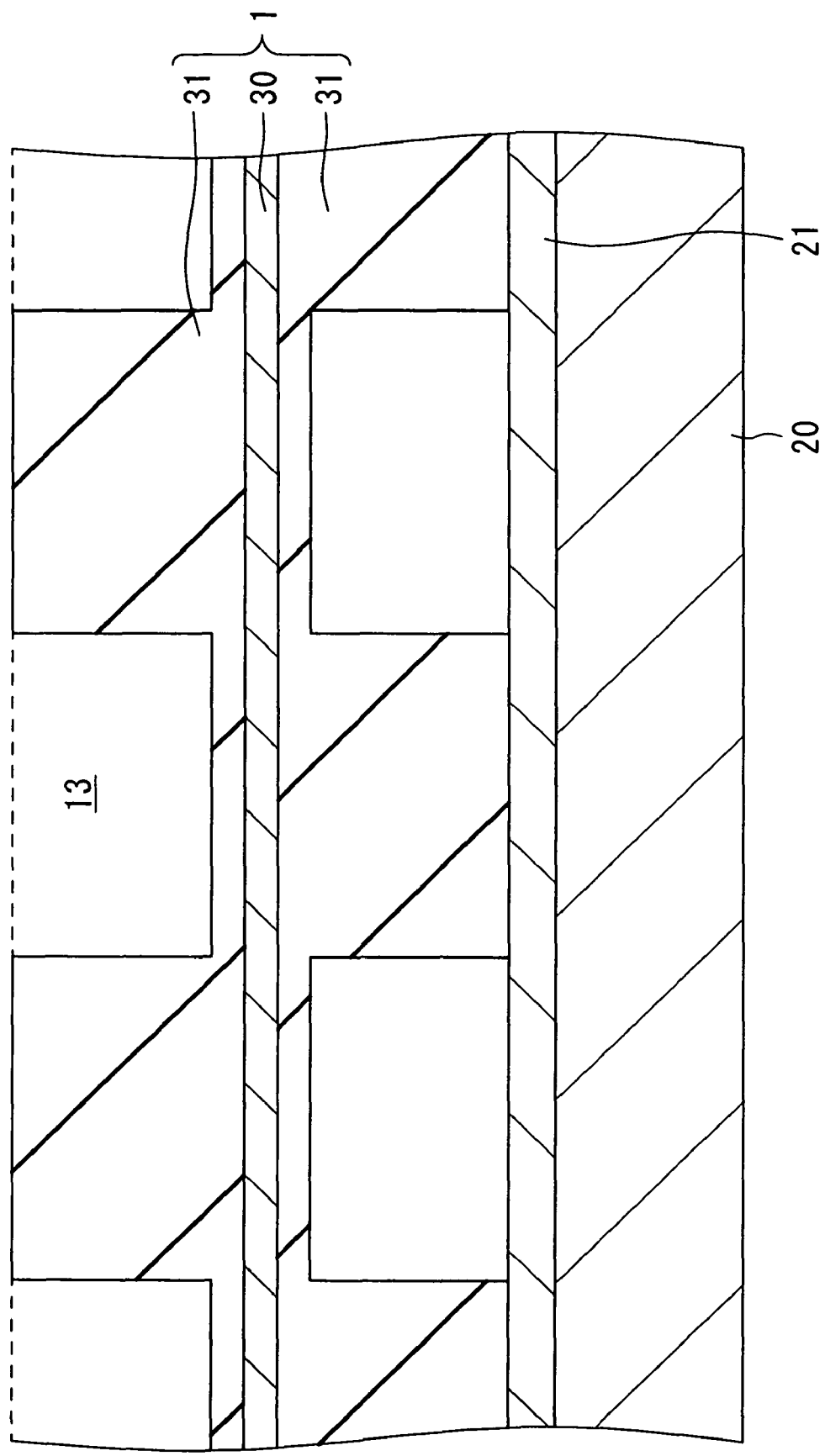
FIG. 4 is an enlarged view illustrating the main portion of a separating section 13 according to a first embodiment.

FIG. 4 is an enlarged view illustrating the main portion of a separating section 13 according to a first embodiment. In the embodiment, on both sides of a metal thin sheet 30 serving as the core member are formed rubber (including elastomer) layers 31 which are resin layers. The rubber layer 31 of the separating section 13 is provided with parallelly arranged grooves. The grooves of the rubber layer 31 constitute the hydrogen gas channel 16 and the oxygen gas channel 17. In the separating section 13, a surface of the metal thin sheet 30 is covered with the rubber layer 31, with the result that it is possible to prevent the surface changes such as corrosion caused by the hydrogen gas and oxygen gas and the coolant.

Moreover, in the separating section 13, the rubber layer 31 comes into contact with the catalytic electrode 21 to take out the DC power generated at the interface between the polymer membrane 20 and the catalytic electrode 21 as a DC current. The taken-out DC current is then collected by the power collector plate through the separator 1. Since the rubber layer 31 thus needs to have electrical conductivity, applicable rubber includes, for example, general-purpose rubbers such as isoprene rubber, butadiene rubber, styrene-butadiene rubber, butyl rubber, and ethylene-propylene rubber; and particular rubber such as epichlorohydrin-containing rubber exhibiting impermeability to gaseous substances and heat resistance, to which a carbon filler is added to give the electrical conductivity. Especially the use of addition-polymerized allyl-series polyisobutylene to which the carbon filler is added, is desirable because of its excellent heat resistance and acid resistance.

Further, there may be provided a synthetic resin layer using synthetic resin instead of the rubber. The useable synthetic resin materials includes, for example, phenol resin, epoxy resin, and fluorine-containing resin to which the carbon filler is added to give the electrical conductivity. Especially the use of highly corrosion-resistant fluorine-containing resin is preferable. The preferable examples thereof include PTFE (polytetrafluoroethylene), PFA (tetrafluoroethylene-perfluoroalkyl vinylether copolymer), FEP (tetrafluoroethylene-hexafluoropropylene copolymer), EPE (tetrafluoroethylene-hexafluoropropylene-perfluoroalkyl vinylether copolymer), ETFE (tetrafluoroethylene-ethylene copolymer), PCTFE (polychlorotrifluoroetylene), ECTFE (chlorotrifluoroetylene-ethylene copolymer), PVDF (polyvinylidene fluoride), PVF (polyviny fluoride), THV (tetrafluoroethylene-hexafluoropropylene-vinylidene fluoride copolymer), VDF-HFP (vinylidene fluoride-hexafluoropropylene copolymer), and TFE-P (vinylidene fluoride-propylene copolymer), to which the carbon filler is added.

Also in the sealing section 14, the metal thin sheet 30 may be covered with the rubber layer 31.

Figure 5:
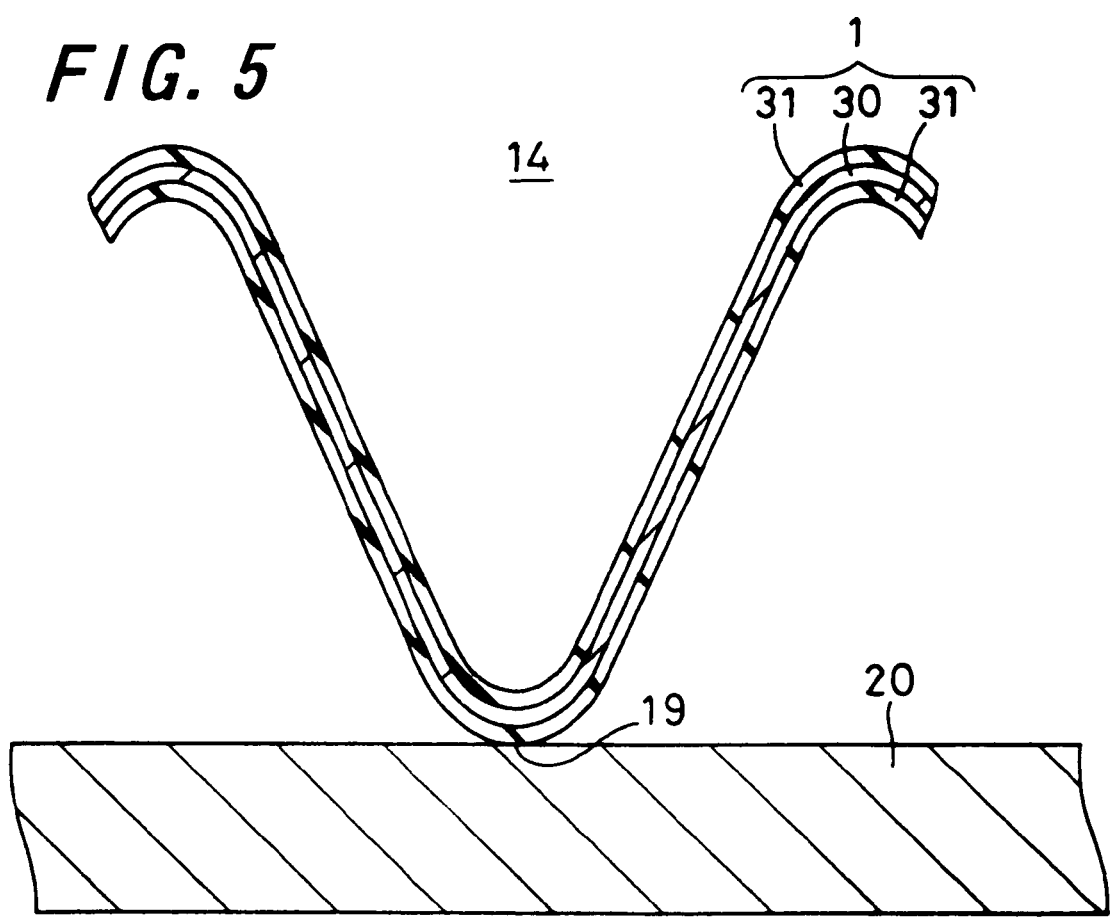
FIG. 5 is an enlarged view illustrating the main portion of the sealing section 14 according to the first embodiment.

FIG. 5 is an enlarged view illustrating the main portion of the sealing section 14 according to the first embodiment. In the embodiment, the separator 1 has covering layers formed therein, for covering the surface of the thin metal plate 30. In the sealing section 14, the rubber layer 31 makes contact with the polymer membrane 20 to effect sealing.

When the metal thin sheet 30 is brought into direct contact with the polymer membrane 20, if, for example, the vertex 18 of the sealing projection is in a deformed state, a minute gap will possibly be developed between the deformed part and the polymer membrane 20 surface, in consequence whereof there results leakage of fluid through the gap. In the sealing section 14, when covering with a highly elastic body, namely the rubber layer 31, as the vertex 18 is placed in a pressure-contact state under a resilient force, the part of contact with the polymer membrane 20 is caused to deform, thus preventing occurrence of a gap between the vertex and the polymer membrane 20 surface. This helps to enhance the sealability.

The covering of the metal thin sheet 30 surface with the rubber layer 31 is conducted mainly by the following two methods. As a first method, a to-be-covered surface of the metal thin sheet 30 is roughed up by oxidation or other processes to form a surface-treated layer which is brought into intimate contact with the rubber layer 31 by exploiting an anchor effect. As a second method, in a case where sufficiently intimate contact with the rubber layer 31 cannot be obtained by roughing up the surface, adhesion of the rubber layer 31 is provided through an adhesive layer. For the adhesive layer, for example, a triazinethiol-base compound and a polyaniline-base compound are used. The triazinethiol-base compound and polyaniline-base compound diffused over the surface of the metal exhibits electrical conductivity, thus allowing taking out generated DC power as a DC current. Likewise, these methods are also applicable to the following embodiments.

As described above, by providing the metal thin sheet for the core member, it is possible to provide a separator which has less warp and deformation volume and is excellent in reliability and corrosion resistance compared to a separator consisting solely of rubber.

Figure 6:
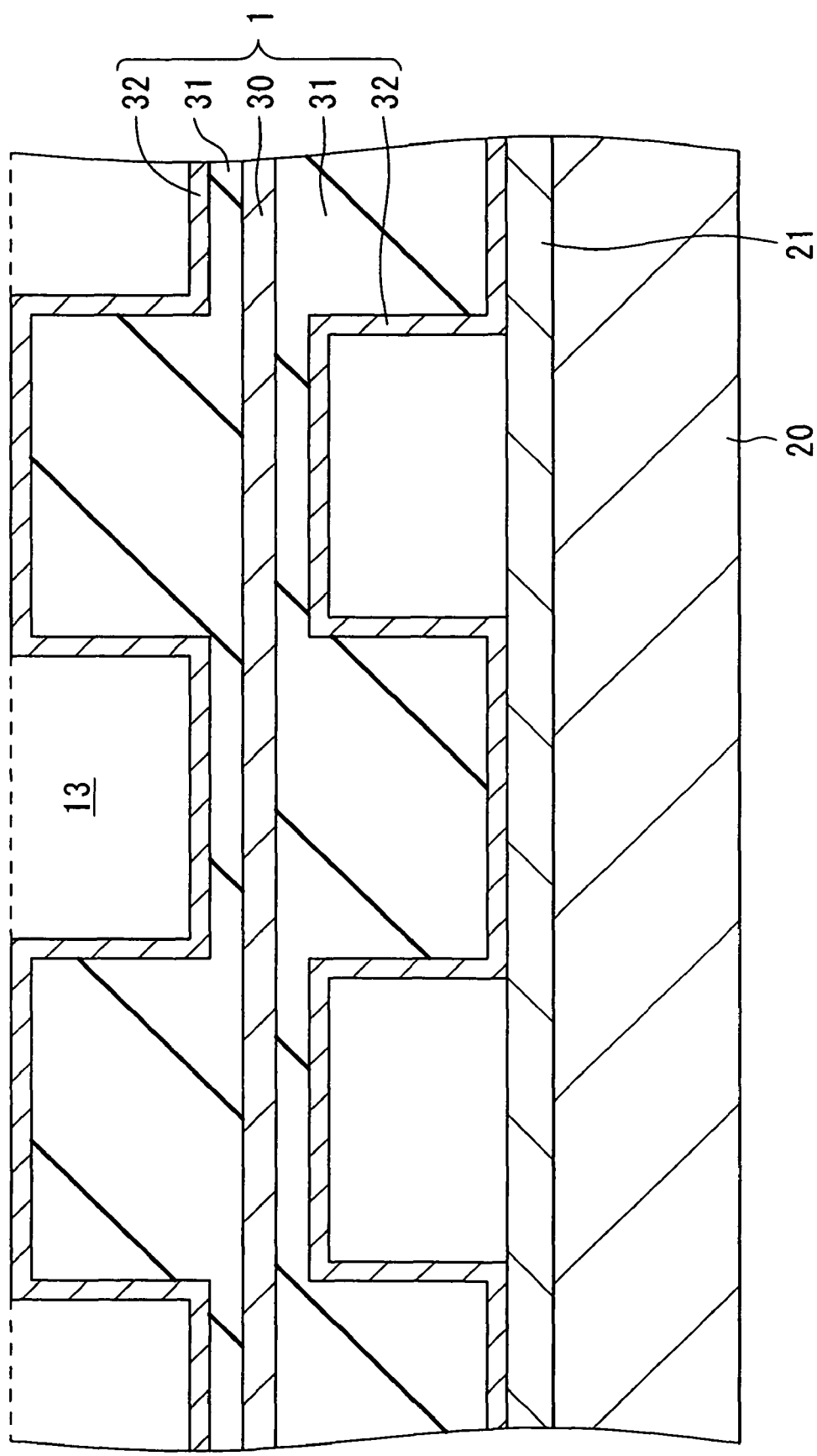
FIG. 6 is an enlarged view illustrating the main portion of the separating section 13 according to a second embodiment.

FIG. 6 is an enlarged view illustrating the main portion of the separating section 13 according to a second embodiment. In the embodiment, the separator 1 is composed of a metal thin layer 30, a rubber layer 31, and a high conductive layer 32. On a surface of the rubber layer 31 is formed the high conductive layer 32 having higher electrical conductivity than the electrical conductivity of the rubber layer 31.

In a case where the rate of power collection obtained is not sufficient because of a high contact resistance between the rubber layer 31 and the catalytic electrode 21, by forming the high conductive layer 32 on the surface of the rubber layer 31, it is possible to decrease the contact resistance between the rubber layer 31 and the catalytic electrode 21 and thereby increase the rate of power collection. It is preferable to use a mixture of a binder resin and carbon (hereinbelow referred to as "a carbon-resin compound") for the high conductive layer 32. In the high conductive layer 32, the high electrical conductivity is realized by carbon, and gas permeability is reduced by the binder resin. Although electric resistance of the high conductive layer 32 is reduced more with an increased carbon content of the carbon-resin compound, a content of the binder resin is decreased so that the gas permeability is made to increase. Considering balance between the electric resistance and the gas permeability, it is preferred that a rate of the resin content of the carbon-resin compound be within a range of from 20% to 30%. The contained carbon includes, for example, artificial graphite, carbon fiber, carbon nanotube, and fullerene and particularly, it is preferable to use the artificial graphite. For the binder resin, it is preferable to use polyisobutylene rubber or other substances.

Figure 7:
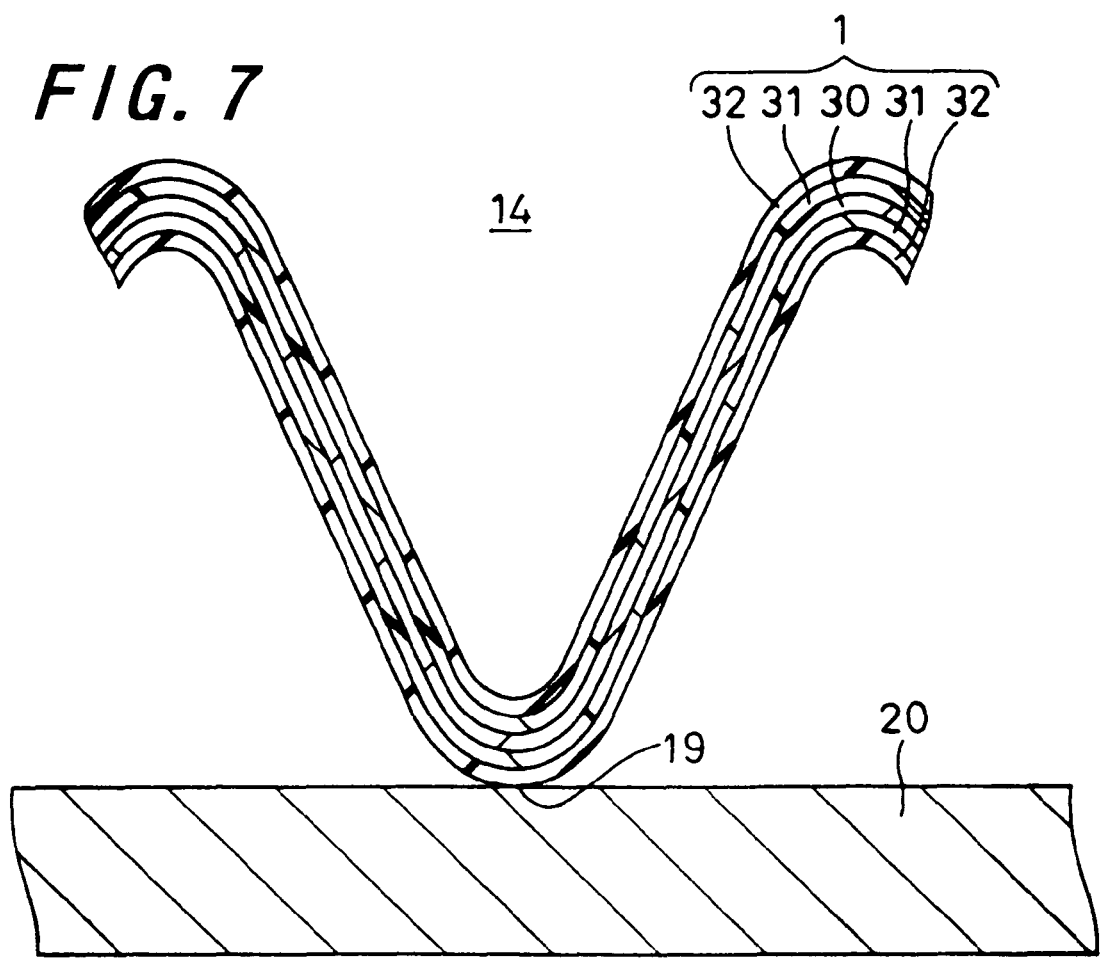
FIG. 7 is an enlarged view illustrating the main portion of the sealing section 14 according to the second embodiment.

FIG. 7 is an enlarged view illustrating the main portion of the sealing section 14 according to the second embodiment. In the embodiment, the separator 1 is composed of a metal thin layer 30, a rubber layer 31, and a high conductive layer 32. In the sealing section 14, the high conductive layer 32 makes contact with the polymer membrane 20 to effect sealing. For the rubber layer 31, it is possible to use the same rubber as that used in the first embodiment.

Note that in the second embodiment, the high conductive layer 32 is provided only in the separating section 13 and does not have to be provided in the sealing section 14. This is because no electric power is generated in the sealing section 14, so that there is no need to take the contact resistance between the sealing section 14 and the polymer membrane 20 into consideration. However, on the manufacturing process, the high conductive layer 32 may be formed over an entire surface of the metal thin sheet 30 including the sealing section 14.

Figure 8:
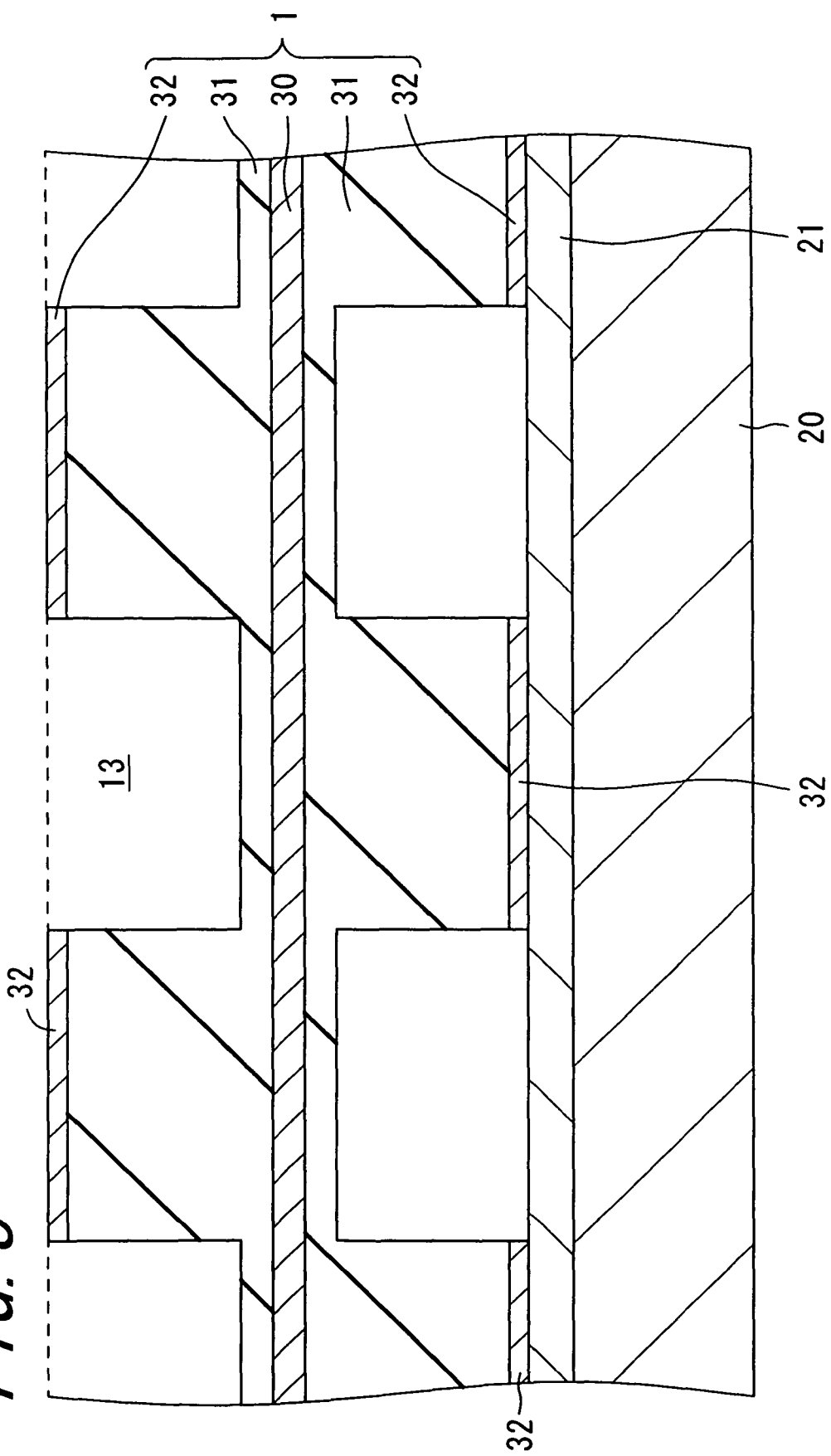
FIG. 8 is an enlarged view illustrating the main portion of the separating section 13 according to a third embodiment.

FIG. 8 is an enlarged view illustrating the main portion of the separating section 13 according to a third embodiment. In the embodiment, the separator 1 is composed of a metal thin layer 30, a rubber layer 31, and a high conductive layer 32. The high conductive layer 32 is formed only in a region on the rubber layer 31 surface which is in contact with the catalytic electrode 21. For the high conductive layer 32, it is possible to use the same carbon-resin compound as that used for the high conductive layer 32 of the second embodiment.

The decrease of the contact resistance thanks to the high conductive layer 32 can bring a sufficient effect when the high conductive layer 32 is formed only in the contact region between the rubber layer 31 and the catalytic electrode 21. Consequently, it is possible to reduce a high conductive layer 32-formed region, thereby effectively decreasing the contact resistance by use of a small amount of the carbon-resin compound.

Figure 9:
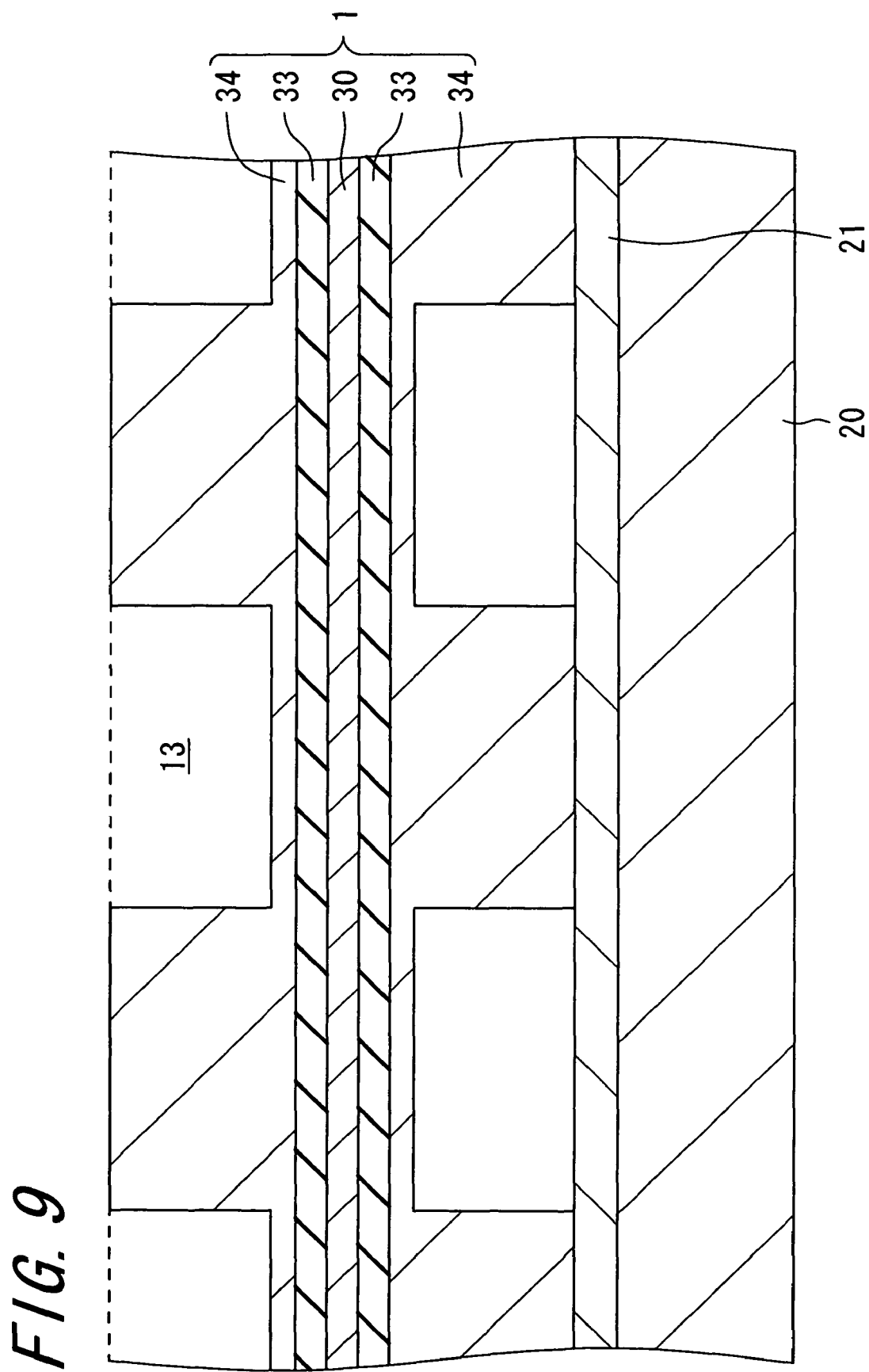
FIG. 9 is an enlarged view illustrating the main portion of the separating section 13 according to a fourth embodiment.

FIG. 9 is an enlarged view illustrating the main portion of the separating section 13 according to a fourth embodiment. In the embodiment, as in the case of the second and third embodiments, the separator 1 is composed of a metal thin sheet, a rubber layer, and a high conductive layer, but as shown in FIG. 9, the rubber layer 33 having a predetermined thickness is formed uniformly on the surface of the metal thin sheet 30, and on the surface of the rubber layer 33 is formed the high conductive layer 34 provided with a groove which will serve as a gas channel in the separating section 13.

By covering the surface of the metal thin sheet 30 with the rubber layer 33 in the separating section 13, it is possible to prevent surface changes such as corrosion caused by the hydrogen gas and oxygen gas and the coolant.

Further, differently from the case of the second embodiment, the most parts of the separating section 13 are formed of the high conductive layer 34, so that it is possible to largely decrease resistance of entire current passages in addition to the contact resistance between the separating section 13 and the catalytic electrode 21, with the result that the rate of power collection can be further enhanced.

For the rubber layer 33, it is possible to use the same rubber as that used for the rubber layer 31 of the first embodiment while for the high conductive layer 34, it is possible to use the same carbon-resin compound as that used for the high conductive layer 32 of the second embodiment. Note that the high conductive layer 34 may be provided on the separating section 13 and the sealing section 14, or as in the case of the second embodiment, the high conductive layer 34 may be provided only in the separating section 13 and does not have to be provided in the sealing section 14.

Note that in the sealing sections 14 of the third and fourth embodiments, the high conductive layer 32 may not be formed, and the rubber layer 31 as shown in FIG. 5 may come into contact with the polymer membrane 20 to effect sealing, otherwise the high conductive layer 32 as shown in FIG. 7 may come into contact with the polymer membrane 20 to effect sealing.

Figure 10:
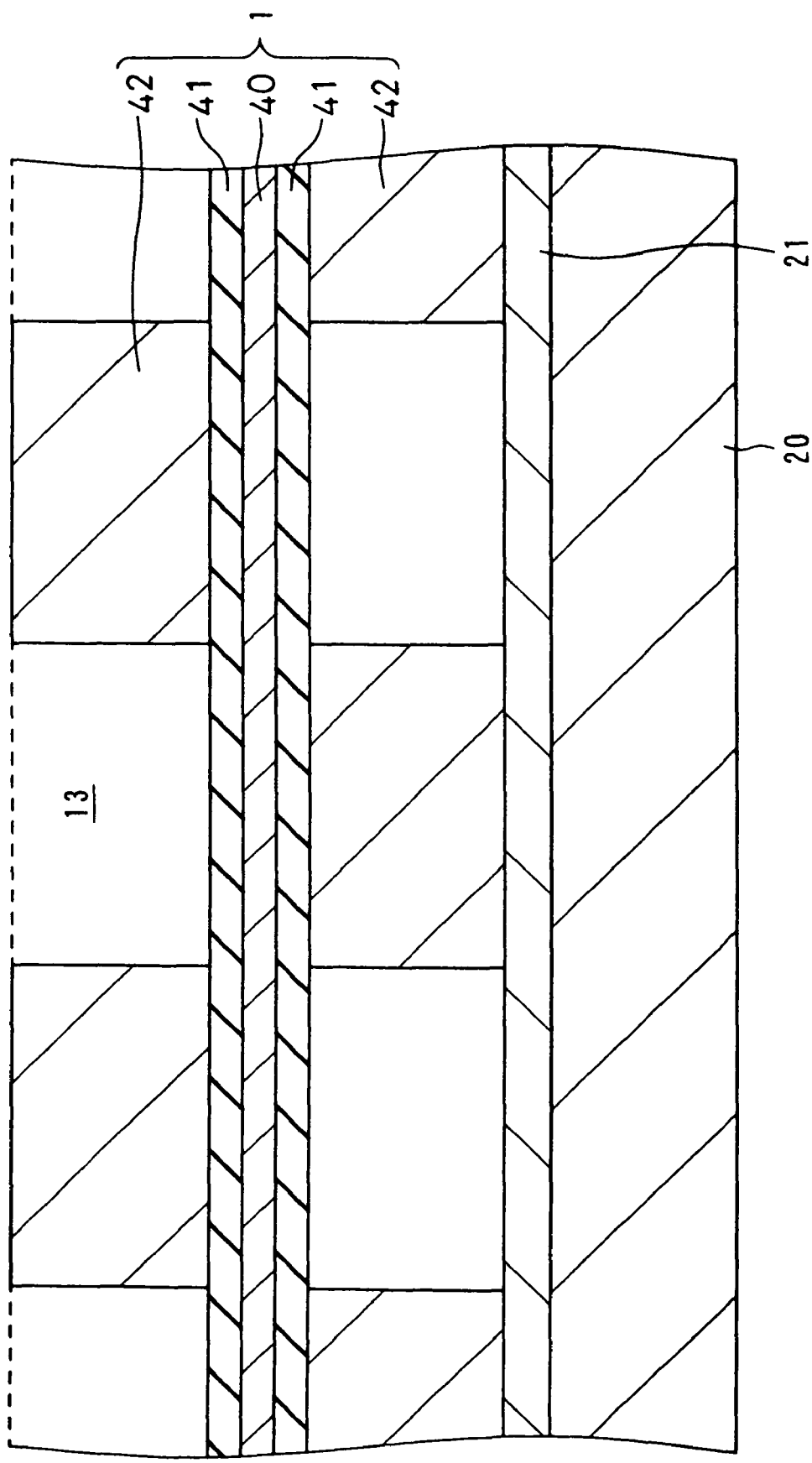
FIG. 10 is an enlarged view illustrating the main portion of the separating section 13 according to a fifth embodiment.

FIG. 10 is an enlarged view illustrating the main portion of the separating section 13 according to a fifth embodiment. On both sides of a metal thin sheet 40 serving as a core member are formed covering layers 41 and furthermore, on the covering layers 41 are formed resin layers 42, and the resin layer 42 of the separating section 13 is provided with parallelly arranged grooves. The grooves of the resin layer 42 constitute the hydrogen gas channel 16 and the oxygen gas channel 17. In the separating section 13, a surface of the metal thin sheet 40 is covered with the covering layer 41, with the result that it is possible to prevent the surface changes such as corrosion caused by the hydrogen gas and oxygen gas and the coolant. For the covering layer 41 and the resin layer 42, it is possible to use rubber (including elastomer) and synthetic resin.

In the separating section 13, the resin layer 42 comes into contact with the catalytic electrode 21 to take out DC power generated at the interface between the polymer membrane 20 and the catalytic electrode 21 as a DC current. The taken-out DC current is then collected by the power collector plate through the metal thin sheet 40.

Since the covering layer 41 thus needs to have electrical conductivity, applicable rubber includes, for example, general-purpose rubbers such as isoprene rubber, butadiene rubber, styrene-butadiene rubber, butyl rubber, and ethylene-propylene rubber; and particular rubber such as epichlorohydrin-containing rubber exhibiting impermeability to gaseous substances and heat resistance, to which a carbon filler is added to give the electrical conductivity. Especially the use of addition-polymerized allyl-series polyisobutylene to which the carbon filler is added, is desirable because of its excellent heat resistance and acid resistance.

Further, the useable synthetic resin materials includes, for example, phenol resin, epoxy resin, and fluorine-containing resin to which the carbon filler is added to give the electrical conductivity. Especially the use of highly corrosion-resistant fluorine-containing resin is preferable. The preferable examples thereof include PTFE (polytetrafluoroethylene), PFA (tetrafluoroethylene-perfluoroalkyl vinylether copolymer), FEP (tetrafluoroethylene-hexafluoropropylene copolymer), EPE (tetrafluoroethylene-hexafluoropropylene-perfluoroalkyl vinylether copolymer), ETFE (tetrafluoroethylene-ethylene copolymer), PCTFE (polychlorotrifluoroethylene), ECTFE (chlorotrifluoroetylene-ethylene copolymer), PVDF (polyvinylidene fluoride), PVF (polyviny fluoride), THV (tetrafluoroethylene-hexafluoropropylene-vinylidene fluoride copolymer), VDF-HFP (vinylidene fluoride-hexafluoropropylene copolymer), and TFE-P (vinylidene fluoride-propylene copolymer), to which the carbon filler is added.

In the embodiment is formed the resin layer 42 provided with a channel groove not through the conventional press work, but through printing. For the resin layer 42, it is possible to use the same rubber as that used for the covering layer 41. Particularly, the rubber preferably used includes polyisobutylene, and the synthetic resin preferably used includes epoxy resin and acrylate resin. Further, the resin layer 42 needs to have electrical conductivity and moreover needs to be able to be formed through printing. The resin layer 42 is formed in such a manner that electrically conductive ink containing a vehicle composed of thermosetting monomer or thermosetting oligomer, and an electrically conductive filler composed of a metal compound or carbon-base material, is prepared to conduct pattern printing onto a covering layer 41 by means of predetermined printing method. This will be described in detail hereinafter.

Figure 11:
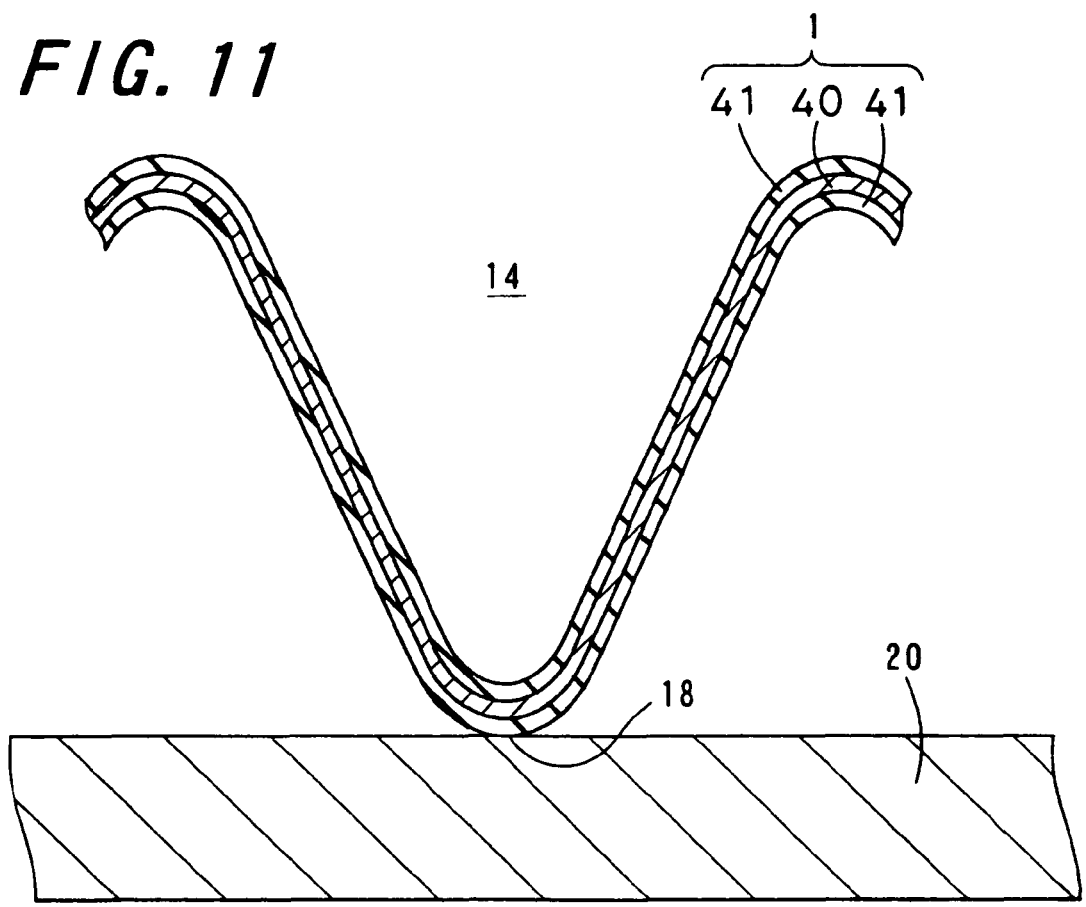
FIG. 11 is an enlarged view illustrating the main portion of the sealing section 14 according to the fifth embodiment.

FIG. 11 is an enlarged view illustrating the main portion of the sealing section 14 according to the fifth embodiment. In the sealing section 14, the covering layer 41 makes contact with the polymer membrane 20 to effect sealing. The sealing section 14 is formed by a press work.

Figure 12:
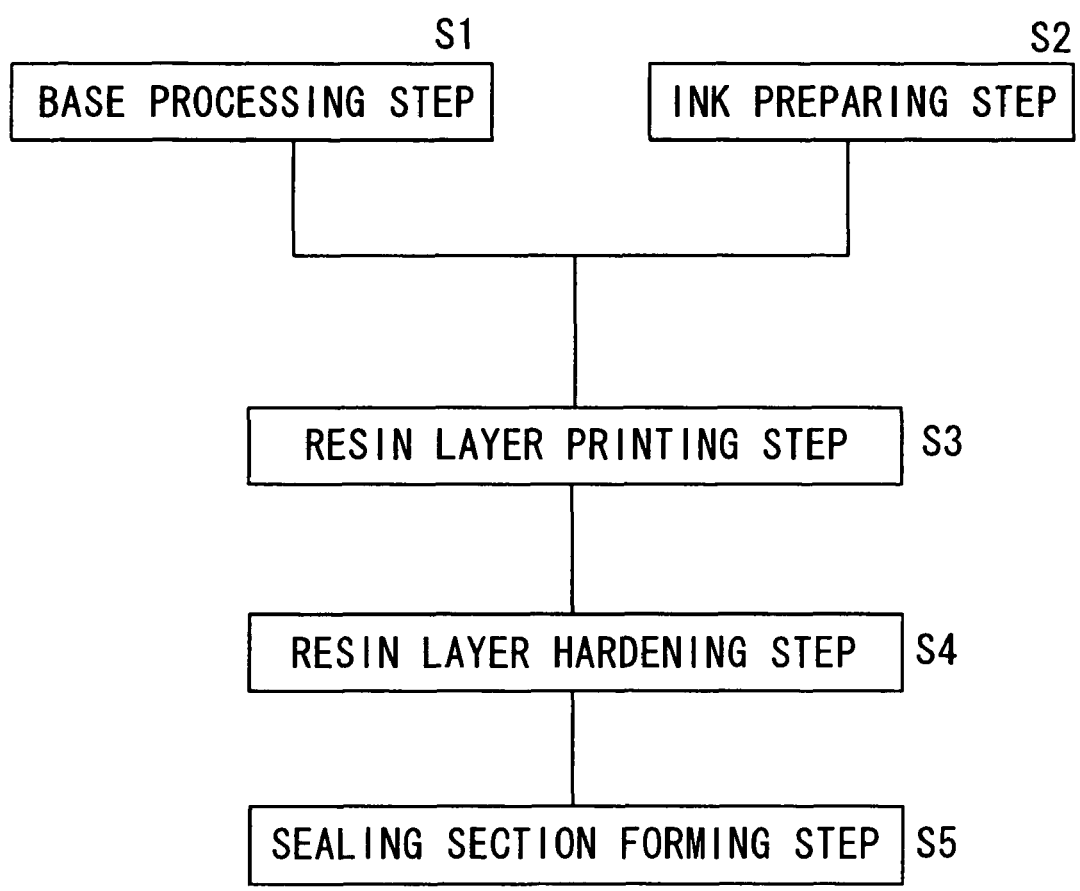
FIG. 12 is a manufacturing process view showing the manufacturing method of the separator.

FIG. 12 is a manufacturing process view showing the manufacturing method of the separator.

The manufacturing process includes a base processing step, an ink preparing step, a resin layer printing step, a resin layer hardening step, and a sealing section forming step.

In order to realize a shape of partition block as shown in FIG. 2, it is necessary to conduct thick film printing such that a thickness of printed ink falls in a range of from approximately 300 µm to 700 µm. Moreover, in order to provide the electrical conductivity for the resin layer 42, the resin layer 42 needs to contain a large amount of the electrically conductive filler.

From a viewpoint of printing workability, it is better that viscosity of the ink is low, however, from the need as described above, ink having relatively higher viscosity must be used. Accordingly, in order to realize required electric characteristics and structural characteristics, a combination of ink, printing method, and hardening process becomes important.

At the base processing step of step S1, in a case of using as the base the metal thin sheet 40 that is, for example, a stainless-steel sheet, in order to ensure the electrical conductivity with respect to the covering layer 41, the surface of the metal thin sheet 40 is subjected to etching or other processes so as to remove a passivation film therefrom so that the covering layer 41 is formed. In detail, in order to obtain a gas flow pathway having predetermined configuration and thickness, die stamping is carried out, and the stamped metal thin sheet has its surface coated with a liquid-type electrically conductive rubber containing an electrically conductive carbon filler, or has its surface laminated with green sheet-like conductive rubber. A vulcanization treatment of the covering layer 41 through heating may be conducted at the base processing step, or at the same time of the hardening of the resin layer 42 at the hereinafter-described resin layer hardening step. Hereinbelow, the metal thin sheet 40 on which the covering layer 41 is formed, may be sometimes referred to as a covered base.

Further, at the ink preparing step of step S2 is prepared the electrically conductive ink to be used at the following resin layer printing step. The electrically conductive ink contains at least a vehicle and an electrically conductive filler, and further contains a polymerization catalyst and other additives for promoting the hardening.

Since the resin layer 42 is made of the above-cited rubber or synthetic resin, the usable vehicle may include thermosetting monomer or thermosetting oligomer for realizing such a resin layer 42. For example, acrylic-base monomer or oligomer, epoxy-base monomer or oligomer, and polyisobutylene oligomer can be used. The preferable acrylic-base monomer or oligomer includes epoxy acrylate, polyester acrylate, and isoboronial acrylate.

The usable electrically conductive filler may include a metal compound or a carbon-base material. The preferable metal compound includes, for example, strontium carbide, strontium nitride, and cesium oxide. The carbon-base material includes a powdery material and a fibrous material. The preferable powdery material includes artificial graphite, natural graphite, and carbon black, and the preferable fibrous material includes carbon fiber, carbon nanotube, and carbon nanofiber.

Depending on the vehicle used, a process to be performed at the following resin layer hardening step is selected from a thermosetting process, a photosetting process, and both of these processes and moreover, a polymerization catalyst to be used is also selected from a thermal polymerization catalyst, a photo polymerization catalyst, and both of these catalysts. For the photosetting process, it is preferable to use as an irradiating light a light having a wavelength ranging from a visible light region to a near-infrared light region. For the photo polymerization catalyst, it is preferable to use a combination of a boron compound and a photosensitive dye, and a combination of aminomethacrylate and camphorquinone.

The other usable additives may include a viscosity reducer.

At the resin layer printing step of step S3, a region of covered base surface corresponding to the separating section 13 is treated by pattern printing with the electrically conductive ink prepared at the ink preparing step so that a print ink layer is formed. The print ink layer is a layer in a yet-to-be hardened condition as a resin layer, provided with a channel groove, and formed into the substantially same shape as that of the intended resin layer 42.

The electrically conductive ink contains a large amount of the electrically conductive filler, resulting in high viscosity and thus high consistency for forming the channel groove. Taking this into consideration, preferable are a gravure printing using an engraved plate formed of a silicone rubber having a recess formed therein, a stencil printing using a stencil plate formed of a metal plate having a print pattern hole formed therein, and a screen printing using a screen formed of a gauze having a print pattern hole formed therein by resist pattern.

In general, the stencil printing is more preferable for ink having higher viscosity while the screen printing is more preferable for ink having lower viscosity. For ink having a middle viscosity therebetween, the gravure printing is preferable. For microscopical planar patterns such as a pitch of the channel groove, the screen printing and the stencil printing are suitable. As to a pattern cross-sectional shape, considering a deformation volume or other elements, the gravure printing is the most suitable.

At the resin layer printing step, a printing method suitable for the electrically conductive ink may be selected according to characteristics such as electrical conductivity and a channel pitch, which are required for the separator.

At the resin layer hardening step of step S4, depending on the vehicle of the used electrically conductive ink, a process to be conducted is selected from the thermosetting process, the photosetting process, and both of these processes. In a case of providing a rubber layer for the resin layer 42, polyisobutylene oligomer, for example, is used for the vehicle and hardened by heating. In a case of providing a synthetic resin layer for the resin layer 42, epoxy acrylate, for example, is used and hardened by light irradiation and heating.

In a case of the thermosetting process, hardening can be effected inside the print ink layer even with a large thickness thereof, but it takes a long time until completion of hardening. In a case of the photosetting process, a length of time necessary for hardening is short, but it is difficult to harden the entire print ink layer because hardening is effected only in a part of the print ink layer in depth to which an irradiating light reaches. In a case of performing both of the photosetting and the thermosetting, a surface layer of the print ink layer is previously hardened by light irradiation and then, the entire layer is hardened by heating.

In the photosetting process, when an ultraviolet light is used as the irradiating light, the ultraviolet light has large energy for hardening because of its short wavelength, but a depth to which the ultraviolet light reaches is shallow and therefore, the ultraviolet is not suitable for hardening of such a thick membrane as being dealt with at least one embodiment of the invention. Consequently, it is preferable to perform the irradiation of a light having a wavelength ranging from that of a visible light to that of a near-infrared light. Moreover, a lamp serving as a light source emits not only light but also heat, so that the hardening may be promoted by the heat from the lamp. Furthermore, a previous treatment of the metal thin sheet with preheating during printing or before printing leads good ink adhesion and also promotion of the hardening.

In the thermosetting process, heating in a heating furnace and electromagnetic wave heating through irradiation with electromagnetic wave are preferable.

At the base processing step, the resin layer printing step, and the resin layer hardening step, the metal thin sheet may be supplied in a roll form or in form of pieces which are previously cut into an outer size of the separator.

At the sealing section forming step of step S5, a sealing projection is formed in a region corresponding to the sealing section 14 of the covered base by a press work. As shown in FIG. 3, when assembling the PEFC, a shape of the sealing projection is determined so that the sealing projection is brought into pressure-contact with the polymer membrane 20 under a resilient force, and the sealing projection of the determined shape is formed by the press work. In a case of providing the covered base in a roll form, at the sealing section forming step, the sealing projection is formed by one pressing and stamped out into the outer size of the separator to obtain the separator 1. Further, the formation of the sealing projection and the stamping out into the outer size may be carried out by continuous two pressings.

The separator 1 thus obtained is laminated alternatively with the fuel cell 2 at the assembling step and furthermore, a power collector plate 3, an insulating sheet 4, an end flange 5, and an electrode wiring 12 are added so that assembling is carried out to form the PEFC 100 having the structure as shown in FIG. 1.

As described above, by carrying out printing to form the resin layer 42 provided with the channel groove, when compared to the case of using the conventional press work, the dimensional accuracy is high and moreover, the warp and the deformation are not generated. Accordingly, it is possible to enhance productivity of the separator and to realize a high yield.

Furthermore, in a case where it is not possible to obtain a sufficiently intimate contact between the metal thin sheet 40 and the covering layer 41, the separator 1 may be provided with an adhesive layer between the metal thin sheet and the covering layer.

Figure 13:
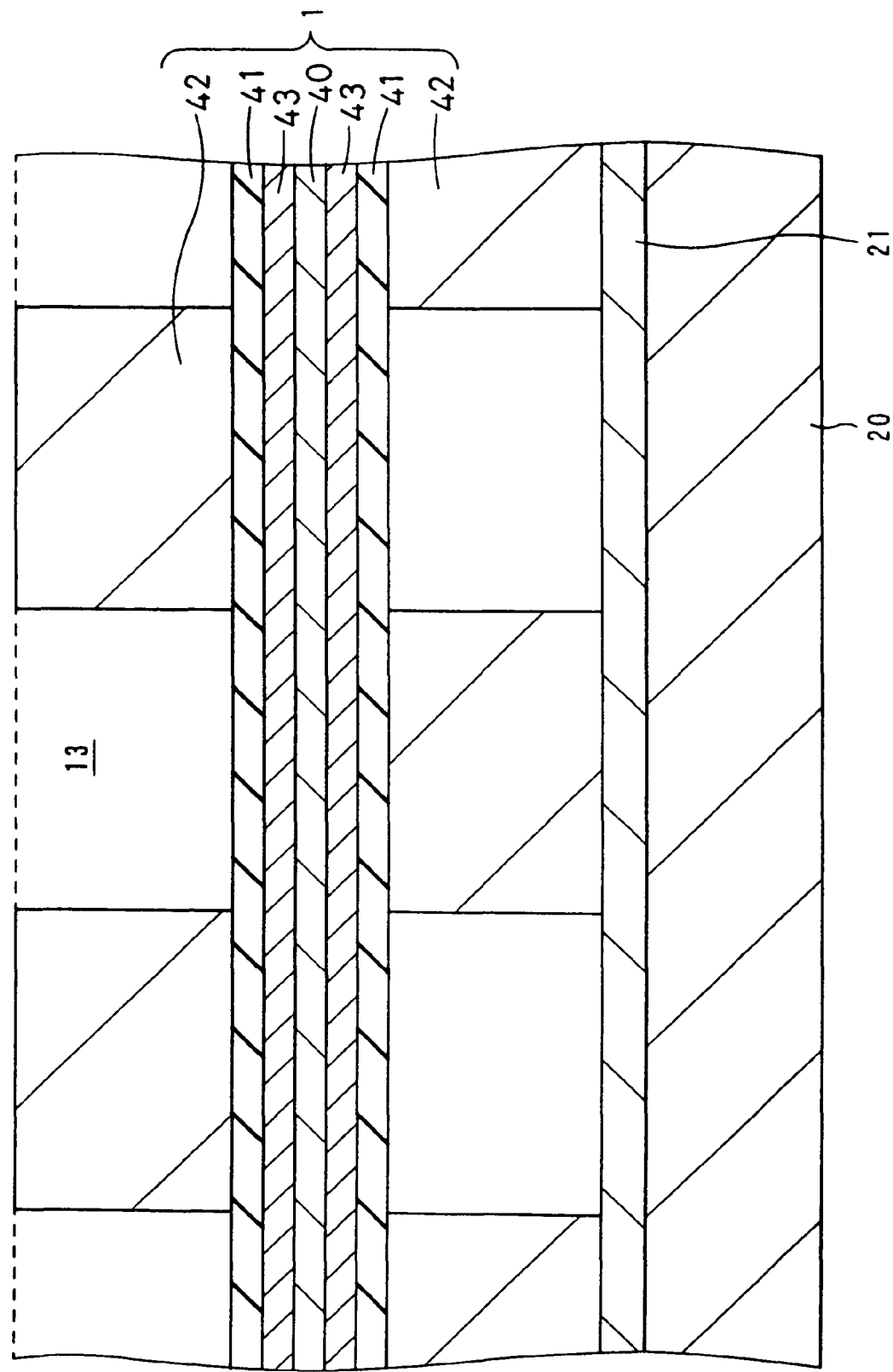
FIG. 13 is an enlarged view illustrating the main portion of the separating section 13 according to a sixth embodiment.
Figure 14:
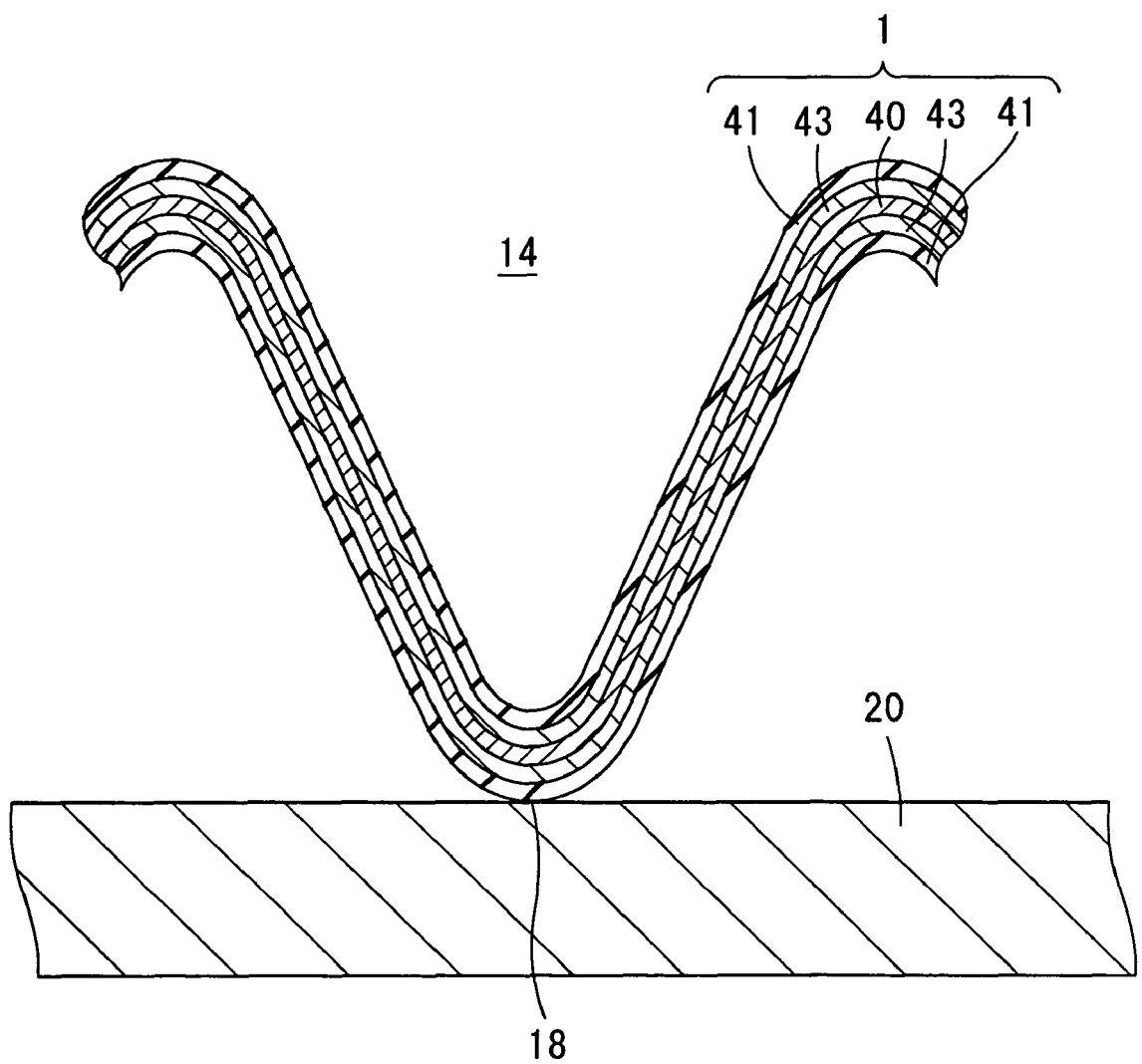
FIG. 14 is an enlarged view illustrating the main portion of the sealing section 14 according to of the sixth embodiment.

FIG. 13 is an enlarged view illustrating the main portion of the separating section 13 according to a sixth embodiment. FIG. 14 is an enlarged view illustrating the main portion of the sealing section 14 according to the sixth embodiment. In the sixth embodiment, the metal thin sheet 40 and the covering layer 41 are adhered to each other via an adhesive layer 43. A diffusion layer which will serve as the adhesive layer 43 is formed on the surface of the metal thin sheet 40 through application of a coating of an electrically conductive coupling agent typified by a triazinethiol-base compound, as well as a coating of doped electrically conductive polymer typified by a polyaniline-base compound. The triazinethiol- or polyaniline-base compound diffused over the surface of the metal exhibits electrical conductivity, thus ensuring electrical conductivity with respect to the resin layer 42 so as to take out a generated DC power as a DC current. Note that in the manufacturing process, the adhesive layer 43 is formed before forming the covering layer 41 at the base processing step of step S1 and immediately after the passivation film is removed from the surface of the metal thin sheet 40 by etching or other processes.

Furthermore, the separator 1 may have a constitution having a high conductive layer provided on a surface of the resin layer.

Figure 15:
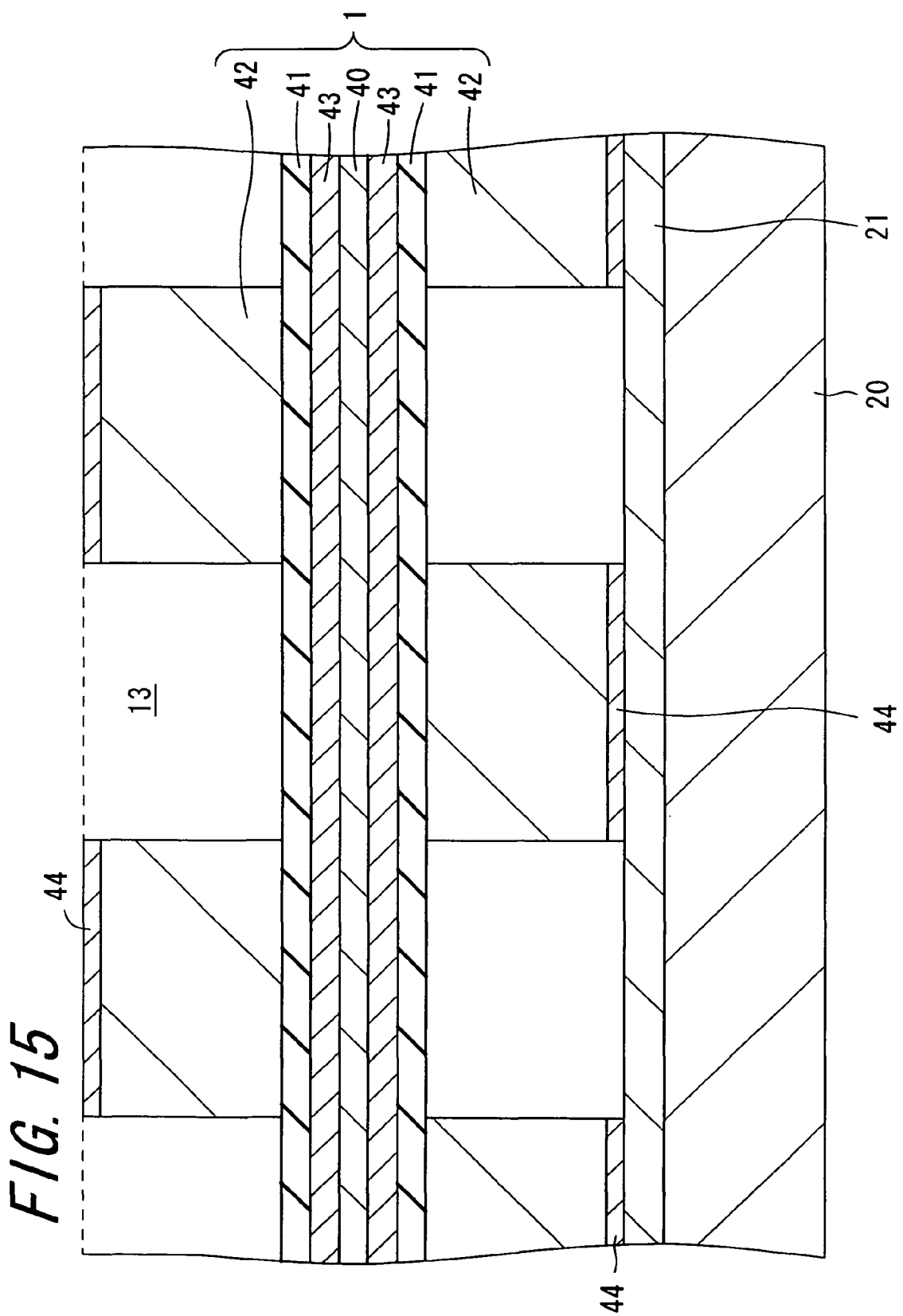
FIG. 15 is an enlarged view illustrating the main portion of the separating section 13 according to a seventh embodiment.

FIG. 15 is an enlarged view illustrating the main portion of the separating section 13 according to a seventh embodiment. In the seventh embodiment, a high conductive layer 44 is formed only in a region of the resin layer 42 surface, which is in contact with the catalytic electrode 21.

In a case where the rate of power collection obtained is not sufficient because of a high contact resistance between the resin layer 42 and the catalytic electrode 21, by forming the high conductive layer 44 on the surface of the resin layer 42, it is possible to decrease the contact resistance between the resin layer 42 and the catalytic electrode 21 and thereby increase the rate of power collection. It is preferable to use a mixture of a binder resin and carbon (hereinbelow referred to as "a carbon-resin compound") for the high conductive layer 44. In the high conductive layer 44, the high electrical conductivity is realized by carbon, and gas permeability is reduced by the binder resin. Although electric resistance of the high conductive layer 44 is reduced more with an increased carbon content of the carbon-resin compound, a content of the binder resin is decreased so that the gas permeability is made to increase. Considering balance between the electric resistance and the gas permeability, it is preferred that a rate of the resin content of the carbon-resin compound be within a range of from 20% to 30%. The contained carbon includes, for example, artificial graphite, carbon fiber, carbon nanotube, and fullerene and particularly, it is preferable to use the artificial graphite. For the binder resin, it is preferable to use polyisobutylene rubber or other substances.

Moreover, as the high conductive layer 44, the mixture needs to be applied only to the region of the resin layer 42 surface, which makes contact with the catalytic electrode 21. With respect to decrease in the contact resistance by use of the high conductive layer 44, the formation of the high conductive layer 44 only in the contact region between the resin layer 42 and the catalytic electrode 21 brings a sufficient effect. Consequently, a decrease of a region in which the high conductive layer 44 is formed, can lead to effective lowering of the contact resistance by use of a small amount of the carbon-resin compound.

In the manufacturing process, after the resin layer printing step or after the resin layer hardening step, a high conductive layer forming step is carried out. At the high conductive layer forming step, the carbon-resin compound is applied so as to have a predetermined thickness thereof, to the surface of the resin layer. In a case of carrying out the high conductive layer forming step after the resin layer printing step, the high conductive layer as well as the resin layer are hardened by the thermosetting process at the resin layer hardening step. In a case of treating the resin layer with the photosetting process, the application of the carbon-resin compound before the hardening makes it impossible to harden the rein layer and therefore, the high conductive layer is hardened by heating after the photosetting process has been conducted.

Furthermore, even when the high conductive layer 44 is a thin film layer, its effect can be sufficiently obtained. Accordingly, the high conductive layer 44 can be formed in such a simple process that alcoholic dispersion of carbon particles is sprayed on the print ink layer which is in a wet condition after the resin layer printing step, by a spray so as to have a thickness of several μm, and then dried to be solidified.

As descried above, in the separator 1, by covering the surface of the metal thin sheet 40 with the covering layer 41, it is possible to prevent the surface changes such as corrosion caused by the hydrogen gas and oxygen gas and the coolant. The resin layer 42 for providing the gas channel in the separating section 13 is formed of the electrically conductive ink by means of the predetermined printing method, thereby leading higher dimensional accuracy and causing no warp and deformation, when compared to the case of using the conventional press work. Accordingly, it is possible to enhance productivity of the separator 1 and to realize a high yield. Furthermore, the channel pattern being formed has a highly enhanced degree of design freedom. For example, in a case of the press work, the pattern is formed so that two sides thereof are integrated and moreover, more and more patterns have liner shapes. This limits the design of the pattern. However, the printing enables formation of completely different patterns on both sides of the separator 1, and also enables formation of patterns including a curve-shaped pattern and a hole-shaped pattern. Further, The sealing section 14 is formed by a press work, and it is thus possible to realize the high sealability by means of a simple process.

Further, providing the high conductive layer 44 in the separating section 13 can largely decrease the contact resistance between the catalytic electrode 21 and the separator 1, so that the rate of power collection can be further enhanced.

Note that the metal thin sheet is used for the core member of the separator 1 in the above description, but there may be used high conductive and high-strength resins such as high conductive carbon fiber reinforced plastics (CFRP).

The separator 1 was produced under conditions shown in the following Examples 1 to 3 as examples of manufacturing method for providing a channel groove through a printing method.

EXAMPLE 1

In Example 1, the resin layer 42 was formed of polyisobutylene by use of the stencil printing.

Ink Composition

Vehicle: 100 parts by weight of polyisobutylene oligomer (manufactured by Kanebuchi Chemical Industry Co., Ltd, tradename: EPION)

Electrically Conductive Filler: 750 parts by weight of spheroidal graphite (manufactured by Nippon Graphite Industry Co., Ltd), and 50 parts by weight of electrically conductive carbon black (manufactured by Tokai carbon Co., Ltd, tradename: #5500)

Polymerization Catalyst: 4 parts by weight of organosilicon hydroxylation catalyst Stencil Plate Plate thickness: 1 mm Width of Opening: 1 mm Pitch of Opening: 2 mm Hardening Method Thermosetting process: 100° C. for 30 minutes or 200° C. for 5 to 7 minutes

EXAMPLE 2

In Example 2, the resin layer 42 was formed of epoxy resin by use of the screen printing.

Ink Composition

Vehicle: 100 parts by weight of epoxy acrylate (manufactured by Showa Highpolymer Co., Ltd, tradename: Ripoxy SP1507)

Electrically Conductive Filler: 550 parts by weight of scaly graphite (manufactured by Chuetsu Graphite Industry Co., Ltd, tradename: BF series), and 100 parts by weight of electrically conductive carbon black (manufactured by Tokai carbon Co., Ltd, tradename: #5500)
Polymerization Catalyst: 0.3 part by weight of dye-borate bimolecular photopolymerization initiator
    Hardening Method
Photosetting and Thermosetting processes: a metal halide lamp (manufactured by Mitsubishi Electric Lighting Co., Ltd, HQI-TS-250W/D) is used as a light source. Positioning is 10 cm away and an irradiation time is 3 minutes.
    Screen
A stainless steel screen is used, and printing is carried out by a solder paste screen printer.

EXAMPLE 3

In Example 3, the resin layer 42 was formed of epoxy resin by use of the gravure printing.
    Ink Composition
Vehicle: 100 parts by weight of epoxy acrylate (manufactured by Showa Highpolymer Co., Ltd, tradename: Ripoxy SP1507)
Electrically Conductive Filler: 550 parts by weight of scaly graphite (manufactured by Chuetsu Graphite Industry Co., Ltd, tradename: BF series) and 1 part by weight of gas phase method carbon fiber (manufactured by Showa Denko Co., Ltd, tradename: VGCF)
Polymerization Catalyst: 0.3 part by weight of dye-borate bimolecular photopolymerization initiator
    Hardening Method
Photosetting and Thermosetting processes: a metal halide lamp (manufactured by Mitsubishi Electric Lighting Co., Ltd, HQI-TS-250W/D) was used as a light source, which was positioned 10 cm away and used for irradiation, followed by heating under 150° C. for 7 minutes in a heating furnace.
    Engraved Plate (Silicone Rubber Plate)
Plate thickness: 5 mm
Width of Engraved portion: 1 mm
Pitch of Engraved portion: 2 mm
Depth of Engraved portion: 700 μm
    Mechanical characteristics and electric characteristics of the respective Examples are shown in Table. 1.

TABLE 1

| | Specific volume resistivity [mΩ · cm] | Contact resistivity [mΩ · cm$^2$] | Hardness [Shore D] | Layer Thickness [μm] |
|---|---|---|---|---|
| Example 1 (Stencil Printing) | 22 | 10 | 58 | 700 |
| Example 2 (Screen Printing) | 25 | 12 | 77 | 300 |
| Example 3 (Gravure Printig) | 30 | 9 | 66 | 500 |

Note that the contact resistivity was measured by use of the high conductive layer formed by spraying an ethyl alcohol dispersion of the electrically conductive carbon black (manufactured by Tokai Carbon Co., Ltd, tradename: #5500) onto the print ink layer which had been in a wet condition after the resin layer printing step, by a spray so that its dried film would have a thickness of from 2 to 3 μm, and then being solidified.

Figure 16:
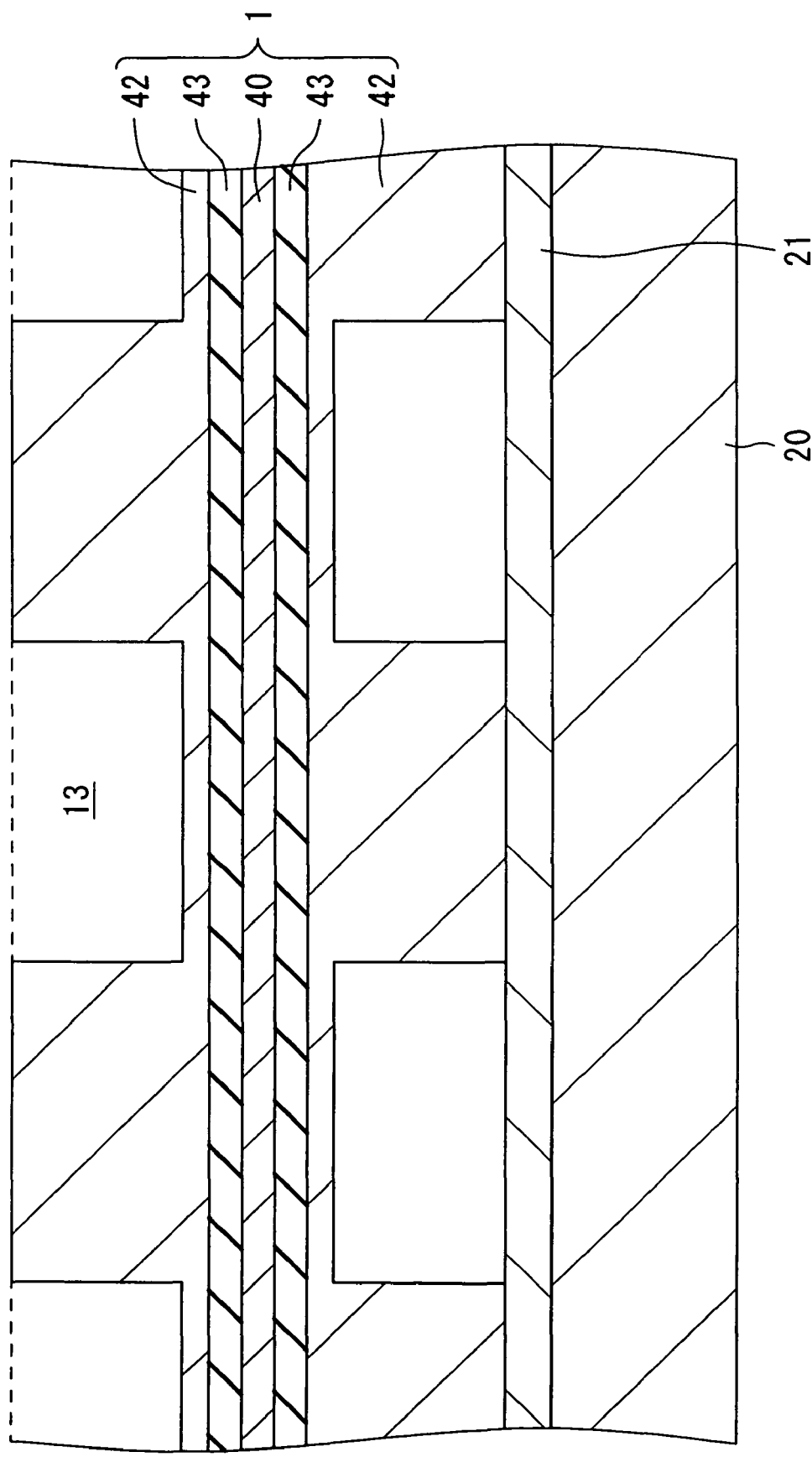
FIG. 16 is an enlarged view illustrating the main portion of the separating section 13 according to an eighth embodiment.
Figure 17:
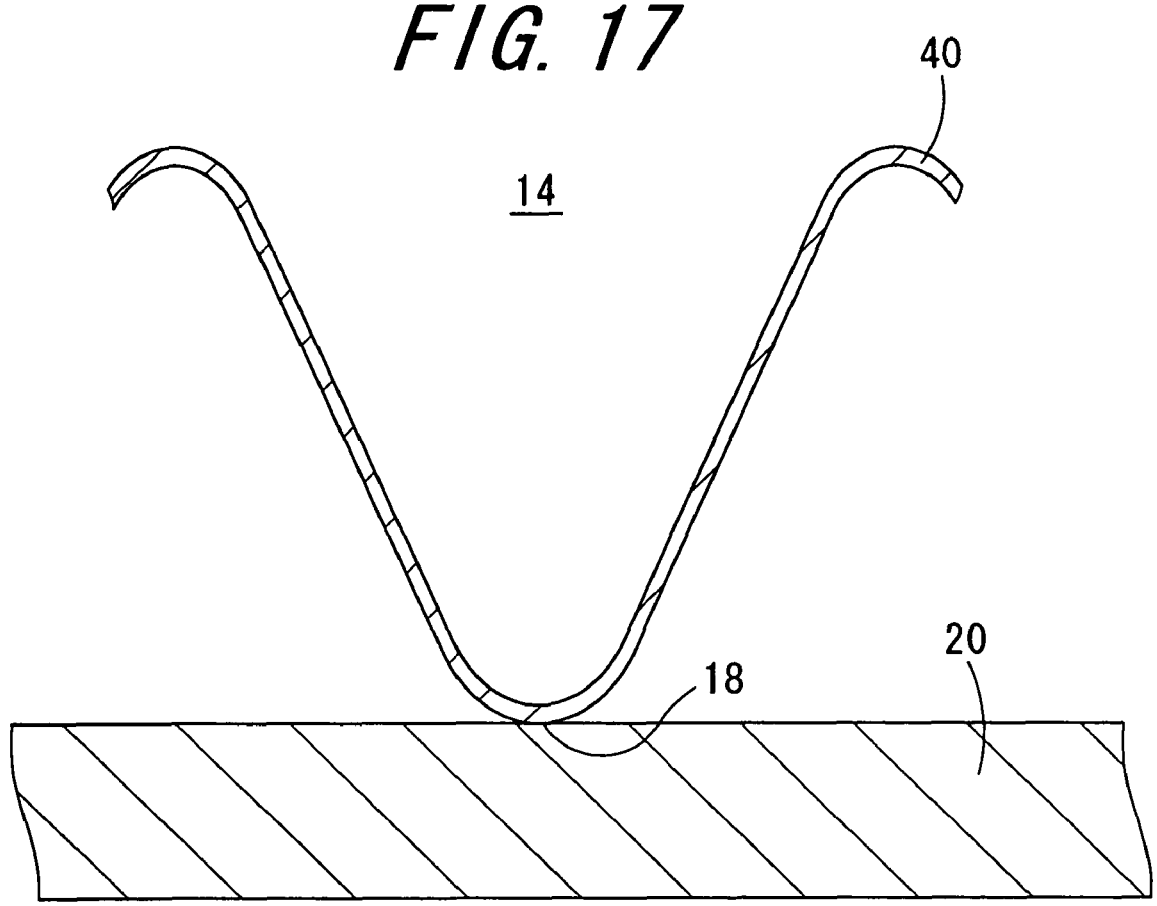
FIG. 17 is an enlarged view illustrating the main portion of the sealing section 14 according to the eighth embodiment.

(Characteristics Evaluation Method)
Specific Volume Resistivity: In conformity with a four-point probe array (JIS K7194)
Contact Resitivity: Electrical resistance meter (ohmmeter)
Hardness: Converted [Shore D] from a measured value through a micro hardness tester
    The separators manufactured in Examples 1 to 3 were homogeneous without any unhardened parts, and each adherability of the resin layer 42 was favorable. Further, as shown in FIG. 1, the obtained mechanical characteristics and electric characteristics were enough for functions as a separator.
    FIG. 16 is an enlarged view illustrating the main portion of the separating section 13 according to an eighth embodiment. On both sides of the metal thin sheet 40 serving as a core member are formed the resin layers 42, and the resin layer 42 of the separating section 13 is provided with parallelly arranged grooves. These grooves provided in the resin layer 42 constitute the hydrogen gas channel 16 and the oxygen gas channel 17. For the resin layer 42, it is possible to use rubber (including elastomer) and synthetic resin.
    In the separating section 13, the resin layer 42 comes into contact with the catalytic electrode 21 to take out DC power generated at the interface between the polymer membrane 20 and the catalytic electrode 21 as a DC current. The taken-out DC current is then collected by the power collector plate through the metal thin sheet 40.
    The adhesive layer 43 is created as a diffusion layer on the surface of the metal thin sheet through application of a coating of an electrically conductive coupling agent typified by a triazinethiol-base compound, as well as a coating of doped electrically conductive polymer typified by a polyaniline-base compound. The triazinethiol- or polyaniline-base compound diffused over the surface of the metal exhibits electrical conductivity, thus ensuring electrical conductivity with respect to the resin layer 42 so as to take out a generated DC power as a DC current.
    In the present embodiment, the conventional press work is not employed, but electrically conductive green sheets are laminated and then, an electrically conductive green sheet is molded so as to have concavity and convexity formed therein by use of a stamper, with the result that the resin layer 42 provided with the channel groove is formed. Since the resin layer 42 needs to have electrical conductivity, rubber or synthetic resin containing an electrically conductive filler can be used for the resin layer 42. Particularly, the rubber preferably used includes polyisobutylene, and the synthetic resin preferably used includes epoxy resin and acrylate resin, and more preferably used is resin having a structure of interpenetrating polymer network (abbreviate as IPN) in which the epoxy resin and the acrylate resin are combined. Further, the resin layer 42 is formed as the electrically conductive green sheet, and needs to be able to be provided with a channel molded therein by use of the stamper. First of all, a composition containing a binder composed of thermosetting monomer, thermosetting oligomer, or thermosetting prepolymer, and an electrically conductive filler composed of a metal compound or a carbon-base material, is prepared so that the electrically conductive green sheet is formed. This electrically conductive green sheet is laminated on the surface of the metal thin sheet and then, the electrically conductive green sheet is molded so as to have the concavity and convexity formed therein by use of the stamper (mold) provided with a predetermined transfer pattern, with the result that the resin layer 42 is formed.
    FIG. 17 is an enlarged view illustrating the main portion of the sealing section 14 according to the eighth embodiment. In the sealing section 14, the metal thin sheet 40 makes contact with the polymer membrane 20 to effect sealing. The sealing section 14 is formed by a press work.

Figure 18:
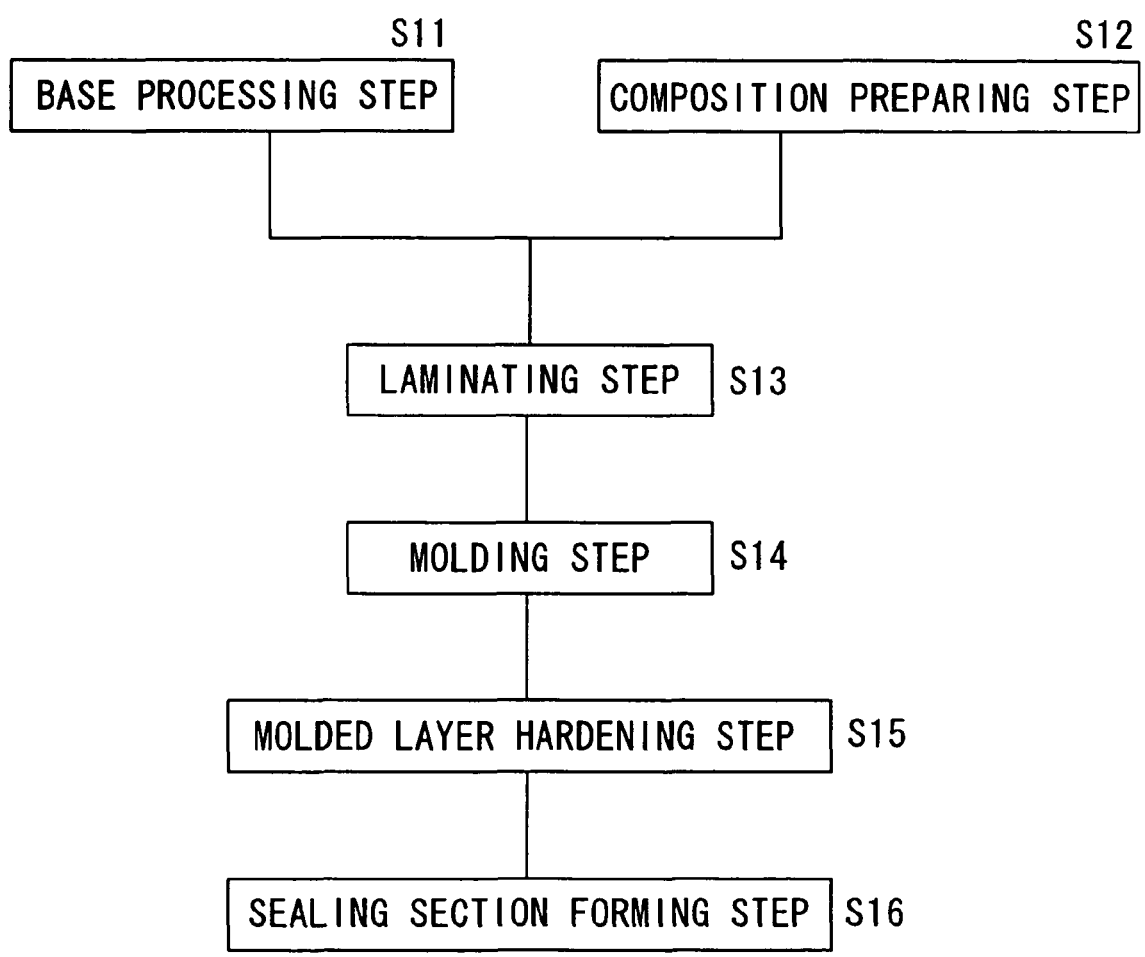
FIG. 18 is a manufacturing process view showing the manufacturing method of the separator.

FIG. 18 is a manufacturing process view showing the manufacturing method of the separator.

The present manufacturing process includes a base processing step, a composition preparing step, a laminating step, a molding step, a molded layer hardening step, and a sealing section forming step.

In order to realize a shape of the partition block as shown in FIG. 2 through molding by use of the stamper, it is necessary to form such a thick film that the molded resin layer has a thickness of approximately from 300 μm to 700 μm. Moreover, the resin layer 42 needs to contain a large amount of the electrically conductive filler in order to provide the electrical conductivity.

The need of the thick film, a composition having high viscosity must be used. Accordingly, in order to realize the required electric characteristics and structural characteristics, a composition for forming the electrically conductive green sheet becomes important.

At the base processing step of step S11, in a case of using as the base the metal thin sheet 40 that is, for example, a stainless-steel sheet, in order to ensure the electrical conductivity with respect to the covering layer 31, the surface of the metal thin sheet 40 is subjected to etching or other processes so as to remove a passivation film therefrom so that the adhesive layer 43 is formed. In detail, in order to obtain a predetermined configuration and gas flow pathways, die stamping is carried out, and the stamped metal thin sheet has its surface coated with an electrically conductive coupling agent typified by a triazinethiol-base compound, as well as doped electrically conductive polymer typified by a polyaniline-base compound.

Further, at the compositing preparing step of step S12 prepared is a composition for an electrically conductive green sheet (hereinbelow referred simply to as "an electrically conductive composition") which will be used at the following laminating step.

In order to realize a low-cost production, it is desirable that not only a row material but also its processing step be suitable for mass production. Accordingly, it is desirable that a liquid binder having reactivity be mixed with a large amount of the electrically conductive filler to prepare the electrically conductive composition which contains polymerization catalyst and other additives for promoting hardening.

Since the resin layer 42 is formed of rubber or synthetic resin, the binder preferably used is thermosetting monomer, thermosetting oligomer, or thermosetting prepolymer for realizing such a resin layer 42. Particularly, hardening will be carried out by means of combination of the photosetting process and thermosetting process at the following molded layer hardening step and therefore, it is preferable to use photosetting monomer, photosetting oligomer or photosetting prepolymer. For example, acrylic-base monomer or oligomer, epoxy-base monomer or oligomer, and polyisobutylene oligomer can be used. The preferable acrylic-base monomer or oligomer includes epoxy acrylate, polyester acrylate, and isoboronial acrylate.

The usable electrically conductive filler may include a metal compound or a carbon-base material. The preferable metal compound includes, for example, strontium carbide, strontium nitride, and cesium oxide. The carbon-base material includes a powdery material and a fibrous material. The preferable powdery material includes artificial graphite, natural graphite, and carbon black, and the preferable fibrous material includes carbon fiber, carbon nanotube, and carbon nanofiber.

Photosetting reactions include acrylic-base radical polymerization reaction and epoxy-base cation polymerization reaction. Particularly, in a case of using resin having an IPN structure composed of epoxy resin and acrylate resin, cation polymerization initiator and radical polymerization initiator are added to the electrically conductive composition.

The other usable additives may include a viscosity reducer.

The above substances constituting the electrically conductive composition will be more specifically exemplified.

Lipophilic acrylic-base monomers include dicyclopentanyl(meth)acrylate, benzyl(meth)acrylate, phenoxethyl(meth)acrylate, tribromobenzyl(meth)acrylate, tribromophenoxy ethyl(meth)acrylate, biphenylethoxy(meth)acrylate, biphenylepoxy(meth)acrylate, naphthylethoxy(meth)acrylate, fluorene epoxy(meth)acrylate, bisphenol A di(meth)acrylate, tetrabromobisphenol A di(meth)acrylate, ethoxy-denatured bisphenol A di(meth)acrylate, tetrabromo ethoxy-denatured bisphenol A di(meth)acrylate, bisphenol A epoxy di(meth)acrylate, ethoxy-denatured bisphenol A epoxy di(meth)acrylate, tetrabromobisphenol A epoxy di(meth)acrylate, and tetrabromo ethoxy-denatured bisphenol A epoxy di(meth)acrylate.

Hydrophilic acrylic-base monomers include: ethylene glycol-series (meth)acrylate such as 2-hydroxyethyl(meth)acrylate, hydroxypropyl acrylate, 4-hydroxybutyl acrylate, 2-methacroyl oxyethyl-2-hydroxypropyl acrylate, N,N-dimethyl acrylamide, N,N-diethyl acrylamide, acryloyl morpholine, N,N-dimethyl aminopropyl acrylamide, isopropyl acrylamide, dimethylamino ethyl acrylate, 2-hydroxy-3-phenoxy propyl acrylate, ethylene glycol di(meth)acrylate, and diethylene glycol di(meth)acrylate; glycerin (meth)acrylate ester-base compounds such as trimethylolpropane (meth)acrylate; ester (meth)acrylate of diol-base compounds such as hexanediol di(meth)acrylate; and neopentyl di(meth)acrylate.

The epoxy resin includes aromatic epoxy resin, alicyclic epoxy resin, and aliphatic epoxy resin. The aromatic epoxy resin includes polyglycidyl ether of polyhydric phenol having at least one aromatic nuclear, or of its alkylene oxide adduct, the glycidyl ether which is produced by reaction of, for example, bisphenol A, bisphenol F, or its alkylene oxide adduct and epichlorohydrin; and epoxy novolac resin. Further, the alicyclic epoxy resin includes polyglyncidyl ether of polyalcohol having at least one alicyclic ring; a cyclohexene oxide- or cyclopentene oxide-containing compound obtained by epoxidation of a cyclohexane- or cyclopentene-ring containing compound by use of hydrogen peroxide or other proper oxidant which is hyperacid.

Monomers of the alicyclic epoxy resin include, for example, hydrogen-added bisphenol A diglycidyl ether; 3,4-epoxycyclohexylmethyl-3',4'-epoxycyclohexane carboxylate; 2-(3,4-epoxycyclohexyl-5,5-spiro-3,4-epoxy) cyclohexane-meta-dioxane; bis(3,4-epoxy cyclohexylmethyl) adipate; vinylcyclohexane dioxide; 4-vinylepoxycyclohexane; bis(3,4-epoxy-6-methyl cyclohexyl-3,4-epoxy-6-methyl cyclohexane) carboxylate; methylene bis(3,4-epoxycyclohexane); dicyclopentanediene diepoxide; di(3,4-epoxycyclohexylmethyl) ether of ethylene glycol; ethylene bis(3,4-epoxycyclohexane carboxylate); dioctyl epoxy hexahydrophthalate; and di-2-ethylhexyl hexahydrophthalate.

Monomers of the aliphatic epoxy resin include, for example, polyglycidyl ether of aliphatic polyalcohol or of its alkylene oxide adduct; aliphatic long-chain polyacid polyglycidyl ester; and homopolymer and copolymer of glycidyl acrylate and glycidyl methacrylate, of which typical examples include: diglycidyl ether of 1,4-butandiol; diglycidyl ether of 1,6-hexanediol; triglycidyl ether of glycerin;

triglycidyl ether of trimethylolpropane; diglycidyl ether of polyethylene glycol; diglycidyl ether of polypropyrene glycol; polyglycidyl ether of polyether polyol obtained by adding one or more alkylene oxides to aliphatic polyalcohol such as ethylene glycol, propyrene glycol, and glycerin; and aliphatic long-chain diacid diglycidyl ether. Furthermore, the monomers of the aliphatic epoxy resin include, for example, monoglycidyl ether of aliphatic higher alcohol; phenol; cresol; butyl phenol; or monoglycidyl ether of polyether alcohol obtained by adding alkylene oxide to phenol, cresol, and butyl phenol; glycidyl ester of higher fatty acid; epoxidized soybean oil; butyl epoxy stearate; octyl epoxy stearate; epoxidized linseed oil; and epoxidized polybutadiene sugar.

Furthermore, examples of cation polymerization active substances other than the epoxy resin include: oxetane compounds such as trimethyl oxide, 3,3-dimethyl oxetane, and 3,3-dichloromethyl oxetane; oxolane compounds such as tetrahydrofuran and 2,3-dimethyltetrahydrofuran; cyclic acetal compounds such as trioxane, 1,3-dioxolane, and 1,3,6-trioxanecyclooctane; cyclic lactone compounds such as β-propiolactone and ε-caprolactone; thiirane compounds such as ethylene sulfide and thioepichlorohydrin; thietane compounds such as 1,3-propyrene sulfide and 3,3-dimethylthietane; vinyl ether compounds such as ethylene glycol divinyl ether, alkyl vinyl ether, 3,4-dihydrofuran-2-methyl(3,4-dihydropyrane-2-carboxylate), and triethylene glycol divinyl ether; a spiroorthoester compound obtained by reaction of a epoxy compound and lactone; ethylene unsaturated compounds such as vinylcyclohexane, isobutylene, and polybutadiene; and derivatives of the above-cited compounds.

Examples of the cation polymerization initiator include diazonium salt, iodonium salt, sulfonium salt, selenium salt, pyridinium salt, ferrocenium salt, phosphonium salt, and thiopyrilium salt, but preferable is onium salt polymerization initiators such as aromatic iodonium salt and aromatic sulfonium salt which are relatively stable in heat. Note that irradiation with a ultraviolet light and a visible light is preferable for activating the onium salt polymerization initiator. In a case of using the onium salt polymerization initiators such as aromatic iodonium slat and aromatic sulfonium salt, anions include, for example, $BF_4^-$, $AsF_6^-$, $SbF_6^-$, $PF_6^-$, and $B(C_6F_5)_4^-$.

Commercialized products of the cation polymerization initiators include, for example, Cyracure UVI-6974 (a mixture of bis[4-(diphenyl sulfonio)phenyl]sulfide bis hexafluoroantimonate and diphenyl-4-thiophnoxy phenyl sulfonium hexafluoroantimonate), Cyracure UVI-6990 (hexafluorophosphate of UVI-6974) (the above products are manufactured by Union Carbide Co.); Adeka Optomer SP-151, Adeka Optomer SP-170 (bis[4-(di(4-(2-hydroxyethyl)phenyl)sulfonio)penyl]sulfide), Adeka Optomer SP-150 (hexafluorophosphate of Adeka Optomer SP-170), and Adeka Optomer SP-171 (the above products are manufactured by Asahi Denka Kogyo KK.); DTS-102, DTS-103, NAT-103, NDS-103 ((4-hydroroxynaphtyl)-dimethylsulfonium hexyafluoroantimonate), TPS-102 (triphenylsulfonium hexafluorophosphate), TPS-103 (triphenylphosphonium hexafluoroantimonate), MDS-103 (4-methoxyphenyl-diphenylsulfonium hexafluoroantimonate), MPI-103 (4-methoxyphenyliodonium hexafluoroantimonate), BBI-101 (bis(4-t-butylphenyl)iodonium hexafluorophosphate), and BBI-103 (bis(4-t-butylphenyl)iodonium hexafluoroantimonate) (the above products are manufactured by Midori Kagaku Co., Ltd); Irgacure 261 ($\eta^5$-2,4-cyclopentadiene-1-yl)[(1,2,3,4,5,6-η)-(1-methylethyl)benzene]-iron(1+)hexafluorophophate (1–)) (manufactured by Ciba Geigy KK.); CD-1010, CD-1011, CD-1012 (4-(2-hydroxytetradecanyloxy)diphenyliodonium hexafluoroantimonate)(the above products are manufactured by Sartomer Co., Inc); CI-2481, CI-2624, CI-2639, CI-2064 (the above products are manufactured by Nippon Soda Co., Ltd); Dcgacure K126 (bis[4-(diphenylsulfonio)phenyl]) sulfidebishexafluorophosphate) (manufactured by Degussa Co., Ltd); and RHODORSIL PHOTOINITIATOR 2074 ((tolylcumyl)iodonium tetrakis (pentafluorophenyl) borate (manufactured by Rhodia Inc.).

Examples of the radical polymerization initiator include, for example, thioxanthone-base compounds such as benzophenone, thioxanthone, 2,4-diethylthioxanthone, and 2-isopropylthioxanthone, 2,4-dichlorothioxanthone; benzoin ether-base compounds such as benzoin methyl ether, benzoin ethyl ether, and benzoin isopropyl ether; benzyl dimethyl ketal-base compounds such as 2,2-dimethoxy-1,2-diphenylethane-1-on; α-hydroxyalkylphenone-base compounds such as 2-hydorxy-2-methyl-1-phenylpropane-1-on, 1-(4-isopropylphenyl)-2-hydroxy-2-methylpropane-1-on, and 1-hydroxycyclohexylphenylketone; and α-dicarbonyl compounds such as camphorquinone. It is preferable to use 0.1 to 20 parts by mass of the radical polymerization initiator with respect to 100 parts by mass of the photosetting composition.

These binder, electrically conductive filler, and polymerization initiator are mixed with each other to obtain the electrically conductive composition. Note that the binder, the electrically conductive filler, and the polymerization initiator are preferably mixed in such a manner that the binder and the polymerization initiator are first mixed with each other homogeneously and then the electrically conductive filler is added thereto and mixed. When the binder, the electrically conductive filler, and the polymerization initiator are simply mixed with each other, the polymerization initiator becomes adherent to the surface of the electrically conductive filler, which may result in a failure in homogeneous mixing. Accordingly, it is desirable to mix them in the order as described above when preparing the electrically conductive composition.

As the laminating step of step S13, the following two kinds of steps are available. Depending on a manufacturing condition, it is possible to select an appropriate one kind of the steps.

A first step is a step that the electrically conductive composition prepared at the composition preparing step is extruded by an extrusion molding method so that an electrically conductive green sheet is directly laminated on the metal thin sheet 40 which has been treated at the base processing step.

A second step is a step that the electrically conductive composition prepared at the composition preparing step is previously formed into an electrically conductive green sheet on a resin film which is excellent in a mold releasing property, and the prepared electrically conductive green sheet is laminated on the metal thin sheet which has been treated at the base processing step.

As described above, the electrically conductive composition is a stiff composition containing no volatile components and therefore, in order to form the electrically conductive green sheet, it is desirable to employ the extrusion molding by use of an extruder. The extruder includes, for example, a spiral screw extruder and a mohno pump extruder.

At the molding step of step S14, a molded layer provided with a channel in the laminated electrically conductive green sheet is formed by use of a stamper. The molded layer is a layer in a yet-to-be hardened condition as a resin layer, provided with a channel groove, and formed into the substantially same shape as that of the intended resin layer 42.

The stamper (mold) is brought into pressure-contact with the electrically conductive green sheet so that a concavo-convex pattern formed in the stamper is transferred onto the electrically conductive green sheet. The stamper may be a flat plate or a gently curved plate. Further, considering that the stamper is a mold for shaping of the electrically conductive green sheet, the stamper may have a mechanical strength which is equivalent to, or not more than that of a press mold including a metal sheet. For example, upon a small-lot production such as a test production, a stamper made of aluminum alloy may be used, and upon a mass production, a stamper made of SS steel (rolled steels for general structure) may be used.

Although the electrically conductive green sheet is non-adhesive, adhesiveness of its surface may increase at the time of the pressure-contact with the stamper so that the electrically conductive green sheet surface may be possibly roughened at the time of releasing the mold. Accordingly, it is desirable that a contact region of the stamper with the electrically conductive green sheet be treated with a process for providing non-adhesiveness in order to enhance the mold releasing property. The process for providing non-adhesiveness includes, for example, a process of attaching Teflon® particles into a minute crack of chrome plating, a process of forming a DLC (Diamond Like Carbon) membrane, a process of forming a ceramic membrane made of titanium nitride, titanium carbide, titanium carbonitride, titanium oxide, aluminum titanium nitride, chrome nitride, and other substances, a process of forming a hard film by means of the plasma source ion implantation, and a process of hardening a surface by means of discharge. Particularly, it is desirable to form a chrome nitride membrane on the surface of the electrically conductive green sheet of at least one embodiment of the invention.

At the molded layer hardening step of step S15, the molded layer provided with the channel is hardened by combination of the photosetting process and the thermosetting process. A surface layer portion of the molded layer is first hardened by the photosetting process and then, the entire molded layer is hardened by the thermosetting process.

Since the molded layer contains a large amount of the electrically conductive filler, when employing only the photosetting process, hardening is effected only in a part of the print ink layer in depth to which an irradiating light reaches. Further, in the thermosetting process, the channel molded by the stamper is deformed by thermal sagging. Accordingly, it is effective that the surface layer portion of the molded layer is previously hardened by light irradiation and then, the entire layer is hardened by heating.

In the photosetting process, when an ultraviolet light is used as the irradiating light, the ultraviolet light has large energy for hardening because of its short wavelength, but a depth to which the ultraviolet light reaches is shallow and therefore, the ultraviolet is not suitable for hardening of such a thick membrane as being dealt with the at least one embodiment of invention. Consequently, it is preferable to perform the irradiation of a light having a wavelength ranging from that of a visible light to that of a near-infrared light. Further, it is desirable that the radical polymerization reaction and the cation polymerization reaction be combined so that the hardening is completed for a short length of time by means of a simple operation.

In the thermosetting process, heating in a heating furnace and electromagnetic wave heating through irradiation with electromagnetic wave are desirable.

At the base processing step, the laminating step, and the molded layer hardening step, the metal thin sheet may be supplied in a roll form or in form of pieces which are previously cut into an outer size of the separator.

At the sealing section forming step of step S16, a sealing projection is formed in a region corresponding to the sealing section 14 of the covered base by a press work. As shown in FIG. 3, when assembling the PEFC, a shape of the sealing projection is determined so that the sealing projection is brought into pressure-contact with the polymer membrane 20 under a resilient force, and the sealing projection of the determined shape is formed by the press work. In a case of providing the covered base in a roll form, at the sealing section forming step, the sealing projection is formed by one pressing and stamped out into the outer size of the separator to obtain the separator 1. Further, the formation of the sealing projection and the stamping out into the outer size may be carried out by continuous two pressings.

The separator 1 thus obtained is laminated alternatively with the fuel cell 2 at the assembling step and furthermore, a power collector plate 3, an insulating sheet 4, an end flange 5, and an electrode wiring 12 are added so that assembling is carried out to form the PEFC 100 having the structure as shown in FIG. 1.

As described above, by forming a channel in the resin layer 42 by means of the stamper molding conducted in the laminated electrically conductive green sheet, when compared to the case of using the conventional press work, the dimensional accuracy is high and moreover, the warp and the deformation are not generated. Accordingly, it is possible to enhance productivity of the separator and to realize a high yield.

Further, a structure having a covering layer provided between the resin layer 42 and the metal thin sheet 40 may be used.

Figure 19:
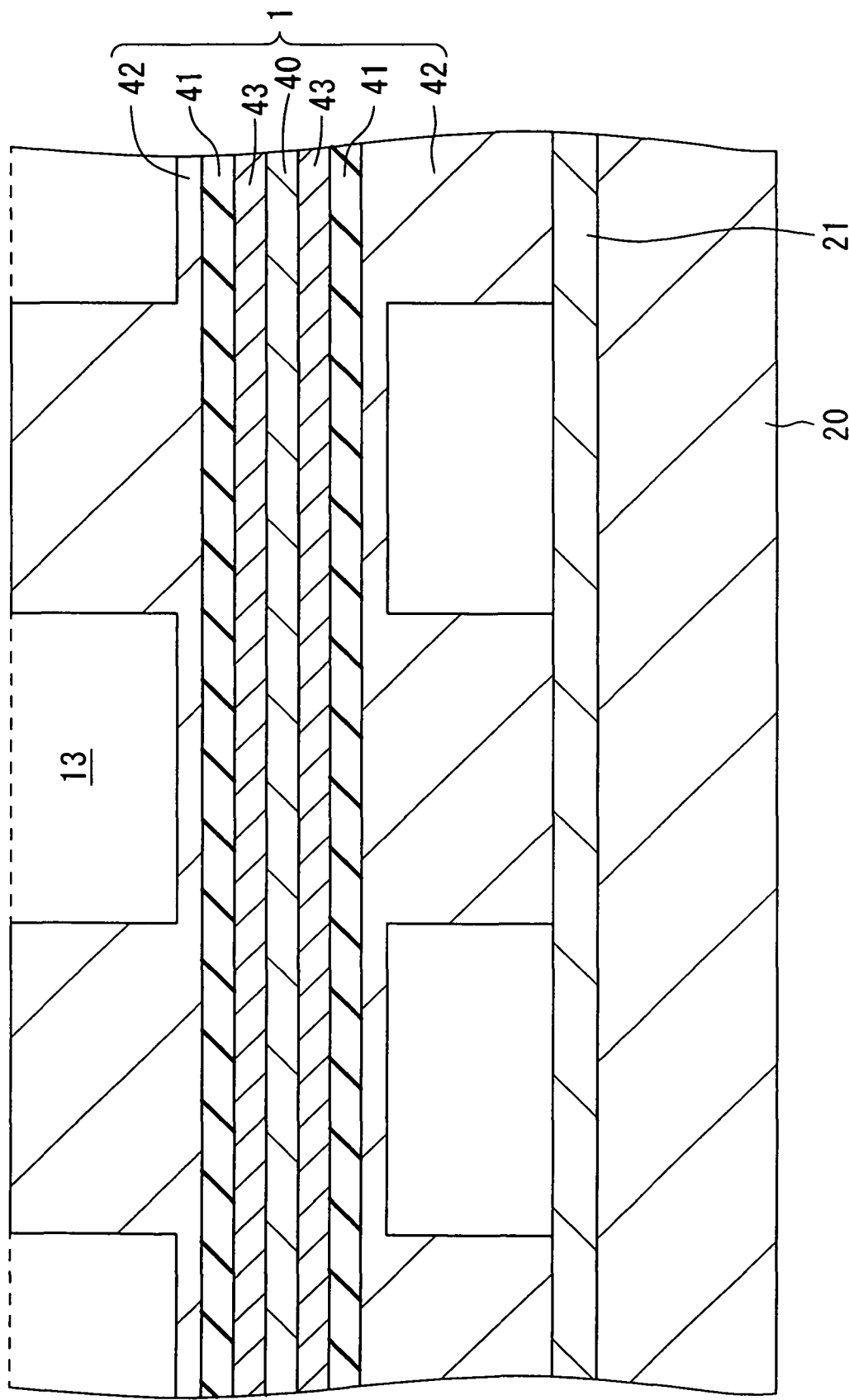
FIG. 19 is an enlarged view illustrating the main portion of the separating section 13 according to a ninth embodiment.
Figure 20:
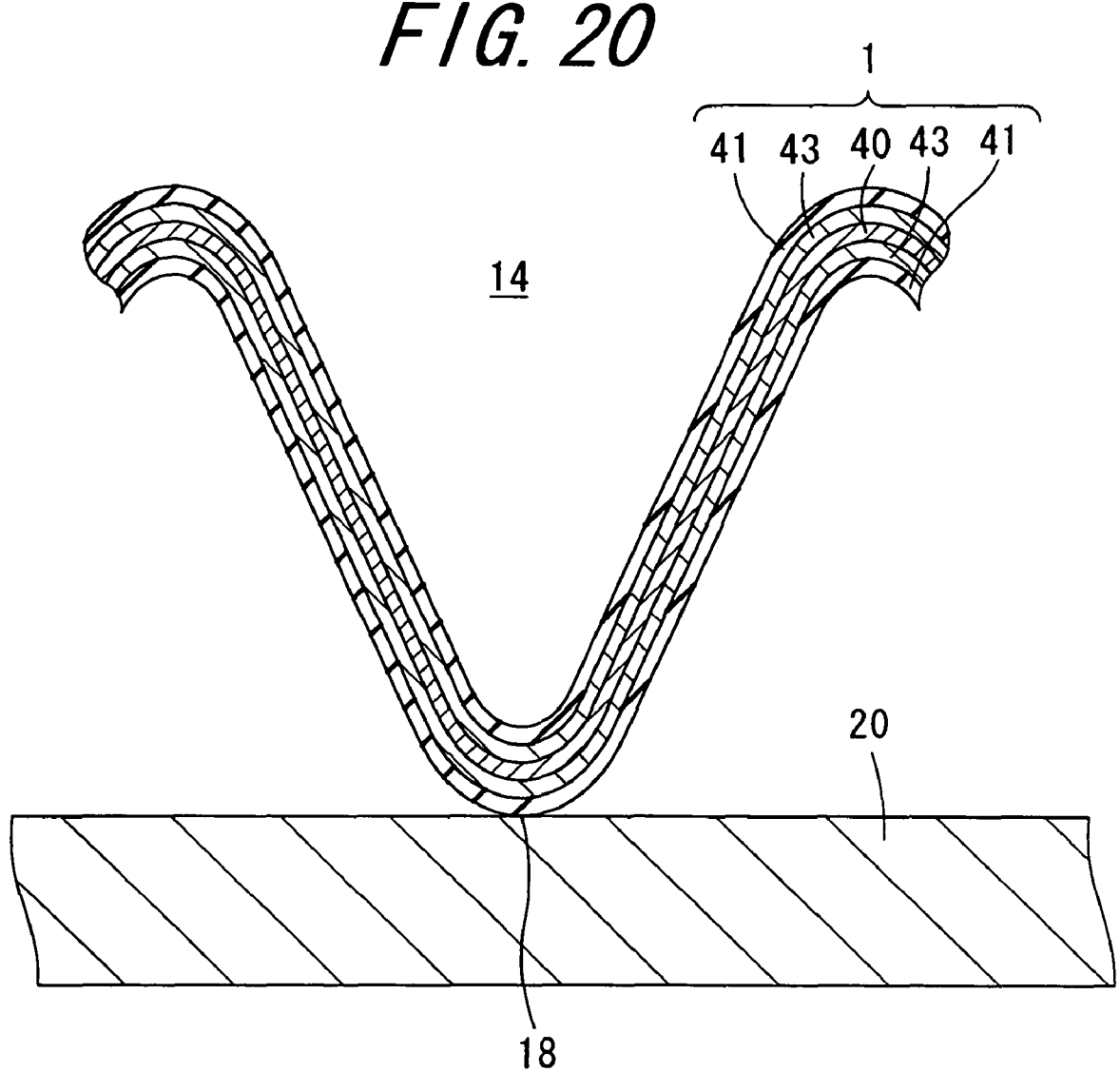
FIG. 20 is an enlarged view illustrating the main portion of the sealing section 14 according to the ninth embodiment.

FIG. 19 is an enlarged view illustrating the main portion of the separating section 13 according to a ninth embodiment. FIG. 20 is an enlarged view illustrating the main portion of the sealing section 14 according to the ninth embodiment. In the ninth embodiment, a surface of the metal thin sheet 40 is covered with the covering layer 41 in the separating section 13, with the result that it is possible to effectively prevent the surface changes such as corrosion caused by the hydrogen gas and oxygen gas and the coolant.

Since the covering layer 41 needs to have electrical conductivity as in the case of the resin layer 42, applicable rubber includes, for example, general-purpose rubbers such as isoprene rubber, butadiene rubber, styrene-butadiene rubber, butyl rubber, and ethylene-propylene rubber; and particular rubber such as epichlorohydrin-containing rubber exhibiting impermeability to gaseous substances and heat resistance, to which a carbon filler is added to give the electrical conductivity. Especially the use of addition-polymerized allyl-series polyisobutylene to which the carbon filler is added, is desirable because of its excellent heat resistance and acid resistance.

Further, the useable synthetic resin material includes, for example, phenol resin, epoxy resin, and fluorine-containing resin to which the electrically conductive filler is added to give the electrical conductivity. Especially the use of highly corrosion-resistant fluorine-containing resin is preferable. The preferable examples thereof include PTFE (polytetrafluoroethylene), PFA (tetrafluoroethylene-perfluoroalkyl vinylether copolymer), FEP (tetrafluoroethylene-hexafluoropropylene copolymer), EPE (tetrafluoroethylene-hexafluoropropylene-perfluoroalkyl vinylether copolymer), ETFE (tetrafluoroethylene-ethylene copolymer), PCTFE (polychlorotrifluoroetylene), ECTFE (chlorotrifluoroetylene-ethylene copolymer), PVDF (polyvinylidene fluoride), PVF (polyviny fluoride), THV (tetrafluoroethylene-hexafluoropropylene-vinylidene fluoride copolymer), VDF- HFP (vinylidene fluoride-hexafluoropropylene copolymer), and TFE-P (vinylidene fluoride-propylene copolymer), to which the carbon filler is added.

Further, in the sealing section 14, when covering with an elastic body, namely the covering layer 41, as the vertex 18 is placed in a pressure-contact state under a resilient force, the part of contact with the polymer membrane 20 is caused to deform, thus preventing occurrence of a gap between the vertex and the polymer membrane 20 surface. This helps to enhance the sealability furthermore.

Note that in the manufacturing process, the adhesive layer 43 is formed at the base processing step of step S11 and then, the formation of the covering layer 41 is carried out. A vulcanization treatment of the covering layer 41 through heating may be conducted at the base processing step, or at the same time of the hardening of the resin layer 42 at the hereinafter-described molded layer hardening step.

Further, the separator 1 may have a structure in which a high conductive layer is provided on the surface of the resin layer 42.

Figure 21:
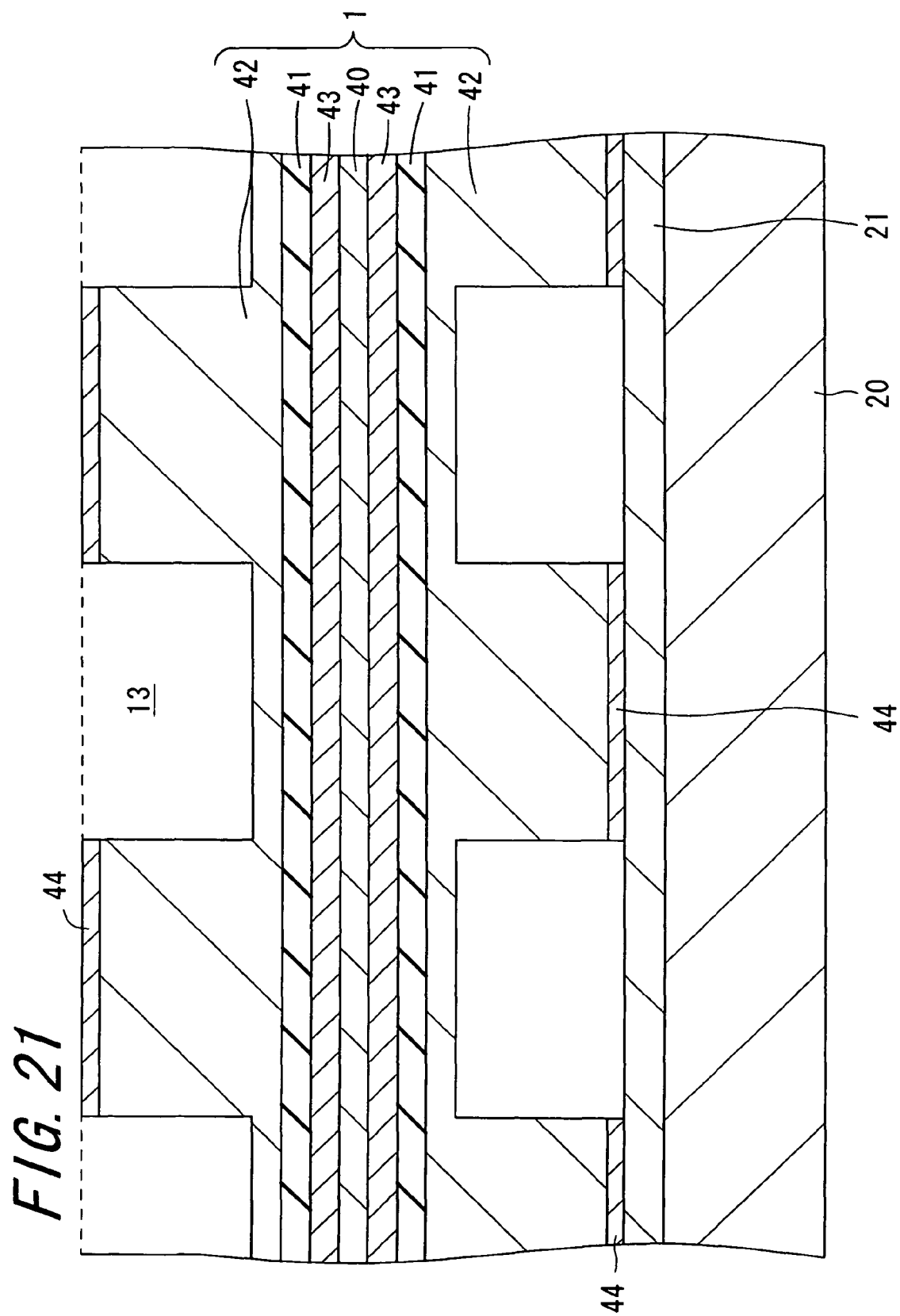
FIG. 21 is an enlarged view illustrating the main portion of the separating section 13 according to a tenth embodiment.

FIG. 21 is an enlarged view illustrating the main portion of the separating section 13 according to a tenth embodiment. In the tenth embodiment, the high conductive layer 44 is formed only in the region of the resin layer 42 surface, which makes contact with the catalytic electrode 21.

In a case where the rate of power collection obtained is not sufficient because of a high contact resistance between the resin layer 42 and the catalytic electrode 21, by forming the high conductive layer 44 on the surface of the resin layer 42, it is possible to decrease the contact resistance between the resin layer 42 and the catalytic electrode 21 and thereby increase the rate of power collection. It is preferable to use a carbon-resin compound for the high conductive layer 44. In the high conductive layer 44, the high electrical conductivity is realized by carbon, and gas permeability is reduced by the binder resin. Although electric resistance of the high conductive layer 44 is reduced more with an increased carbon content of the carbon-resin compound, a content of the binder resin is decreased so that the gas permeability is made to increase. Considering balance between the electric resistance and the gas permeability, it is preferred that a rate of the resin content of the carbon-resin compound be within a range of from 20% to 30%. The contained carbon includes, for example, artificial graphite, carbon fiber, carbon nanotube, and fullerene and particularly, it is preferable to use the artificial graphite. For the binder resin, it is preferable to use polyisobutylene rubber or other substances.

Further, as the high conductive layer 44, the mixture needs to be applied only to the region of the resin layer 42 surface, which makes contact with the catalytic electrode 21. With respect to decrease in the contact resistance by use of the high conductive layer 44, the formation of the high conductive layer 44 only in the contact region between the resin layer 42 and the catalytic electrode 21 brings a sufficient effect. Consequently, a region of forming the high conductive layer 44 is decreased so that the contact resistance can be effectively lowered by use of a small amount of the carbon-resin compound.

In the manufacturing process, during the molded layer hardening step or after the molded layer hardening step, a high conductive layer forming step is carried out. At the high conductive layer forming step, the carbon-resin compound is applied so as to have a predetermined thickness thereof, to the surface of the resin layer 42. At the molded layer hardening step, the resin layer 42 is treated with the photosetting process. This means that application of the carbon-resin compound before the molded layer hardening step makes the hardening of the resin layer 42 difficult. Accordingly, in a case of conducting the application during the molded layer hardening step, the application should be carried out after the photosetting process and before the thermosetting process.

Furthermore, even when the high conductive layer 44 is a thin film layer, its effect can be sufficiently obtained. Accordingly, the high conductive layer 44 can be formed in such a simple process that alcoholic dispersion of carbon particles is sprayed on the print ink layer which is in a wet condition after the molding step, by a spray so as to have a thickness of several μm, and then dried to be solidified.

As descried above, in the separator 1, by forming the channel in the electrically conductive green sheet by means of the stamper molding, the resin layer 42 for providing the gas channel in the separating section 13 has higher dimensional accuracy and causing no warp and deformation, when compared to the case of using the conventional press work. Accordingly, it is possible to enhance productivity of the separator 1 and to realize a high yield. Furthermore, the channel pattern being formed has a highly enhanced degree of design freedom. For example, in a case of the press work, the pattern is formed so that two sides thereof are integrated and moreover, more and more patterns have liner shapes. This limits the design of the pattern. However, the stamper molding enables formation of completely different patterns on both sides of the separator 1, and also enables formation of patterns including a curve-shaped pattern and a hole-shaped pattern. Further, The sealing section 14 is formed by a press work, and it is thus possible to realize the high sealability by means of a simple process.

Further, providing the high conductive layer 44 in the separating section 13 can largely decrease the contact resistance between the catalytic electrode 21 and the separator 1, so that the rate of power collection can be further enhanced.

The separator 1 was produced under conditions shown in the following Examples 4 to 6 as examples of manufacturing method for providing a channel groove in the electrically conductive green sheet through molding by use of the stamper.

The stamper commonly used in Examples 4 to 6 was made of aluminum alloy, having a chrome nitride membrane formed on a surface thereof for enhancing the mold releasing property.

EXAMPLE 4

In Example 4, the resin layer 42 was formed of acrylate-/epoxy-resin having an IPN structure.

Electrically Conductive Composition

Binder: 70 parts by weight of acrylate oligomer (hexanedioldiacrylate manufactured by UCB chemical Co., Ltd, tradename: HDDA), and 30 parts by weight of epoxy oligomer (epoxidized soybean oil manufactured by CP HALL Co., tradename: Paraplex G-62)

Electrically Conductive Filler: 300 parts by weight of spheroidal graphite (manufactured by Nippon Graphite Industry Co., Ltd), 150 parts by weight of electrically conductive carbon black (manufactured by Tokai carbon Co., Ltd, tradename: #5500), and 300 parts by weight of scaly graphite (manufactured by Chuetsu Graphite Industry Co., Ltd, tradename: BF series)

Polymerization Catalyst: 1.5 parts by weight of hydroxyphenyl ketone (manufactured by Ciba Co. Ltd, tradename: Daro cure 1173), and 1.0 part by weight of triallylsulfonium phosphorus hexafluoride (manufactured by Dow Chemical Co., Ltd, tradename: Cyracure UVI-6990)

Condition for Hardening
Photosetting process: irradiation for 5 seconds at 600 mW/cm$^2$ by use of a metal halide lamp
Thermosetting process: for 30 minutes at 80° C. to 100° C.

EXAMPLE 5

In Example 5, the resin layer 42 was formed of vinyl ester (epoxy acrylate).
Electrically Conductive Composition
Binder: 100 parts by weight of acrylate oligomer (bisphenol A diacrylate manufactured by Showa Highpolymer Co., Ltd, tradename: Ripoxy SP1507)
Electrically Conductive Filler: 300 parts by weight of spheroidal graphite (manufactured by Nippon Graphite Industry Co., Ltd), 150 parts by weight of electrically conductive carbon black (manufactured by Tokai carbon Co., Ltd, tradename: #5500), and 300 parts by weight of scaly graphite (manufactured by Chuetsu Graphite Industry Co., Ltd, tradename: BF series)
Polymerization Catalyst: dye-borate bimolecular (P II type) photopolymerization initiator, 3 parts by weight of α-diketone, and 0.5 part by weight of tertiary amine
Condition for Hardening
Photosetting process: irradiation for 10 seconds at 600 mw/cm$^2$ by use of a xenon lamp
Thermosetting process: for 30 minutes at 80° C. to 100° C.

EXAMPLE 6

In Example 6, the resin layer 42 was formed of acrylate-/epoxy-resin having an IPN structure.
Electrically Conductive Composition
Binder: 50 parts by weight of acrylate oligomer (bisphenol A diacrylate manufactured by Showa Highpolymer Co., Ltd, tradename: Ripoxy SP1507), and epoxy oligomer (bis-cyclic aliphatic diepoxy manufactured by Ciba Co., Ltd, tradename: Araldite GY-179)
Electrically Conductive Filler: 300 parts by weight of spheroidal graphite (manufactured by Nippon Graphite Industry Co., Ltd), 150 parts by weight of electrically conductive carbon black (manufactured by Tokai carbon Co., Ltd, tradename: #5500), and 300 parts by weight of scaly graphite (manufactured by Chuetsu Graphite Industry Co., Ltd, tradename: BF series)
Polymerization Catalyst: 1.3 parts by weight of bis-acyl phosphine oxide (manufactured by Ciba Co., Ltd, tradename: Irgacure 819), and 1.5 parts by weight of triallylsulfonium phosphorus hexafluoride (manufactured by Dow Chemical Co., Ltd, tradename: Cyracure UVI-6990)
Condition for Hardening
Photosetting process: irradiation for 3 seconds at 800 mW/cm$^2$ by use of a metal halide lamp
Thermosetting process: for 10 minutes at 80° C. to 100° C.
Mechanical characteristics and electric characteristics of the respective Examples are shown in Table. 2.

TABLE 2

| | Specific volume resistivity [mΩ · cm] | Contact resitivity [mΩ · cm$^2$] | Hardness [Shore D] | Layer Thickness [μm] |
|---|---|---|---|---|
| Example 4 | 23 | 8 | 56 | 400 |
| Example 5 | 17 | 11 | 79 | 400 |
| Example 6 | 19 | 10 | 65 | 400 |

Note that the contact resistivity was measured by use of the high conductive layer formed by spraying an ethyl alcohol dispersion of the electrically conductive carbon black (manufactured by Tokai Carbon Co., Ltd, tradename: #5500) onto the print ink layer which had been in a wet condition after the resin layer printing step, by a spray so that its dried film would have a thickness of from 2 to 3 μm, and then being solidified.
(Characteristics Evaluation Method)
Specific Volume Resistivity: In conformity with a four-point probe array (JIS K7194)
Contact Resitivity: Electrical resistance meter (ohmmeter)
Hardness: Converted [Shore D] from a measured value through a micro hardness tester The separators manufactured in Examples 4 to 6 were homogeneous without any unhardened parts, and a transferring property from the stamper was favorable. Further, as shown in FIG. 2, the obtained mechanical characteristics and electric characteristics were enough for functions as a separator.

Figure 22:
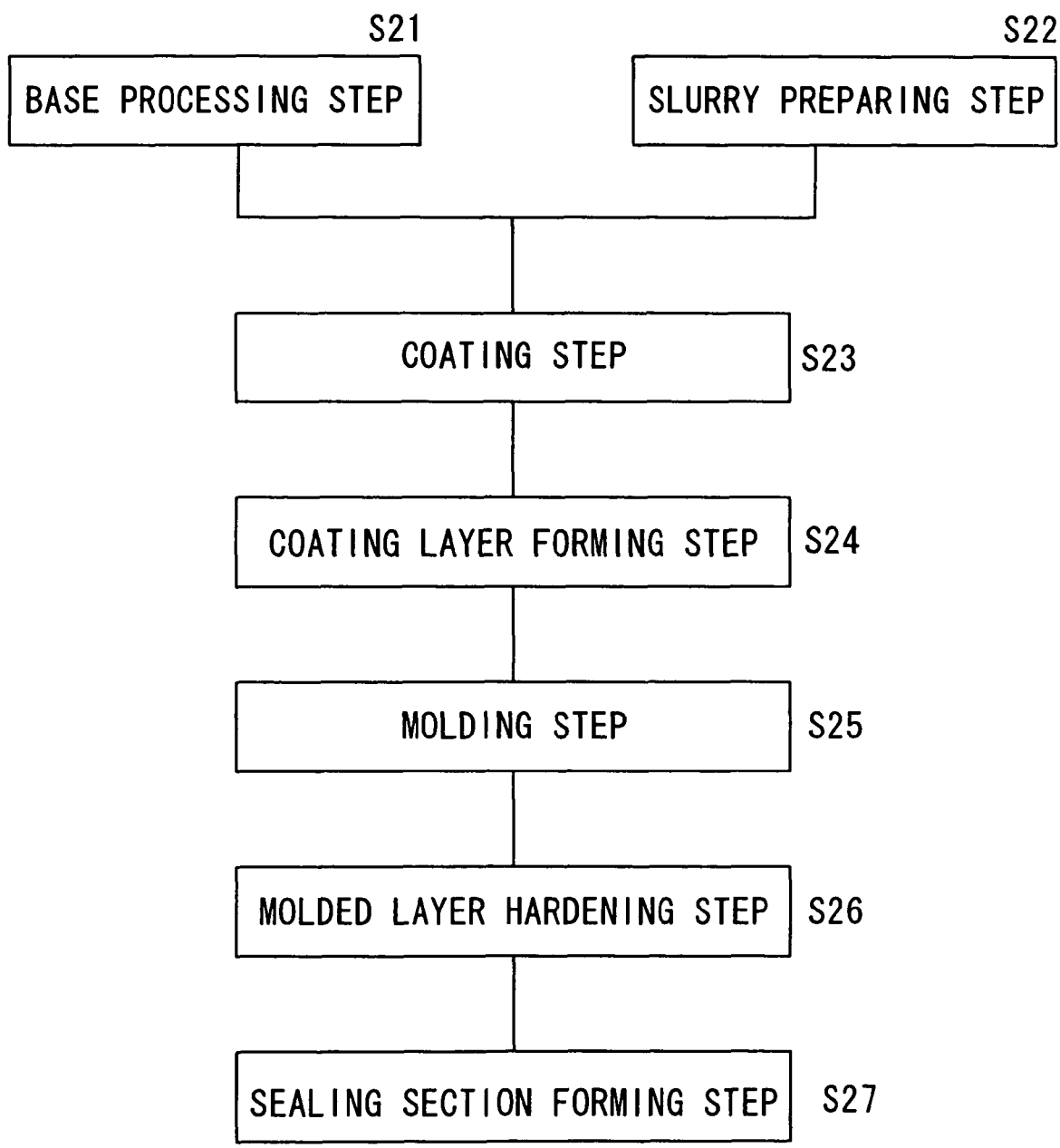
FIG. 22 is a manufacturing process view showing the manufacturing method of the separator.

FIG. 22 is a manufacturing process view showing the manufacturing method of the separator.

In the present embodiment, the electrically conductive green sheet is not employed, but electrically conductive slurry is applied to the surface of the metal thin sheet and dried to form a coating layer, and the coating layer is molded so as to have the concavity and convexity formed therein by use of a stamper, with the result that the resin layer 42 provided with the channels is formed. Since the resin layer 42 needs to have electrical conductivity, rubber or synthetic resin containing an electrically conductive filler can be used for the resin layer 42. Particularly, the rubber preferably used includes polyisobutylene, and the synthetic resin preferably used includes epoxy resin and acrylate resin, and more preferably used is resin having a structure of interpenetrating polymer network (abbreviate as IPN) in which the epoxy resin and the acrylate resin are combined. Further, the resin layer 42 is formed once as a coating layer made of the dried electrically conductive slurry, and needs to be able to have a channel molded therein by use of the stamper. First of all, a binder composed of thermosetting monomer, thermosetting oligomer, or thermosetting prepolymer, and an electrically conductive filler composed of a metal compound or a carbon-base material, are mixed with each other to prepare the electrically conductive slurry, and then applied to the metal thin sheet surface. After the applied electrically conductive slurry is dried to form the coating layer, the coating layer is molded so as to have the concavity and convexity formed therein by use of the stamper (mold) provided with the predetermined transfer pattern, with the result that the resin layer 42 is formed.

The present manufacturing process includes a base processing step, a slurry preparing step, a coating step, a coating layer forming step, a molding step, a molded layer hardening step, and a sealing section forming step. The manufacturing process is a step of manufacturing the separator 1 according to the above-described eighth to tenth embodiments.

In order to realize a shape of the partition block as shown in FIG. 2 through molding by use of the stamper, it is necessary to form such a thick film that the molded resin layer has a thickness of approximately from 100 μm to 500 μm. Moreover, the resin layer 42 needs to contain a large amount of the electrically conductive filler in order to provide the electrical conductivity.

The need of the thick film, electrically conductive slurry having high viscosity of a certain level must be used. Accordingly, in order to realize the required electric characteristics and structural characteristics, a composition of the electrically conductive slurry becomes important.

At the base processing step of step S21, in a case of using as the base the metal thin sheet 40 that is, for example, a stainless-steel sheet, in order to ensure the electrical conductivity with respect to the resin layer 42, the surface of the metal thin sheet 40 is subjected to etching or other processes so as to remove a passivation film therefrom so that the adhesive layer 43 is formed. In detail, in order to obtain a predetermined configuration and gas flow pathways, die stamping is carried out, and the stamped metal thin sheet has its surface coated with an electrically conductive coupling agent typified by a triazinethiol-base compound, as well as doped electrically conductive polymer typified by a polyaniline-base compound.

At the slurry preparing step of step S22, the electrically conductive slurry to be used at the following coating step, is prepared.

In order to realize a low-cost production, it is desirable that not only a row material but also its processing step be suitable for mass production. In the at least one embodiment of invention, a large amount of the electrically conductive filler is used, and it is therefore difficult to form a layer on the metal thin sheet surface because of high viscosity and high consistency of the slurry when only the binder, the electrically conductive filler, and other additives are simply mixed with each other. Accordingly, the binder, electrically conductive filler, and other additives are mixed with a solvent so that the viscosity is reduced, thereby enabling easy application onto the metal thin sheet surface. Furthermore, the use of the solvent makes it possible to use a binder having a higher molecular weight so that a property of the resin layer 42 can be enhanced. Consequently, it is desirable that the electrically conductive slurry be prepared by mixing with the solvent the liquid binder having reactivity, a large amount of the electrically conductive filler, and polymerization catalyst and other additives for promoting hardening.

The to-be-prepared electrically conductive slurries are classified into two types depending upon the solvent used. One is organic solvent type slurry formed by using an organic solvent as the solvent, and the other is aqueous slurry formed by using water as the solvent. Furthermore, each of the organic solvent type slurry and the aqueous slurry is classified into two types. The organic solvent type slurry is classified into dissolution solvent type slurry and nonaqueous diffusion type (NAD type) slurry. The aqueous slurry is classified into emulsion type slurry and water-soluble type slurry.

Hereinbelow, the slurries of the respective types are described.

Dissolution Solvent Type Slurry

The usable dissolution solvent type slurry is one of aromatic dissolution solvents such as benzene, toluene, and xylene; ketone-base dissolution solvents such as acetone; and ester-base dissolution solvents such as acetic ethyl ester and acetic butyl ester, or a mixture of two or more of the above solvents. The slurry is prepared by mixing the binder, the electrically conductive filler, the polymerization catalyst, and the additives with the organic solvent.

Nonaqueous Diffusion Type Slurry

The nonaqueous diffusion type slurry is obtained by diffusing a binder or other components in a mineral turpen (aliphatic hydrocarbon-base solvent) instead of the above dissolution solvent. It is possible to realize low-polluting electrically conductive slurry, compared to the case of using the dissolution solvent.

Emulsion Type Slurry

The emulsion type slurry is prepared in a case of using a binder which is not dissolved in water. An auxiliary agent (emulsifier), that is surfactant, for example, is added to water, and the binder or other components which is not dissolved in water, is diffused through emulsification so that stable electrically conductive slurry is realized. Furthermore, a cosolvent (which is not necessarily volatile) such as methyl alcohol, ethyl alcohol, and carbitol may be added.

Water-soluble Type Slurry

The water-soluble type slurry is prepared in a case of using a denatured binder which is dissolved in water. The denatured binder or other components is dissolved in water to realize the electrically conductive slurry. Furthermore, a cosolvent such as ethylene glycol n-butyl ether, propylene glycol propyl ether, and ethylene glycol t-butyl ether is added.

In an actual manufacturing process, the to-be-prepared slurry can be selected depending on kinds of the to-be-used binder, electrically conductive filler, and polymerization catalyst.

Since the resin layer 42 is formed of rubber or synthetic resin, the binder preferably used is thermosetting monomer, thermosetting oligomer, or thermosetting prepolymer for realizing such a resin layer 42. Particularly, hardening will be carried out by means of combination of the photosetting process and thermosetting process at the following molded layer hardening step and therefore, it is preferable to use photosetting monomer, photosetting oligomer or photosetting prepolymer. For example, acrylic-base monomer or oligomer and epoxy-base monomer or oligomer can be used. The preferable acrylic-base monomer or oligomer includes epoxy acrylate, polyester acrylate, and isoboronial acrylate.

The usable electrically conductive filler may include a metal compound or a carbon-base material. The preferable metal compound includes, for example, strontium carbide, strontium nitride, and cesium oxide. The carbon-base material includes a powdery material and a fibrous material. The preferable powdery material includes artificial graphite, natural graphite, and carbon black, and the preferable fibrous material includes carbon fiber, carbon nanotube, and carbon nanofiber.

Photosetting reactions include acrylic-base radical polymerization reaction and epoxy-base cation polymerization reaction. Particularly, in a case of using resin having an IPN structure composed of epoxy resin and acrylate resin, cation polymerization initiator and radical polymerization initiator are added to the electrically conductive slurry.

The other usable additives may include a viscosity reducer.

The above substances constituting the electrically conductive slurry specifically include the same kinds of above-listed substances used for the electrically conductive composition which is to be the electrically conductive green sheet, and detail examples thereof are thus omitted while examples of only the solvent will be listed.

The organic solvents include toluene, methyl ethyl ketone, acetone, ethylene glycol monoethyl ether, turpen, dioxane, cyclohexane, n-hexane, n-heptane, methyl alcohol, ethyl alcohol, and mineral spirit.

The binder, electrically conductive filler, and polymerization initiator, and the solvent as described above are dispersed and mixed by a high-speed hammer mill and a high-speed impeller mill so that the electrically conductive slurry is obtained. In detail, the binder and the polymerization initiator are firstly mixed with each other under red light to prepare a solution of middle viscosity, and the solvent is then added to this solution so that the solution is arranged to be a solution of low viscosity. The electrically conductive filler is lastly added to the solution of low viscosity under sufficient shearing force added thereto by use of a high-speed mill, with the result that the electrically conductive slurry is obtained.

At the coating step of step S23, the prepared electrically conductive slurry is applied so as to have a predetermined thickness thereof, to the surface of the metal thin sheet 40. Usable coating methods include existing methods among which a dipping method, a doctor blade method, and a curtain coating method are specifically preferable. A preferable thickness of the electrically conductive slurry at the coating step is from 200 μm to 500 μm.

The dipping method indicates a method of dipping a to-be-coated member into a coating solution. When the dipping method is employed in the at least one embodiment of invention, the coating is performed by dipping the metal thin sheet 40 into the electrically conductive slurry. A thickness of the applied electrically conductive slurry can be controlled through adjustments of composition and temperature of the electrically conductive slurry, a length of dipping time, a speed of pulling out the metal thin sheet 40, and other conditions.

The doctor blade method indicates a method of applying a coating solution continuously to a surface of to-be-coated member in such a manner that a tank is filled up with the coating solution and then, a gate which is a so-called a doctor blade, of the tank is opened while the to-be-coated member is made to be moving. By the doctor blade method, it is possible to obtain a coating having a thickness in accordance with a height of the doctor blade. When this method is applied to the at least one embodiment of invention, the tank is filled up with the electrically conductive slurry and then, a coating operation is carried out by moving a surface-treated metal thin sheet 40. A thickness of the applied electrically conductive slurry can be controlled through adjustments of composition and temperature of the electrically conductive slurry, the height of the doctor blade, a moving speed of the metal thin sheet 40, and other conditions.

The curtain coating method is a method of applying a coating solution which is made to fall so as to form a curtain-like shape, so that the surface-treated metal thin sheet 40 is made to pass through the coating solution. When this method is applied to the at least one embodiment of invention, the electrically conductive slurry is made to fall so as to form a curtain-like shape and then, a coating operation is carried out by making the surface-treated metal thin sheet 40 pass through the electrically conductive slurry. A thickness of the applied electrically conductive slurry can be controlled through adjustments of composition and temperature of the electrically conductive slurry, a falling speed of the electrically conductive slurry, a passing speed of the metal thin sheet 40, and other conditions.

Industrially, it is particularly preferable to coat a surface-treated long metal thin sheet by the dipping method.

At the coating layer forming step of step S24, a solvent contained in the applied electrically conductive slurry is removed so that a coating layer is formed. Herein, the coating layer indicates a layer in a state where the solvent contained in the electrically conductive slurry is removed, namely a layer formed of nonvolatile components such as the binder, the electrically conductive filler, and the polymerization initiator.

Usable removing methods of the solvent include existing methods among which a drying method through hot air blowing is preferable. Specifically, hot air having a predetermined temperature blows to a surface of the applied electrically conductive slurry to evaporate the solvent so that the surface of the applied electrically conductive slurry is dried out. The temperature of the hot air may be selected depending on the contained solvent in both cases of using the organic solvent type slurry or the aqueous slurry.

At the molding step of step S25, a molded layer provided with a channel in the coating layer is formed by use of a stamper. The molded layer is a layer in a yet-to-be hardened condition as a resin layer, provided with a channel groove, and formed into the substantially same shape as that of the intended resin layer 42.

The stamper is brought into pressure-contact with the coating layer so that a concavo-convex pattern formed in the stamper is transferred onto the coating layer. The stamper may be a flat plate or a gently curved plate. Further, considering that the stamper is a mold for shaping of the coating layer, the stamper is just required to have a mechanical strength which is equivalent to, or not more than that of a press mold including a metal sheet. For example, upon a small-lot production such as a test production, a stamper made of aluminum alloy may be used, and upon a mass production, a stamper made of SS steel (rolled steels for general structure) may be used.

Although the coating layer is non-adhesive, adhesiveness of its surface may increase at the time of the pressure-contact with the stamper so that the coating layer surface may be possibly roughened at the time of releasing the mold. Accordingly, it is desirable that a contact region of the stamper with the coating layer be treated with a process for providing non-adhesiveness in order to enhance the mold releasing property. The process for providing non-adhesiveness includes, for example, a process of attaching Teflon® particles into a minute crack of chrome plating, a process of forming a DLC (Diamond Like Carbon) membrane, a process of forming a ceramic membrane made of titanium nitride, titanium carbide, titanium carbonitride, titanium oxide, aluminum titanium nitride, chrome nitride, and other substances, a process of forming a hard film by means of the plasma source ion implantation, and a process of hardening a surface by means of discharge. Particularly, it is desirable to form a chrome nitride membrane on the surface of the coating layer of the at least one embodiment of invention.

At the molded layer hardening step of step S26, the molded layer provided with the channel is hardened by combination of the photosetting process and the thermosetting process. A surface layer portion of the molded layer is first hardened by the photosetting process and then, the entire molded layer is hardened by the thermosetting process.

Since the molded layer contains a large amount of the electrically conductive filler, when employing only the photosetting process, hardening is effected only in a part of the print ink layer in depth to which an irradiating light reaches. Further, in the thermosetting process, the channel molded by the stamper is deformed by thermal sagging. Accordingly, it is effective that the surface layer portion of the molded layer is previously hardened by light irradiation and then, the entire layer is hardened by heating.

In the photosetting process, when an ultraviolet light is used as the irradiating light, the ultraviolet light has large energy for hardening because of its short wavelength, but a depth to which the ultraviolet light reaches is shallow and therefore, the ultraviolet is not suitable for hardening of such a thick membrane as being dealt with the at least one embodiment of invention. Consequently, it is preferable to perform the irradiation of a light having a wavelength ranging from that of a visible light to that of a near-infrared light. Further, it is desirable that the radical polymerization reaction and the cation polymerization reaction be combined so that the hardening is completed for a short length of time by means of a simple operation.

In the thermosetting process, heating in a heating furnace and electromagnetic wave heating through irradiation with electromagnetic wave are desirable.

At the base processing step, the coating step, the coating layer forming step, the molding step, and the molded layer hardening step, the metal thin sheet may be supplied in a roll form or in form of pieces which are previously cut into an outer size of the separator.

At the sealing section forming step of step S27, a sealing projection is formed in a region corresponding to the sealing section 14 by a press work. As shown in FIG. 5, when assembling the PEFC, a shape of the sealing projection is determined so that the sealing projection is brought into pressure-contact with the polymer membrane 20 under a resilient force, and the sealing projection of the determined shape is formed by the press work. In a case of providing the metal thin sheet in a roll form, at the sealing section forming step, the sealing projection is formed by one pressing and stamped out into the outer size of the separator to obtain the separator 1. Further, the formation of the sealing projection and the stamping out into the outer size may be carried out by continuous two pressings.

The separator 1 thus obtained is laminated alternatively with the fuel cell 2 at the assembling step and furthermore, a power collector plate 3, an insulating sheet 4, an end flange 5, and an electrode wiring 12 are added so that assembling is carried out to form the PEFC 100 having the structure as shown in FIG. 1.

As described above, in the separator 1, the resin layer 42 for providing a gas channel in the separating section 13 has a channel which is formed by means of the stamper molding after application of the electrically conductive slurry and drying thereof and therefore, when compared to the case of using the conventional press work, the dimensional accuracy is high and moreover, the warp and the deformation are not generated. Accordingly, it is possible to enhance productivity of the separator and to realize a high yield. Furthermore, the channel pattern being formed has a highly enhanced degree of design freedom. For example, in a case of the press work, the pattern is formed so that two sides thereof are integrated and moreover, more and more patterns have liner shapes. This limits the design of the pattern. However, the samper molding enables formation of completely different patterns on both sides of the separator 1, and also enables formation of patterns including a curve-shaped pattern and a hole-shaped pattern. Further, The sealing section 14 is formed by a press work, and it is thus possible to realize the high sealability by means of a simple process.

Further, providing the high conductive layer 44 in the separating section 13 can largely decrease the contact resistance between the catalytic electrode 21 and the separator 1, so that the rate of power collection can be further enhanced.

Figure 23:
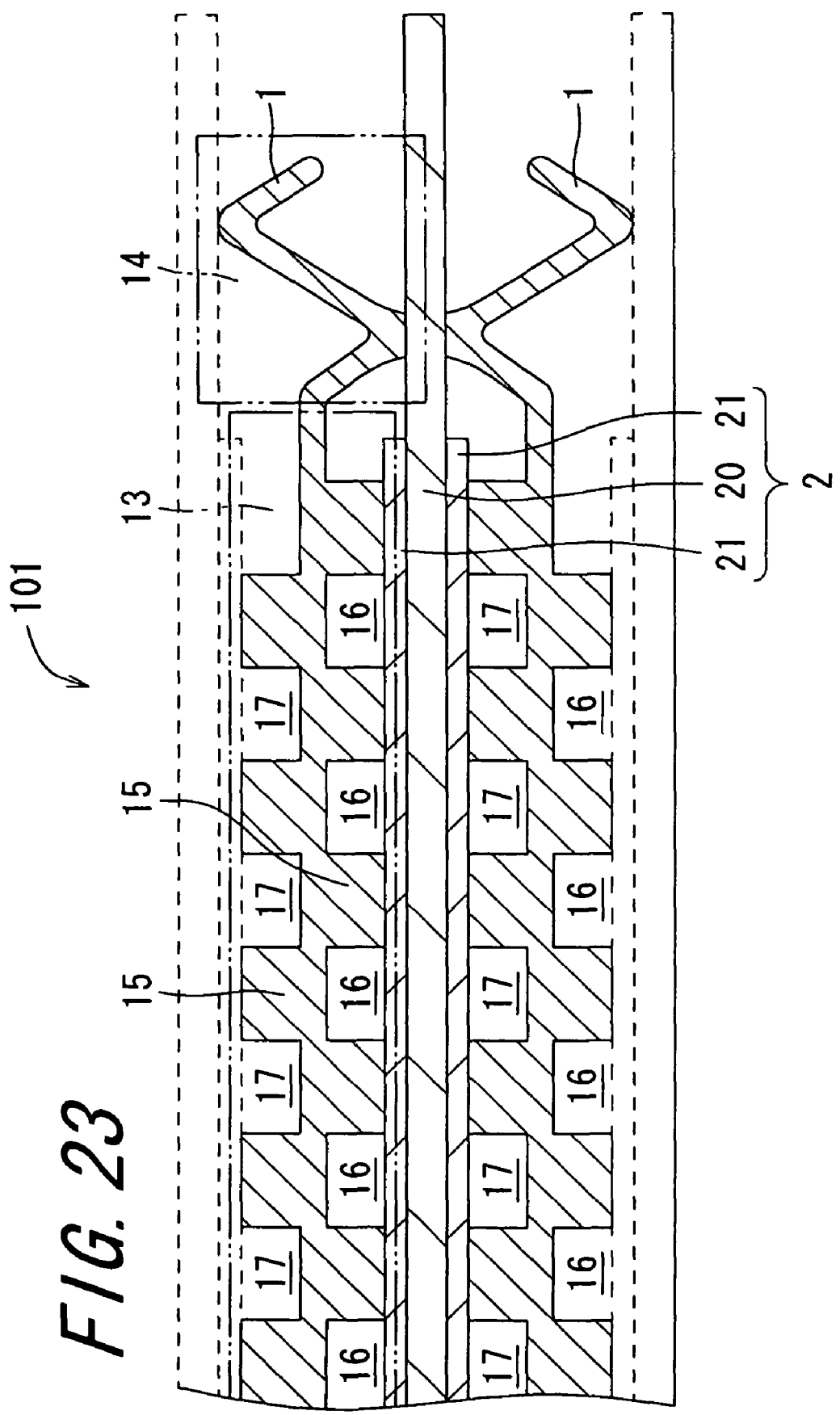
FIG. 23 is a horizontal sectional view of the unit cell 101 including the separator 1 of another shape.
Figure 24:
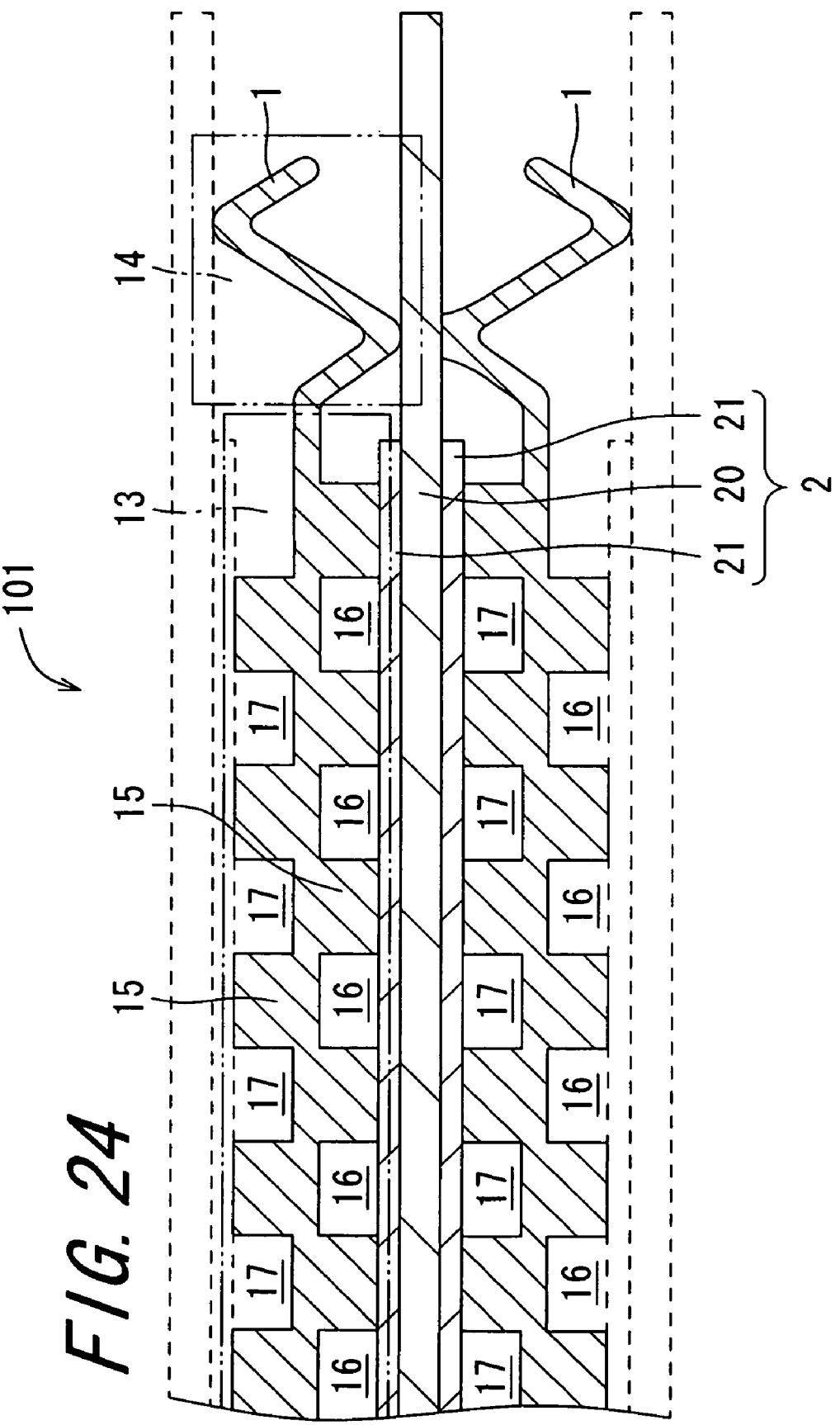
FIG. 24 is a horizontal sectional view of the unit cell 101 including the separator 1 of another shape.

FIG. 23 is a horizontal sectional view of the unit cell 101 including the separator 1 of another shape. As shown in the figure, one of the separators 1 constituting the unit cell 101 may be provided with a sealing projection having a trapezoidal sectional profile so as to make surface-contact with the high polymer membrane 20. Alternatively, as shown in FIG. 24, both of the separators 1 constituting the unit cell 101 may be provided with a sealing projection having a trapezoidal sectional profile so as to make surface-contact with the high polymer membrane 20.

Note that the metal thin sheet is used for the core member of the separator 1 in the above description, but there may be used high conductive and high-strength resins such as high conductive carbon fiber reinforced plastics (CFRP).

The separator 1 was produced under conditions shown in the following Examples 7 to 9 as examples of manufacturing method for providing a channel groove in the applied electrically conductive slurry through molding by use of the stamper.

The stamper commonly used in Examples 7 to 9 was made of aluminum alloy, having a chrome nitride membrane formed on a surface thereof for enhancing the mold releasing property.

The separator 1 was produced under conditions shown in the following Examples.

Further, in the respective Examples was also used the common covering base to which the electrically conductive slurry is applied. The covering base was produced in the procedure as follows. A passivation layer on the surface of metal thin sheet made of SUS 304 (having 10 cm length, 10 cm width, and 0.2 mm thickness) is removed by a sandblast and immediately thereafter, dripped into a triazinethiol solution so that an adhesive layer is formed. Subsequently, 100 parts by weight of addition-polymerized allyl-series polyisobutylene and 400 parts of the electrically conductive carbon graphite are mixed with each other and then, applied to the surface-treated metal thin sheet surface so as to have a thickness of 50 μm, and hardened for 2 hours at 130° C. so that the covering layer is formed.

EXAMPLE 7

In Example 7, the resin layer 42 was formed of acrylate-/epoxy-resin having an IPN structure.

Electrically Conductive Slurry Composition

Binder: 70 parts by weight of acrylate oligomer (hexanedioldiacrylate manufactured by UCB chemical Co., Ltd, tradename: HDDA), and 30 parts by weight of epoxy oligomer (epoxidized soybean oil manufactured by CP HALL Co., tradename: Paraplex G-62)

Electrically Conductive Filler: 300 parts by weight of spheroidal graphite (manufactured by Nippon Graphite Industry Co., Ltd), 150 parts by weight of electrically conductive carbon black (manufactured by Tokai carbon Co., Ltd, tradename: #5500), and 300 parts by weight of scaly graphite (manufactured by Chuetsu Graphite Industry Co., Ltd, tradename: BF series)

Polymerization Catalyst: 1.5 parts by weight of hydroxyphenyl ketone (manufactured by Ciba Co. Ltd, tradename: Darocure 1173), and 1.0 part by weight of triallylsulfonium phosphorus hexafluoride (manufactured by Dow Chemical Co., Ltd, tradename: Cyracure UVI-6990)

Solvent: 6 parts by weight of toluene, and 4 parts by weight of methylethylketone Note that the content of solvent is based on 100 parts by weight of a mixture of the binder, electrically conductive filler, and polymerization catalyst.

Condition for Hardening

Light irradiation was conducted at 600 mW/cm$^2$ by use of a metal halide lamp.

First irradiation: irradiation for 10 seconds

Second irradiation: irradiation for 10 minutes at a maintained temperature of 100° C.

EXAMPLE 8

In Example 8, the resin layer 42 was formed of vinyl ester (epoxy acrylate).

Electrically Conductive Slurry Composition
Binder: 100 parts by weight of acrylate oligomer (bisphenol A diacrylate manufactured by Showa Highpolymer Co., Ltd, tradename: Ripoxy SP1507)
Electrically Conductive Filler: 300 parts by weight of spheroidal graphite (manufactured by Nippon Graphite Industry Co., Ltd), 150 parts by weight of electrically conductive carbon black (manufactured by Tokai carbon Co., Ltd, tradename: #5500), and 300 parts by weight of scaly graphite (manufactured by Chuetsu Graphite Industry Co., Ltd, tradename: BF series)
Polymerization Catalyst: dye-borate bimolecular (P II type) photopolymerization initiator, 3 parts by weight of α-diketone, and 0.5 part by weight of tertiary amine
Solvent: 4 parts by weight of toluene, 4 parts by weight of methylethylketone, and 3 parts by weight of n-hexane Note that the content of solvent is based on 100 parts by weight of a mixture of the binder, electrically conductive filler, and polymerization catalyst.

Condition for Hardening
Light irradiation was conducted at 500 mw/cm by use of a xenon lamp
First irradiation: irradiation for 20 seconds
Second irradiation: irradiation for 7 minutes at a maintained temperature of 100° C.

EXAMPLE 9

In Example 9, the resin layer 42 was formed of acrylate-/epoxy-resin having an IPN structure.

Electrically Conductive Slurry Composition
Binder: 50 parts by weight of acrylate oligomer (bisphenol A diacrylate manufactured by Showa Highpolymer Co., Ltd, tradename: Ripoxy SP1507), and 50 parts by weight of epoxy oligomer (bis-cyclic aliphatic diepoxy manufactured by Ciba Co., Ltd, tradename: Araldite GY-179)
Electrically Conductive Filler: 300 parts by weight of spheroidal graphite (manufactured by Nippon Graphite Industry Co., Ltd), 150 parts by weight of electrically conductive carbon black (manufactured by Tokai carbon Co., Ltd, tradename: #5500), and 300 parts by weight of scaly graphite (manufactured by Chuetsu Graphite Industry Co., Ltd, tradename: BF series)
Polymerization Catalyst: 1.3 parts by weight of bis-acyl phosphine oxide (manufactured by Ciba Co., Ltd, tradename: Irgacure 819), and 1.5 parts by weight of triallylsulfonium phosphorus hexafluoride (manufactured by Dow Chemical Co., Ltd, tradename: Cyracure UVI-6990)
Solvent: 6 parts by weight of toluene, and 4 parts by weight of methylethylketone
Note that the content of solvent is based on 100 parts by weight of a mixture of the binder, electrically conductive filler, and polymerization catalyst.

Condition for Hardening
Light irradiation was conducted at 800 mW/cm$^2$ by use of a metal halide lamp
First irradiation: irradiation for 7 seconds
Second irradiation: irradiation for 10 minutes at a maintained temperature of 100° C.

Mechanical characteristics and electric characteristics of the respective Examples are shown in Table. 3.

TABLE 3

| | Specific volume resistivity [mΩ · cm] | Contact resitivity [mΩ · cm$^2$] | Hardness [Shore D] |
|---|---|---|---|
| Example 7 | 25 | 11 | 50 |
| Example 8 | 18 | 12 | 72 |
| Example 9 | 22 | 10 | 63 |

Note that the contact resistivity was measured by use of the high conductive layer formed by spraying an ethyl alcohol dispersion of the electrically conductive carbon black (manufactured by Tokai Carbon Co., Ltd, tradename: #5500) onto the print ink layer which had been in a wet condition after the resin layer printing step, by a spray so that its dried film would have a thickness of from 2 to 3 μm, and then being solidified.

Figure 25:
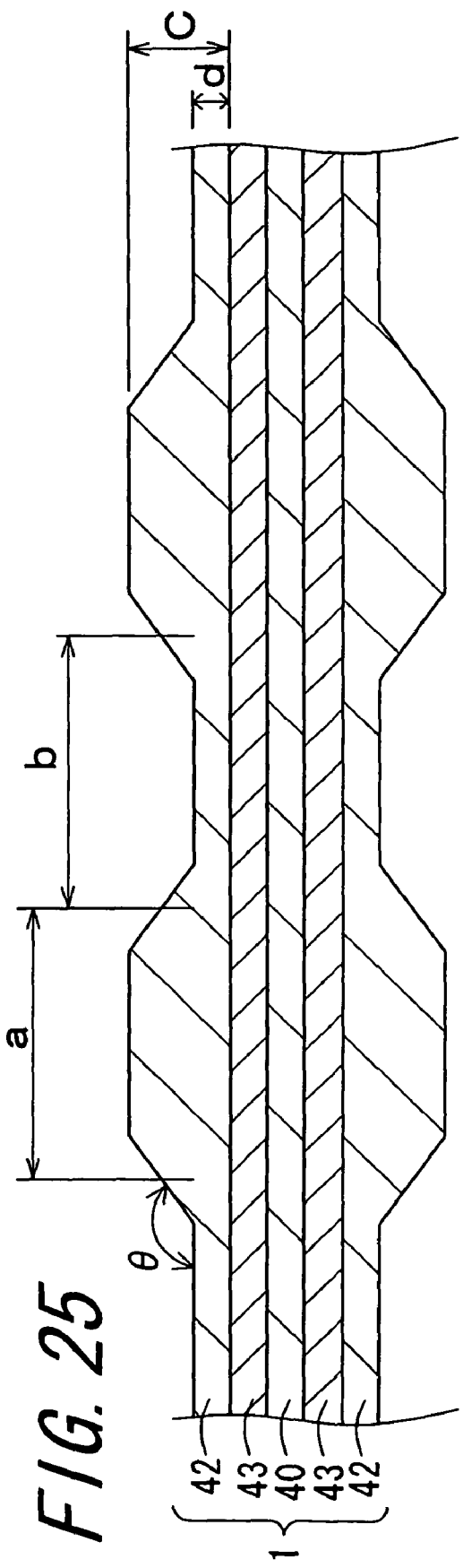
FIG. 25 is a schematic sectional view of the separator 1 obtained in Example 7.

(Characteristics Evaluation Method)
Specific Volume Resistivity: In conformity with a four-point probe array (JIS K7194)
Contact Resitivity: Electrical resistance meter (ohmmeter)
Hardness: Converted [Shore D] from a measured value through a micro hardness tester FIG. 25 is a schematic sectional view of the separator 1 obtained in Example 7. A width (a) of convex portion in contact with the catalytic electrode was 2.0 mm. A width (b) of concave portion which is to be a fluid channel was 2.0 mm. A thickness (c) of the convex portion was 0.45 mm while a thickness of the concave portion was 0.1 mm. Further, the concave portion which is to be a channel, had an inverted trapezoidal sectional profile. An angle (θ) made by a bottom surface and a side surface of the concave portion was 135°.

The separators manufactured in Examples 7 to 9 were homogeneous without any unhardened parts, and a transferring property from the stamper was favorable. Further, as shown in FIG. 3, the obtained mechanical characteristics and electric characteristics were enough for functions as a separator.

Embodiments of the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, according to at least one embodiment of the invention, by providing a flat metal sheet for a core member, it is possible to provide a separator which has less warp and deformation volume and is excellent in reliability, compared to a separator consisting solely of rubber. Since the metal sheet serving as a core member is covered with the resin layer, it is possible to prevent surface changes such as corrosion caused by hydrogen gas and oxygen gas, and coolant.

Further, it is possible to eliminate the need to prepare a sealing member such as an O-ring or a gasket that has conventionally been required to effect sealing, and thereby reduce the number of the constituent components of a fuel cell.

Further, according to at least one embodiment of the invention, it is possible to decrease a contact resistance between the separator and the electrolyte assembly.

Further, according to at least one embodiment of the invention, the high conductive layer is formed at least in a region of the resin layer which is in contact with the electrolyte assembly, so that a contact resistance between the separator and the electrolyte assembly can be decreased more effectively.

Further, according to at least one embodiment of the invention, a dispersion of carbon particle is sprayed to form a thin film formed of carbon. This makes it possible to form the high conductive layer in a very simple process.

Further, according to at least one embodiment of the invention, the separating section and the sealing section are integrally formed, so that it is possible to reduce the number of manufacturing process steps of the fuel cell.

Further, according to at least one embodiment of the invention, by covering the surface of the metal sheet with the rubber and synthetic resin having electrical conductivity, it is possible to prevent the surface changes and moreover, to ensure the electrical conductivity between the metal sheet and the resin layer. Further, the resin layer can be realized by carrying out printing by use of electrical conductive ink containing vehicle composed of thermosetting monomer or thermosetting oligomer for forming the rubber or synthetic resin, and an electrically conductive filler composed of a metal compound or carbon-base material.

The invention claimed is:

1. A fuel-cell separator which is interposed between a plurality of electrolyte assemblies each constructed of an electrolyte layer containing an electrolyte medium and a catalytic electrode disposed on a surface in a thickness-wise direction of the electrolyte layer, the separator comprising:
   a separating section for achieving separation between a fuel gas channel and an oxidizer gas channel; and
   a sealing section disposed along an outer periphery of the separator, for preventing leakage of fuel gas and oxidizer gas:
   wherein the separating section is composed of a metal sheet serving as a core member, and a resin layer formed on a surface of the metal sheet,
   the resin layer is provided with at least one of the fuel gas channel and the oxidizer gas channel,
   the sealing section is composed of the metal sheet and the resin layer formed on a surface of the metal sheet, the metal sheet having an outer periphery bent in a V-shape which corresponds to a sealing projection extending in parallel with a surface of the electrolyte assembly on which a catalytic electrode is formed, the sealing projection having a vertex which is constituted so as to be brought into pressure-contact with the electrolyte assembly under a resilient force,
   the sealing projection has the V-shaped sectional profile when viewed in a direction perpendicular to a direction in which the fuel gas and the oxidizer gas flow, and
   the sealing section is formed in a manner such that the vertex of the sealing projection does not extend beyond a position of contact with the electrolyte assembly in its assembled condition.

2. The fuel-cell separator of claim 1, wherein on a surface of the resin layer is formed a high conductive layer having higher electrical conductivity than electrical conductivity of the resin layer.

3. The fuel-cell separator of claim 2, wherein the high conductive layer is formed at least in a region of the resin layer which is in contact with the electrolyte assembly.

4. A fuel-cell separator which is interposed between a plurality of electrolyte assemblies each constructed of an electrolyte layer containing an electrolyte medium and a catalytic electrode disposed on a surface in a thickness-wise direction of the electrolyte layer, the separator comprising:
   a separating section for achieving separation between a fuel gas channel and an oxidizer gas channel; and
   a sealing section disposed along an outer periphery of the separator, for preventing leakage of fuel gas and oxidizer gas,
   wherein the separating section is composed of a metal sheet serving as a core member, a resin layer and a high conductive layer having higher conductivity than conductivity of the resin layer, which are formed on a surface of the metal sheet,
   the high conductive layer is provided within at least one of the fuel gas channel and the oxidizer gas channel,
   the sealing section is composed of the metal sheet and the resin layer formed on a surface of the metal sheet, the metal sheet having an outer periphery bent in a V-shape which corresponds to a sealing projection extending in parallel with a surface of the electrolyte assembly on which a catalytic electrode is formed, the sealing projection having a vertex which is constituted so as to be brought into pressure-contact with the electrolyte assembly under a resilient force,
   the sealing projection has the V-shaped sectional profile when viewed in a direction perpendicular to a direction in which the fuel gas and the oxidizer gas flow, and
   the sealing section is formed in a manner such that the vertex of the sealing projection does not extend beyond a position of contact with the electrolyte assembly in its assembled condition.

5. The fuel-cell separator of claim 4, wherein the high conductive layer is a thinner film than the resin layer and the high conductive layer being formed of carbon through spraying of a dispersion of carbon particles.

6. The fuel-cell separator of claim 1, wherein the metal sheet is covered with a covering layer.

7. The fuel-cell separator of claim 6, wherein the covering layer is formed on the metal sheet surface via an adhesive layer.

8. The fuel-cell separator of claim 7, wherein the adhesive layer is formed of triazinethiol or polyaniline diffused on the metal sheet surface.

9. The fuel-cell separator of claim 6, wherein the covering layer is formed of rubber or synthetic resin having electrical conductivity,
   and the covering layer includes a electrically conductive ink, the electrically conducive ink contains:
      a vehicle composed of thermosetting monomer or thermosetting oligomer for forming the rubber or synthetic resin; and
      an electrically conductive filler composed of a metal compound or carbon-base material.

10. The fuel-cell separator of claim 1, wherein the metal sheet is composed of a single metal sheet.

11. The fuel-cell separator of claim 4, wherein the metal sheet is composed of a single metal sheet.

* * * * *